United States Patent [19]

Greene et al.

[11] Patent Number: 4,906,940

[45] Date of Patent: Mar. 6, 1990

[54] PROCESS AND APPARATUS FOR THE AUTOMATIC DETECTION AND EXTRACTION OF FEATURES IN IMAGES AND DISPLAYS

[75] Inventors: Robert R. Greene; Robert R. Weyker; Karen F. West, all of Tucson, Ariz.

[73] Assignee: Science Applications International Corporation, San Diego, Calif.

[21] Appl. No.: 310,490

[22] Filed: Feb. 13, 1989

Related U.S. Application Data

[63] Continuation of Ser. No. 88,951, Aug. 24, 1987, abandoned.

[51] Int. Cl.$^4$ .......................... G06K 9/46; G06K 9/66
[52] U.S. Cl. ...................................................... 382/16
[58] Field of Search ............................. 382/16, 30, 33

[56] References Cited

U.S. PATENT DOCUMENTS

| | | | |
|---|---|---|---|
| 4,123,017 | 10/1978 | Lewis et al. | 358/126 |
| 4,349,880 | 9/1982 | Southgate et al. | 382/33 |
| 4,488,243 | 12/1984 | Brown et al. | 364/513.5 |
| 4,672,678 | 6/1987 | Koezuka et al. | 382/33 |
| 4,745,550 | 5/1988 | Witkin et al. | 382/16 |

OTHER PUBLICATIONS

Nevatia, R.; "Depth Measurement by Motion Stereo"; Computer Graphics and Imaging Processing; vol. 5, pp. 203–214 (1976).
Nevatia, R.; Binford, T.; "Description and Recognition of Curved Objects"; Artificial Intelligence; vol. 8, pp. 77–98 (1977).
Ballard, D.; Kimball, O.; "Rigid Body Flow Motion From Depth and Optical Flow"; Computer Vision, Graphics and Image Processing; vol. 22, pp. 95–115 (1983).
Tersopoloulos, D.; "Regularization of Inverse Visual Problems Involving Discontinuities"; IEEE TRansactions on Pattern Analysis and Machine Intelligence; vol. PAMI-8, No. 4 (1986).
Waxman, A.; Sinha, S.; "Dynamic Stereo; Passive Ranging to Moving Objects from Relative Image Flows"; IEEE Transactions on Pattern Analysis and Machine Intelligence; vol. PAMI-8, No. 4, pp. 406–412 (1986).
Kass, M.; Witkin, A.; Terzopoloulos, D.; "Snakes: Active Contour Models"; IEEE Proc. 1st Intl. Conf. Computer Vision, pp. 259–268 (1987).
Tersopoloulos, D.; Platt, J.; Barr, A.; Fleischer, K.; "Elastically Deformable Models"; Computer Graphics; vol. 21, No. 4, pp. 205–214 (1987).
Tersopoloulos, D.; Witkin, A.; Kass, M.; "Energy Constraints on Deformable Models: Recovering Shape and Non-Rigid Motion"; Vision, pp. 755–760.
Tersopoloulos, D.; Witkin, A.; Kass, M.; "Symmetry-Seeking Models for 3D Object Reconstruction";

(List continued on next page.)

*Primary Examiner*—Theodore M. Blum
*Attorney, Agent, or Firm*—Fitch, Even, Tabin & Flannery

[57] ABSTRACT

A pattern recognition process and apparatus automatically extracts features in displays, images, and complex signals. Complex signals are processed to two- or higher-dimensional displays or other imagery. The displays or other imagery are then processed to produce one or more visual fields in which regions with certain properties are enhanced. The enchanced regions are induced to produce attractive forces. Flexible templates placed in the visual fields are acted upon by the attractive forces, causing the templates to deform in such a way as to match features which are similar, but not identical to, the template. The deformed templates are then evaluated in order to identify or interpret the feature to which the template was attracted. Apparatus utilizing the process generates a display of the features extracted from the input signal. Desired information can be obtained from such a display, such as trajectories, the location of ridges, buildings, edges, or other boundaries. The extracted features can be used within a control system to automatically guide an object, such as a vehicle or airplane, along a desired course; or within a signal processing system to provide a display of the features in a way that aids in the interpretation of such features.

67 Claims, 22 Drawing Sheets

OTHER PUBLICATIONS

IEEE Proc. 1st Intl. Conf. Computer Vision, pp. 269-276 (1987).

Witkin, A.; Fleischer, K.; Barr, A.; "Energy Constraints on Parameterized Models"; Computer Graphics; vol. 21, No. 4, pp. 225-232 (1987).

Witkin, A.; Terzopoulos, D.; Kass, M.; "Signal Matching Through Scale Space"; Intl. Jnl. of Computer Vision; pp. 133-144 (1987).

Andrews, H. C. and B. R. Hunt, Digital Image Restoration, Prentice-Hall, 1977, pp. 113-124.

Batchelor, G. K., An Introduction to Fluid Dynamics, Cambridge University Press, 1962, pp. 84-93.

Birkhoff, G. and G. C. Rota, Ordinary Differential Equations, 2d Ed., John Wiley & Sons, 1969, pp. 1-27.

Carpenter, G. A. and S. Grossberg, "Neural Dynamics of Category Learning and Recognition: Attention, Memory Consolidation, and Amnesia," In *Brain Structure, Learning, and Memory*, J. Davis, R. Newburgh, and E. Wegman (Eds.), AAS Symposium Series, 1985 (49 pages).

Courant, R. and D. Hilbert, Methods of Mathematical Physics, vol. I, John Wiley & Sons, 1962, pp. 275-308.

Courant, R. and D. Hilbert, Methods of Mathematical Physics, vol. II, John Wiley & Sons, 1962, pp. 240-313; 551-618.

Dahlquist, G. and A. Bjork, Numerical Methods, Prentice Hall, 1974, pp. 346-347.

Duda, R. O. and P. E. Hart, Pattern Classification and Scene Analysis, John Wiley & Sons, 1973, pp. 1-39.

Fukunaga, K., Introduction to Statistical Pattern Recognition, Academic Press, 1972, pp. 1-49; 50-99; 100-121.

Fukushima, K. and S. Miyake, "Neocognitron: A Self-Organizing Neural Network Model for a Mechanism of Visual Pattern Recognition," Auditory and Visual Science Research Division, NHK Broadcasting Science Research Laboratories, 1-10-11, Kinuta, Setagay, Tokyo 157, Japan, pp. 267-285.

Fukushima, K., S. Miyake, and T. Ito, "Neocognitron: A Neural Network Model for a Mechanism of Visual Pattern Recognition," IEEE Transactions on Systems, Man, and Cybernetics, vol. SMC-13, No. 5, Sep.-Oct. 1983, pp. 826-834.

Grossberg, S. and E. Mingolla, "Neural Dynamics of Form Perception: Boundary Completion, Illusory Figures, and Neon Color Spreading," Psychological Review, 1985, vol. 92, No. 2, pp. 173-211.

Grossberg, S. and E. Mingolla, "Neural Dynamics of Surface Perception: Boundary Webs, Illuminants, and Shape-From-Shading," Center for Adaptive Systems, Boston University, Jul. 1986 (34 pages, 36 FIGS.).

Hartigan, J. A., Clustering Algorithms, John Wiley & Sons, 1975, pp. 1-27.

Hopfield, J. J. and D. W. Tank, "'Neural' Computation of Decisions in Optimization Problems," Biological Cybernetics, 52, pp. 141-152 (1985).

Hopfield, J. J. and D. W. Tank, "Computing with Neural Circuits: A Model," Articles, Science, vol. 233, pp. 625-633 (Aug. 8, 1986).

Hopfield, J. J., "Neurons with Graded Response Have Collective Computational Properties Like Those of Two-State Neurons," Biophysics, Proc. Natl. Acad. Sci. USA, vol. 91, pp. 3088-3092 (May 1984).

Joseph, E. C. and A. Kaplan, "Target Track Correlation with a Search Memory," Proc. Natl. Conv. Military Electronics, Washington, D.C., pp. 255-261 (Jun. 1962).

Koch, C., J. Marroquin, and A. Yuille, "Analog 'Neuronal' Networks in Early Vision," Biophysics, Proc. Natl. Acad. Sci. USA, vol. 83, pp. 4263-4267 (Jun. 1986).

Landau, L. D. and E. M. Lifshitz, Course of Theoretical Physics, vol. 1, Mechanics, 3d Ed., 1976, pp. 1-24; 96-130.

Levine, M. D., Vision in Man and Machine, McGraw-Hill, 1985, pp. 46-52.

Lippmann, R. P., "An Introduction to Computing with Neural Nets," IEEE ASSP Magazine, Apr. 1987, pp. 4-21.

Miyake, S. and K. Fukushima, "A Neural Network Model for the Mechanism of Feature-Extraction," Biological Cybernetics, 50, pp. 377-384 (1984).

Moharty, N., Random Signals Estimation and Identification, Von Nostrand, 1986, pp. 109-136.

Poggio, T., V. Torre and C. Koch, "Computational Vision and Regularization Theory," Nature, vol. 317, pp. 314-319 (Sep. 26, 1985).

Pratt, W. K., Digital Image Processing, John Wiley & Sons, 1978, pp. 471-550.

Richtmyer, R. D. and K. W. Morton, Difference Meth- (List continued on next page.)

OTHER PUBLICATIONS ods for Initial Value Problems, 2d Ed., John Wiley & Sons, 1967, pp. 271–286; 351–358.

Takeda, M. and J. W. Goodman, "Neural Networks for Computation: Number Representations and Programming Complexity," Applied Optics, vol. 25, No. 18, pp. 3033–3046 (15 Sep. 1986).

Tank, D. W. and J. J. Hopfield, "Simple 'Neural' Optimization Networks: An A/D Converter, Signal Decision Circuit, and a Linear Programming Circuit," IEEE Transactions on Circuits and Systems, vol. CAS-33, No. 5, pp. 533–541 (May 1986).

Thompson, R. F., "The Neurobiology of Learning and Memory," Articles, Science, vol. 233, pp. 941–947 (29 Aug. 1986).

Treisman, Anne, "Features and Objects in Visual Processing," Scientific American, Nov. 1986, pp. 114B–123.

Winston, H. W., Artificial Intelligence, 2d Ed., Addison Wesley, 1984, pp. 159–169, 335–340.

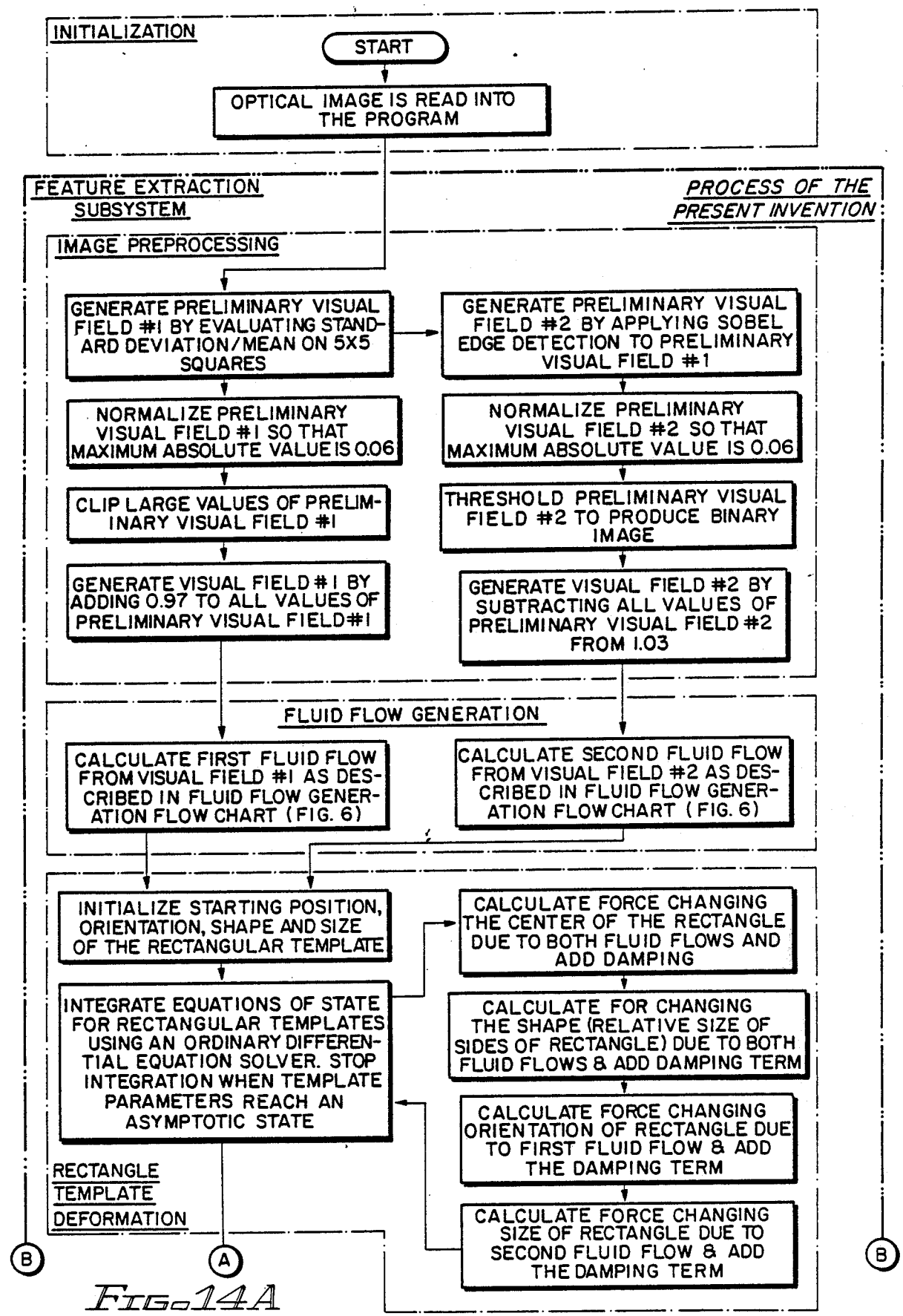

RADAR DETECTOR BASED ON A
MULTISCREEN TRACK DETECTOR SUBSYSTEM

PATTERN RECOGNITION SUBSYSTEM AERIAL RECONAISSANCE WHICH FOLLOWS LINEAR FEATURES SUCH AS ROADS AND RIVERS AND IDENTIFIES AND PHOTOGRAPHS RECTANGULAR FEATURES SUCH AS BUILDINGS.

PROCESS AND APPARATUS FOR THE AUTOMATIC DETECTION AND EXTRACTION OF FEATURES IN IMAGES AND DISPLAYS

This application is a continuation of application Ser. No. 088,951, filed 8/24/87, now abandoned.

BACKGROUND OF THE INVENTION

The present invention relates to the automatic detection and interpretation of features in images, displays, and complex signals, and more particularly to methods for automatically detecting and interpreting features in images using the simulation of physical forces that force templates to move towards similar features and to deform to match such features. The present invention further relates to apparatus using the feature-extraction method for the purpose of providing automatic control or signal detection and interpretation.

The interpretation of images and displays is a function currently carried out largely in a manual fashion by skilled human interpreters. The interpretive function involves finding and identifying features and collections of features in imagery, such as a photograph, or a display, such as a radar screen. In the past, a large number of aids have been developed which aid or enhance the ability of human interpreters to carry out the interpretive function. These aids may restore the general picture clarity which, for instance, may have been reduced by shortcomings of the imaging process. This type of image processing is discussed in Andrews, H. C. and B. R. Hunt, *Digital Image Restoration,* Prentice-Hall, 1977, pp. 113-124 (hereafter "Andrews and Hunt"). Another kind of aid enhances the brightness of certain kinds of features in an image, such as edges, to make them more readily apparent to the eye. These aids are described extensively in Pratt, W. K., *Digital Image Processing,* John Wiley & Sons, 1978, pp 471-550 (hereafter "Pratt").

Techniques which attempt to automate the image interpretation task with the object of replacing the human interpreter are very limited in capability at the present time. The approach that has been used most successfully is based on a paradigm of building up large structures from smaller structures, occasionally reversing the procedure to correct for mistakes. One example, which is called edge detection, consists of combining an edge enhancement process with a thresholding process. In the combined procedure, the image is processed in such a way that pixels at edges tend to become brighter than other pixels in the image. Then pixels above a certain brightness level are labeled as hypothetical edge points. Hypothetical edge points which form a sequence based on adjacency are then assembled into hypothetical continuous line segments. Isolated edge points are dropped. Then, based on tests of certain numerical statistics such as similarity in intensity or color, or colinearity, disconnected line segments ae associated to form longer line segments. At each point in this process, statistical decision theory, as described for example in Fukunaga, K., *Introduction to Statistical Pattern Recognition,* Academic Press, 1972, pp. 1-121 (hereafter "Fukunaga"), or Duda, R. O. and P. E. Hart, *Pattern Classification and Scene Analysis,* John Wiley & Sons, 1973, pp. 1-39. (hereafter "Duda and Hart"), may be applied to accept or reject certain hypothetical structures.

Pattern recognition techniques which build large structures from smaller structures have several disadvantages. In general there is usually a large number of small structures to identify, and an extremely large number of combinations to analyze. If there is no simple way to reduce the number of combinations that have to be examined, then the process suffers an exponential growth in the number of operations to be performed. The result is that for even moderately sized problems, the number of computations involved is beyond the capability of any computer. Furthermore, small features in an image are easily obscured by noise; thus any technique exploiting small features is stopped at the start. Conversely, spurious features may also be present; for instance, edge enhancement procedures will spuriously enhance many points which do not lie on an edge. Another problem is that techniques for associating disconnected line segments, for instance the two visible parts of a line passing under an obstruction, are not very well defined and their performance is difficult to evaluate. Finally, algorithms in which operations depend on tests are difficult to implement on parallel computer architectures.

Recent work in Artificial Intelligence (AI) has aimed at reducing the computational size of vision problems. See, e.g., Winston, H. W., *Artificial Intelligence,* 2d Ed., Addison Wesley, 1984, pp. 159-169 (hereafter "Winston"). This is accomplished by a process identified as goal reduction: building larger features from smaller features. In this process, a sequence of several intermediate representations of features are constructed. Each of the representations is of higher complexity than the earlier ones. Advantageously, AI approaches are usually implemented using a rule-based problem solving paradigm. In this paradigm, a collection of rules is specified, each of which causes a certain function to be performed if certain conditions are satisfied. The advantage of the rule-based approach over statistical pattern recognition techniques is that non-numeric information can be exploited. This information includes knowledge of the physical and cultural context of the image as well as natural constraints related to the fundamental topology of shapes. Winston formalizes the feature recognition process as a two-step procedure called Generate-and-Test. The implementation of this process involves a generator module and a tester module. At each level of representation in the feature extraction process, hypothetical features are generated and then tested against criteria contained in the rules. One of the major goals of AI research in vision has been to exploit contextual and constraint information to limit the number of hypothetical featurs that must be generated in order to generate an acceptable one. However, the rule-based paradigm has been more successful at the testing function, which is similar to the earlier successes of rule-based systems in medical diagnosis.

Another technique known in the art for image interpretation attempts to recognize large scale features in their entirety. The central tool in this approach is correlation or template matching, as described in Levine, M. D., *Vision in Man and Machine,* McGraw-Hill, 1985, pp. 46-52 (hereafter "Levine"). Template matching is basically a numerical measure of similarity between a portion of the image and an idealization or model of the feature one is looking for, called a template. This approach seems to avoid the combinatorial growth problems, is well-defined in execution, and is easily implemented on parallel computer architectures. When the template is an exact duplicate of the feature in the image, and the template can be compared with the image at the exact position and orientation of the feature, then the similarity measure between the template and image will be very high at that position and orientation. The procedure is robust, even in the presence of noise in the image. Disadvantageously, in the real world, imagery features are seldom identical to the templates due to changes in apparent size and perspective, distortion in the imaging system, and the natural variability between different objects. Unfortunately, even slight distortions degrade the performance of the correlation matcher to such an extent that it is obscured by the fluctuations due to commonly observed levels of noise in the image. The only remedy for this degradation is to manually compare the template to the image in all positions, orientations, sizes, perspectives, known distortions, etc. This process is generally prohibitively expensive.

Artificial Neural Systems (ANS) technology is a parallel technology to the present invention. The basic objective of ANS is to design large systems which can automatically learn to recognize categories of features, based on experience. The approach is based on the simulation of biological systems of nerve cells. Each nerve cell is called a neuron; systems of neurons are called neural systems or neural networks. The various software and hardware simulations are called artificial neural systems or networks. Each neuron responds to inputs from up to 10,000 other neurons. The power of the technology is in the massive interconnectivity between the neurons. Neural networks are often simulated using large systems of ordinary differential equations, where the response of a single neuron to inputs is governed by a single differential equation. The differential equations may be solved digitally using finite difference methods or using analog electronic circuits. Large scale analog implementations seem to be beyond the current state of the art. Other implementations based on large-scale switching circuits have also been proposed.

There are currently two major thrusts in ANS research and development. One thrust, exemplified by Grossberg, S. and E. Mingolla, "Neural Dynamics of Form Perception: Boundary Completion, Illusory Figures, and Neon Color Spreading," Psychological Review, 1985, Vol 92, No. 2, pp. 173-211 (hereafter "Grossberg"), attempts to use the neural network simulations to recreate the functions of the brain. The other thrust, represented by researchers Tank and Hopfield, aims at demonstrating that many types of currently difficult problems can be solved efficiently on ANS hardware using the ordinary differential equation which also models neurons. See, Tank, D. W. and J. J. Hopfield, "Simple 'Neural' Optimization Networks: An A/D Converter, Signal Decision Circuit, and a Linear Programming Circuit," IEEE Transactions on Circuits and Systems, Vol. CAS-33, No. 5, pp. 533-541 (May 1986) (herein "Tank and Hopfield").

One of the more common models for pattern recognition known in the art is the classification model, described by Duda and Hart as follows:

"This model contains three parts: a transducer, a feature extractor, and a classifier. The transducer senses the input and converts it into a form suitable for machine processing. The feature extractor . . . extracts presumably relevant information from the input data. The classifier uses this information to assign the input data to one of a finite number of categories." Duda and Hart, p. 4.

With respect to the division between the functions of the feature extractor and the classifier, Duda and Hart go on to say:

"An ideal feature extractor would make the job of the classifier trivial, and an omnipotent classifier would not need the help of a feature extractor." Duda and Hart, p. 4.

SUMMARY OF THE INVENTION

The present invention provides a process for automating many of the pattern recognition functions currently carried out by human beings. This process advantageously combines the best features of prior art systems so that, for example, a minimum number of computations are involved, and those that are involved may be carried out on parallel processors, if needed. Further, the present invention carries out most of the pattern recognition functions at the level of a feature extractor, thereby greatly simplifying the task of classifying.

More particularly, the present invention comprises a process or method for extracting features from images, displays, and other complex signals. This process, like the known correlation matching process, advantageously recognizes large-scale features in their entirety. However, unlike such known processes, the present invention avoids the performance degradation inherent in the correlation process due to the natural variability in the appearance of objects in images. This avoidance of performance degradation is accomplished through the use of flexible templates which are caused to deform in such a way as to match features which are similar but not identical to the template.

The template deformation process used by the present invention balances two procedures, one in which highlighted features in an image or display are induced to be attractive, the other involving templates which are deformed by the attracting forces to assume the shape of the highlighted features while resisting deformation beyond allowed norms. The overall effect is that features are detected without knowing their precise shape in advance. In the case of signal detection, for example, the gain of a matched filter is attained without knowing the precise nature of the signal in advance. This technique can best be described as a form of constrained optimization, where global constraints are enforced through local computation. Advantageously, because all computations are local, massively parallel computers of simple design can be used to attain real time performance.

The method of extracting features from complex signals of the present invention may thus be summarized as a four step process: (1) producing, in response to a complex signal (such as an image signal), at least one display field of two or more dimensions; (2) generating a force field around selected features in this display field; (3) placing, through simulation or otherwise, at least one deformable template within the display field so that it can be acted upon by the forces of the force field; and (4) evaluating at least one characteristic of the template after it has converged to an asymptotic state as a result of being acted upon by the force field in order to detect and classify features within the complex signal.

The above-summarized method of extracting features from complex signals has applications in numerous areas. The apparatus of the present invention thus includes devices and systems relating to such applications. In accordance with one embodiment of the present invention, for example, a control system is provided that includes: receiving means for receiving at least one input signal, such as an image or other complex signal; feature-extraction means for extracting desired features from the input signal, which feature-extraction means includes processing mens for carrying out the feature-extracting method summarized above; and control means responsive to the features extracted from the input signal for controlling at least one element of a multi-element dynamic system.

In accordance with another embodiment of the invention, a signal processing system is provided that comprises: receiving means for receiving at least one input signal; feature extraction means for extracting desired features from said input signal, which feature-extraction means includes processing means for carrying out the feature-extraction method summarized above; and display means for displaying the extracted features in a way that facilitates evaluation and interpretation of said features.

Exemplary applications of the control system embodiment of the present invention include:

Vehicle Control ·
  Autonomous vehicles—a road or other feature is detected, classified, and continuously tracked. Obstacles are likewise detected and classified.
  Smart weapons—potential targets are detected and classified, thereby enabling a weapon to be guided to a correct target.
Reconnaissance Systems
  Aerial reconaissance—an airborne craft includes a pattern recognition system which identifies and follows linear features, such as roads and rivers, and which also identifies and photographs rectangular features, such as buildings.

Exemplary applications of the signal processing embodiment of the present invention include:

Imagery Systems
  Cartography—the presence of terrain features such as rivers, mountains or natural vegetation, or man-made features such as roads, buildings, or fields are detected and reduced to a map description.
  Intelligence—the presence of certain types of equipment on a battlefield and its mode of deployment is detected and classified.
  Medical Imaging—the presence of anomalous features in an x-ray image is detected and classified. Alternatively, the image of the normal bone and organ structure is recognized and suppressed, thus enhancing the image of anomalous features.
  ID/Security—the face of a person requesting access to a facility is classified as authorized or unauthorized.
Military Detection Systems
  Multi-target tracking—strings of blips on conventional radar displays are associated with linear structures corresponding to trajectories.
  Moving target indicator radar—very weak linear tracks produced by doppler shifted radar returns are detected in two- or three-dimensional displays.
  Active and passive acoustic ASW—as with radar, strings of blips in sonar displays are associated with linear structures related to trajectories; a large number of points may be required in low signal-to-noise situations. Signals emitted by targets are detected and classified.
Detection and Analysis of Complex Signals
  Speech processing—individual words and phrases are detected in continuous speech.
  Signal intelligence—complex, weak, and covert signals are detected, synchronized with, classified, and identified.
  Nuclear test verification—seismic signals are detected and classified as associated with explosions or normal seismic activity.
Miscellaneous
  Non-destructive testing—shadows of material flaws in x-ray and acoustic images are detected and classified.
  Oil/mineral exploration—curves in Common Depth Point (CDP) displays are detected and classified as primary or multiple reflections.

BRIEF DESCRIPTION OF THE DRAWINGS AND APPENDICES

The above and other features and advantages of the present invention will be more apparent from the following more particular description thereof presented in conjunction with the following drawings, wherein.

Figure 9:
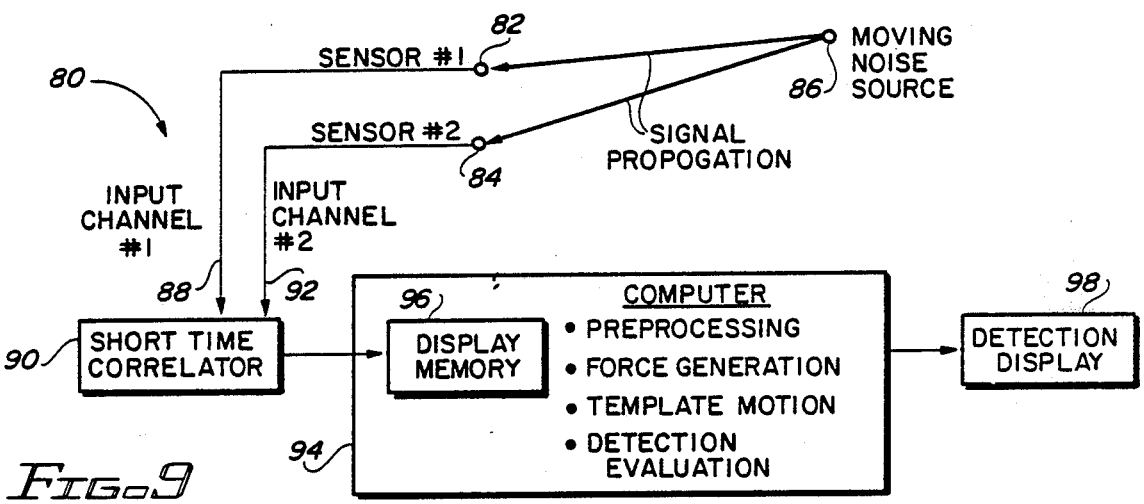
FIG. 9 is a block diagram of another embodiment of the present invention comprising a multichannel warped signal correlator system.
Figure 13:
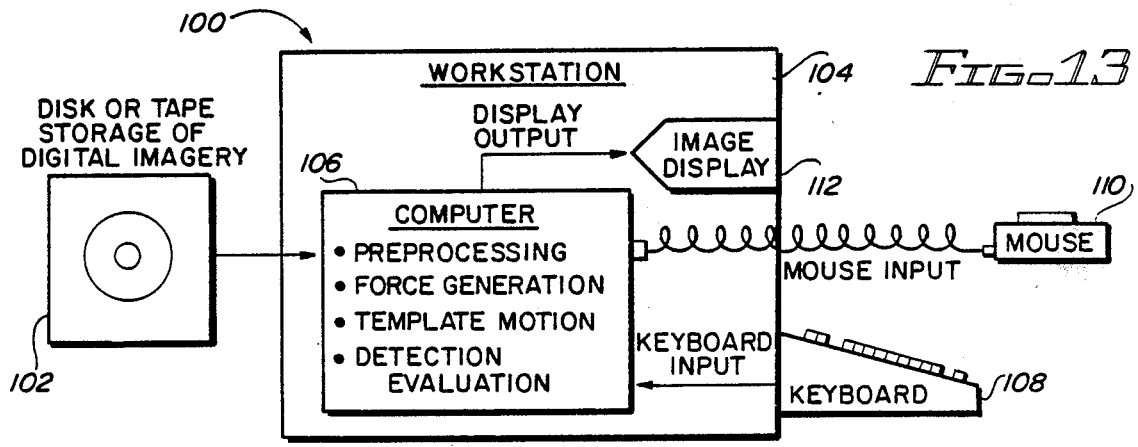
Figure 14B:
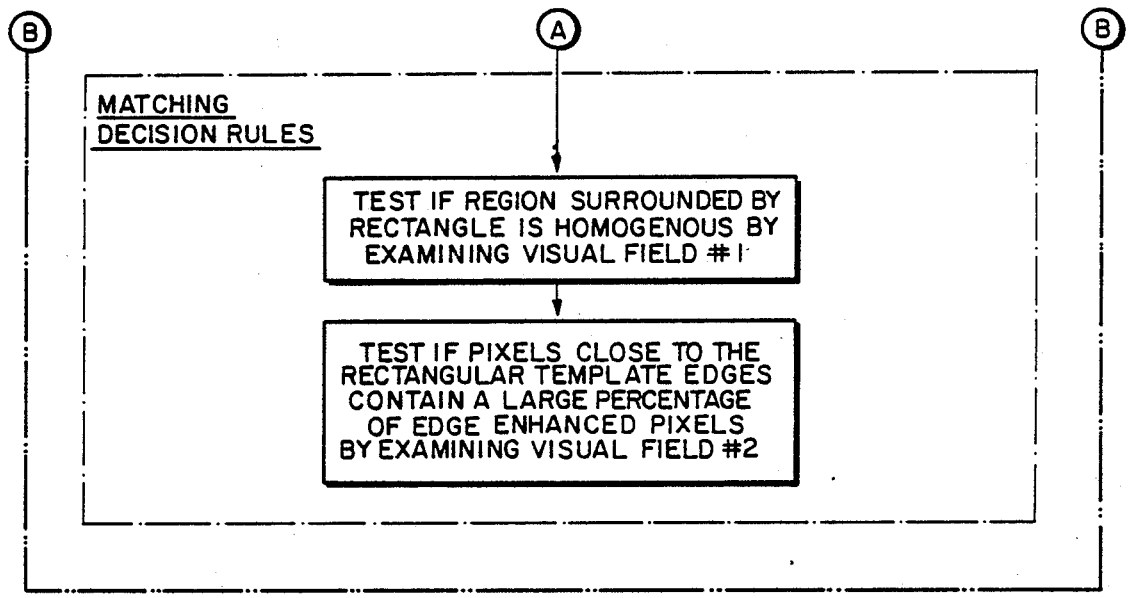
Figure 11:
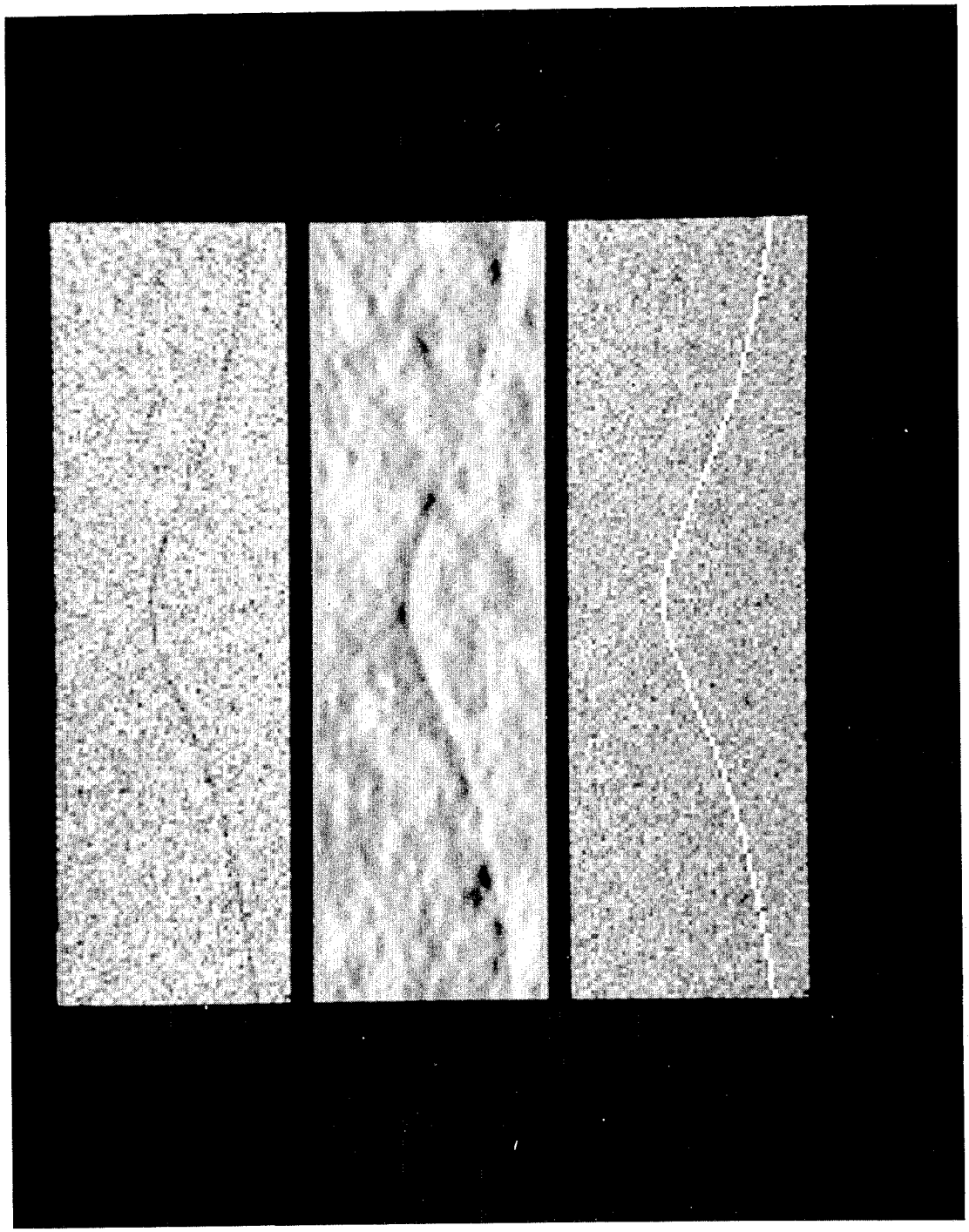
Figure 12:
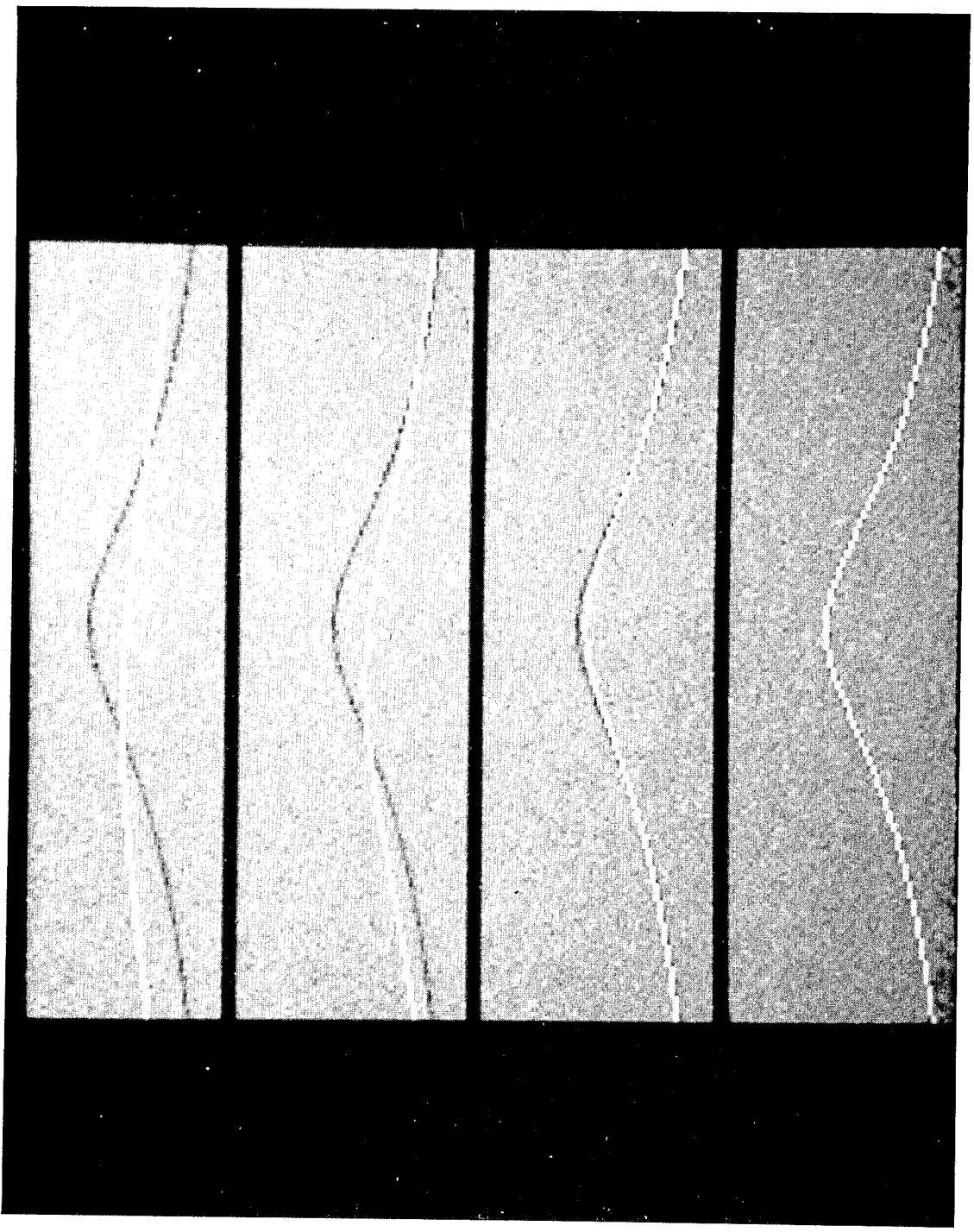
Figure 15:
Figure 16:
Figure 17:
Figure 18:
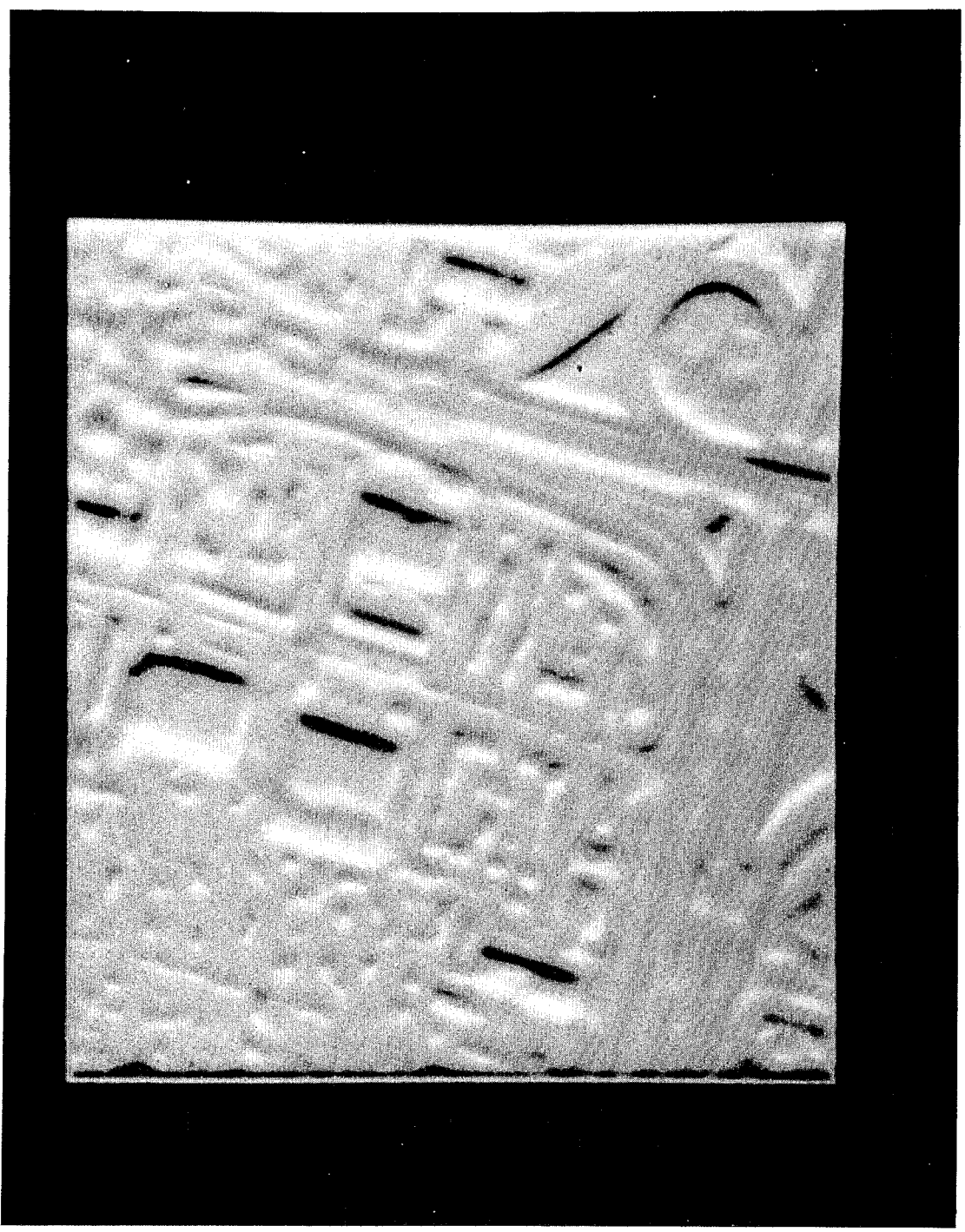
Figure 19:
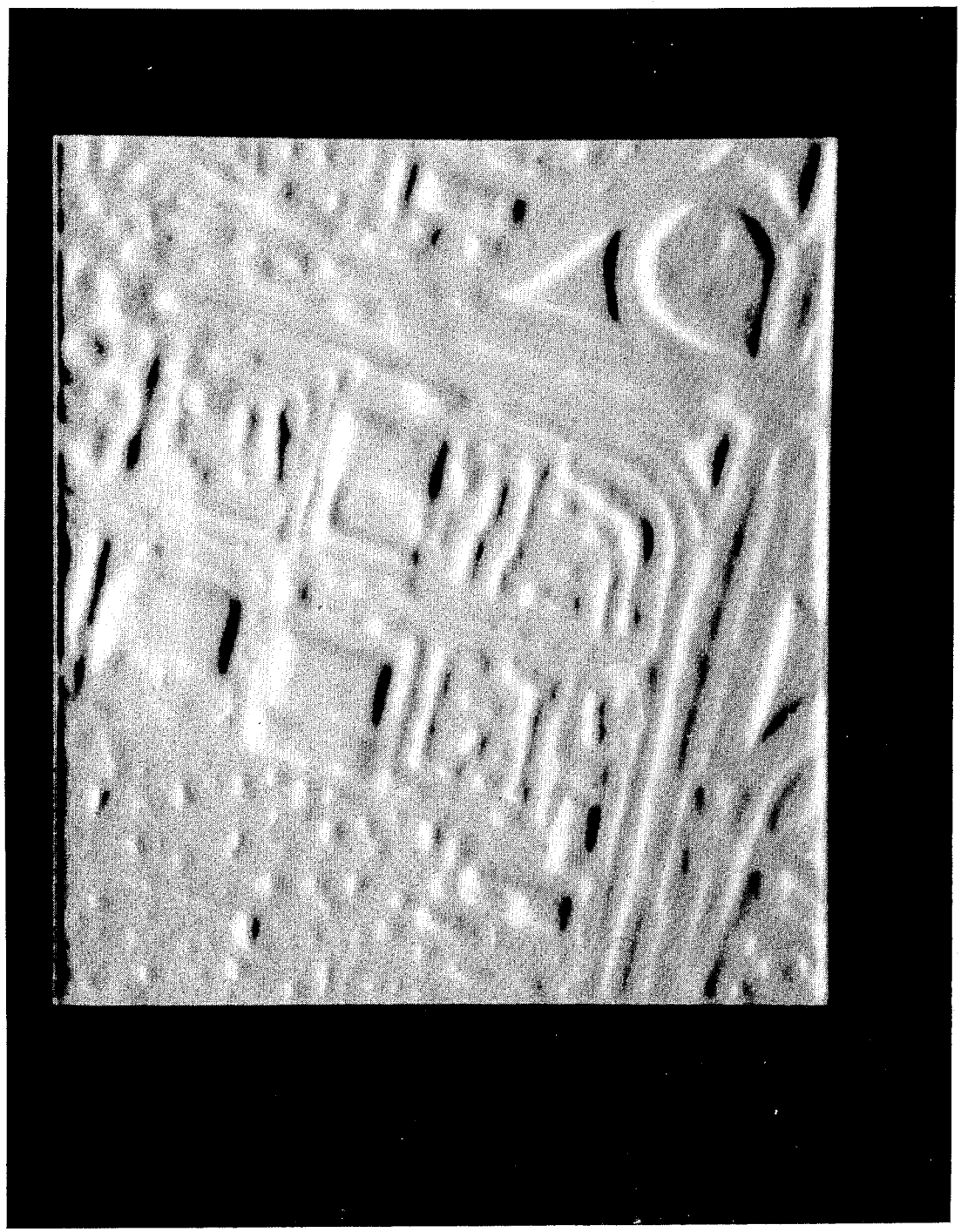
Figure 20:
Figure 21:
Figure 22:
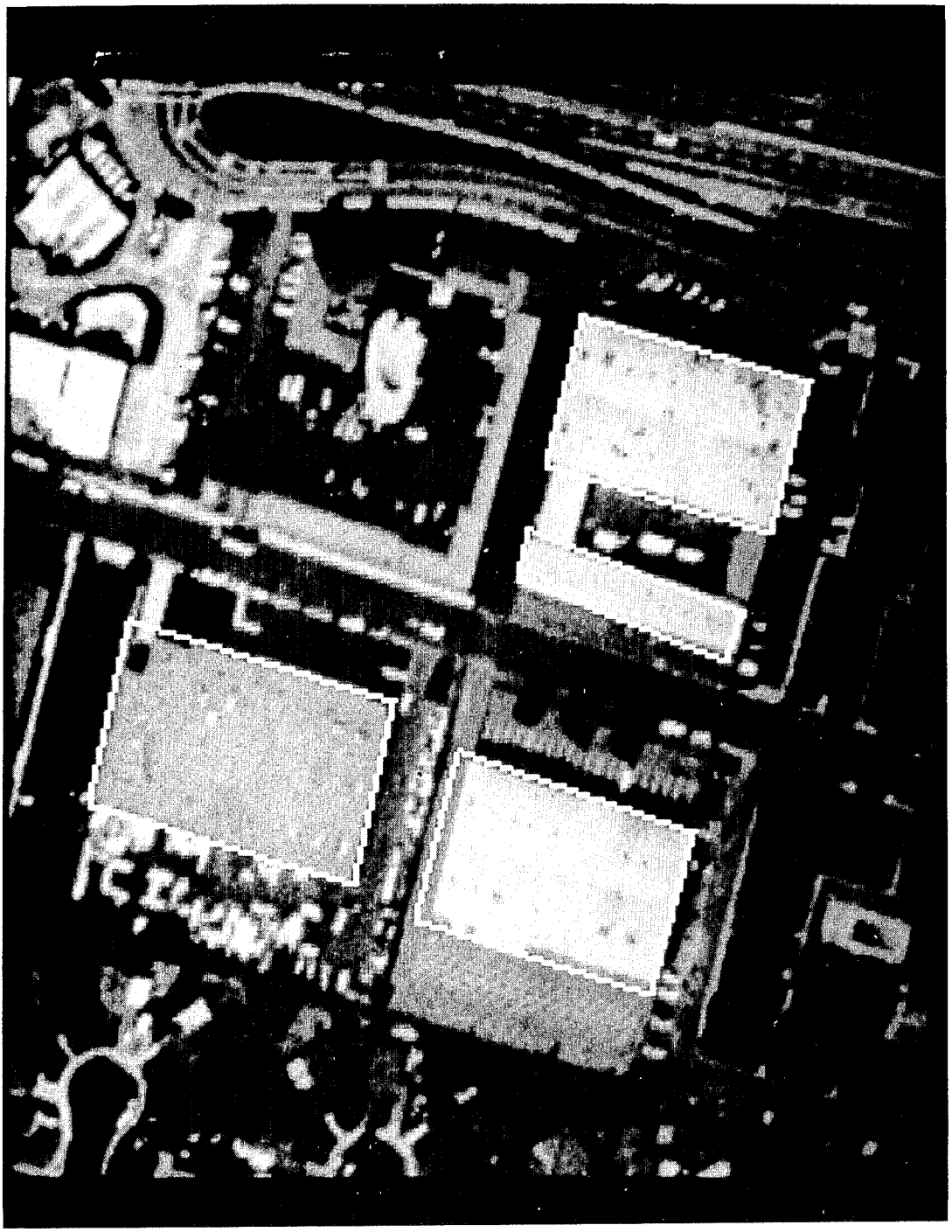
Figure 23:
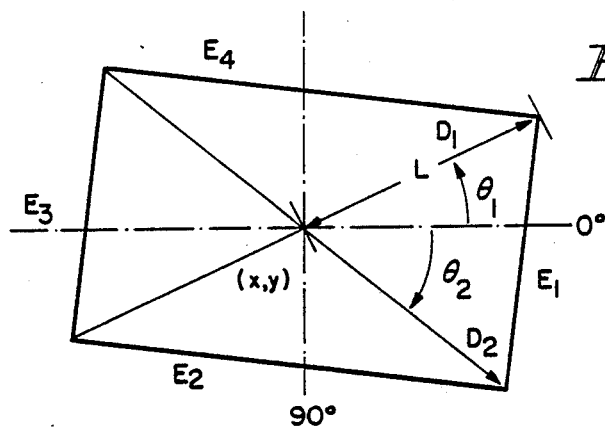
Figure 24:
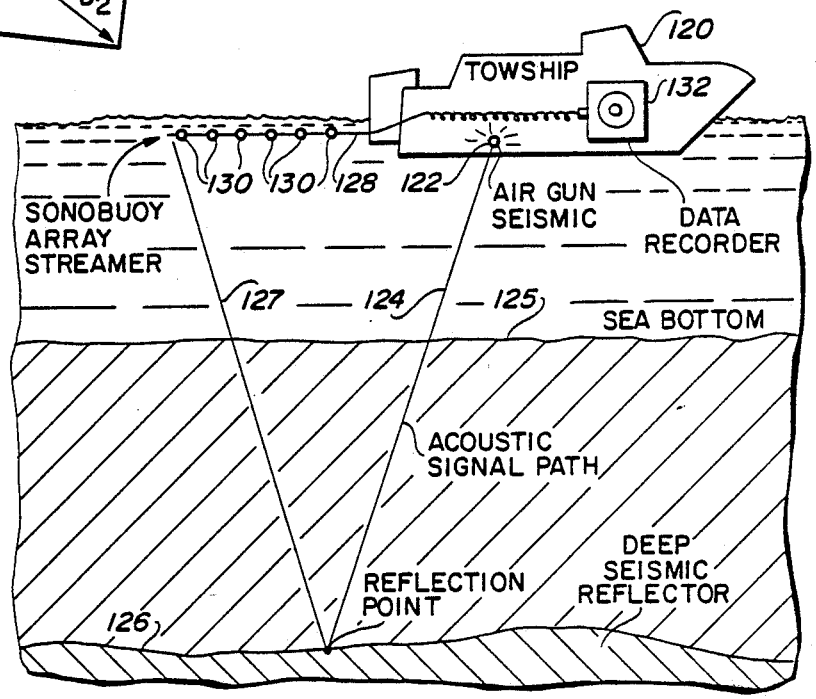
Figure 25:
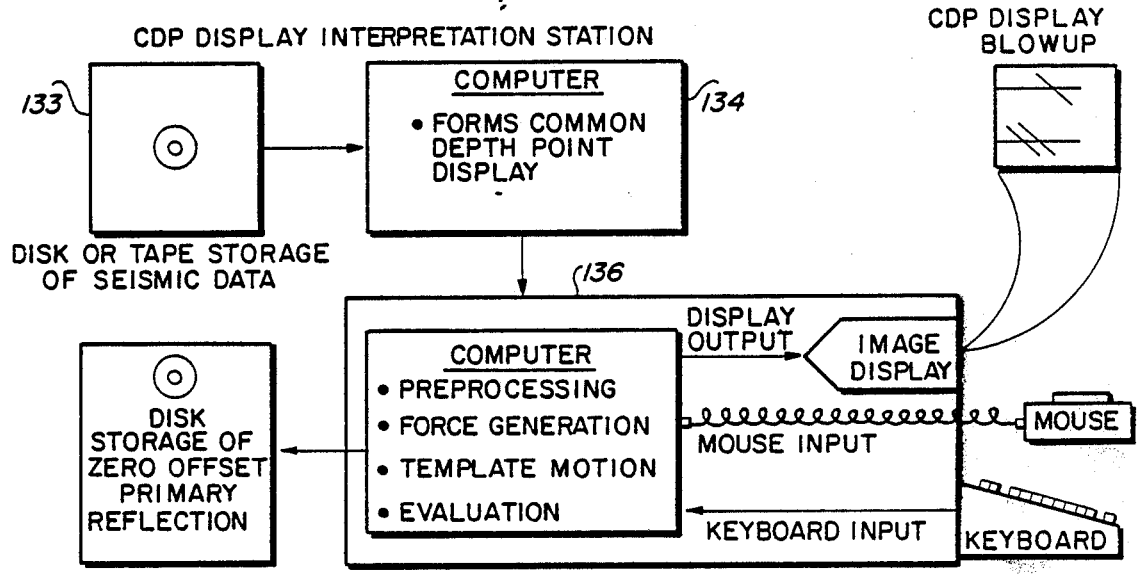
Figure 26:
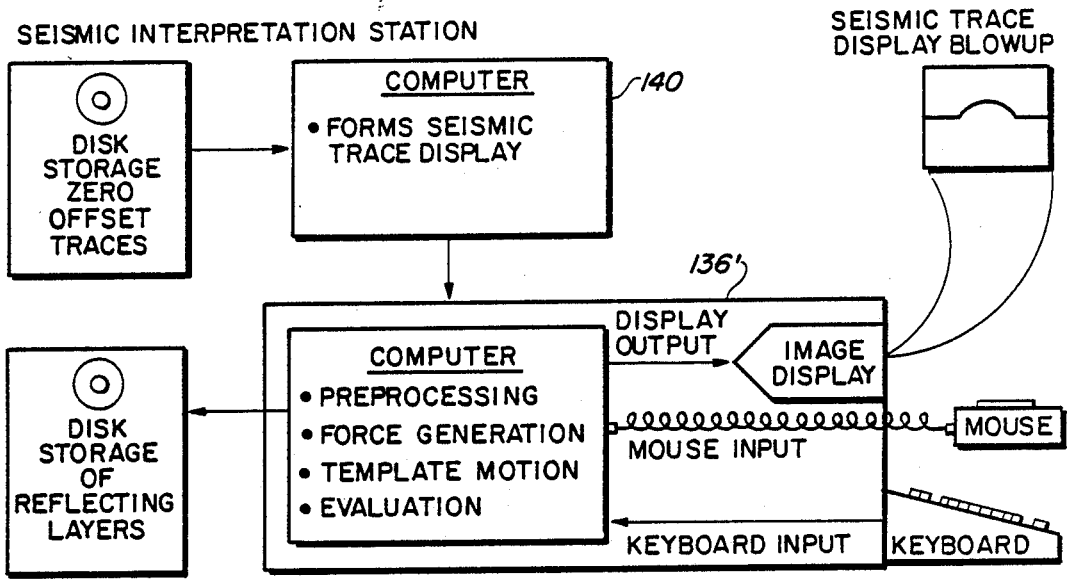
Figure 27:
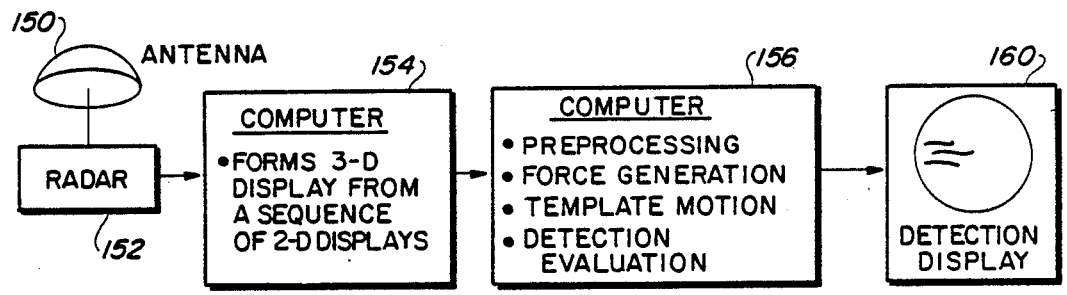
Figure 28:
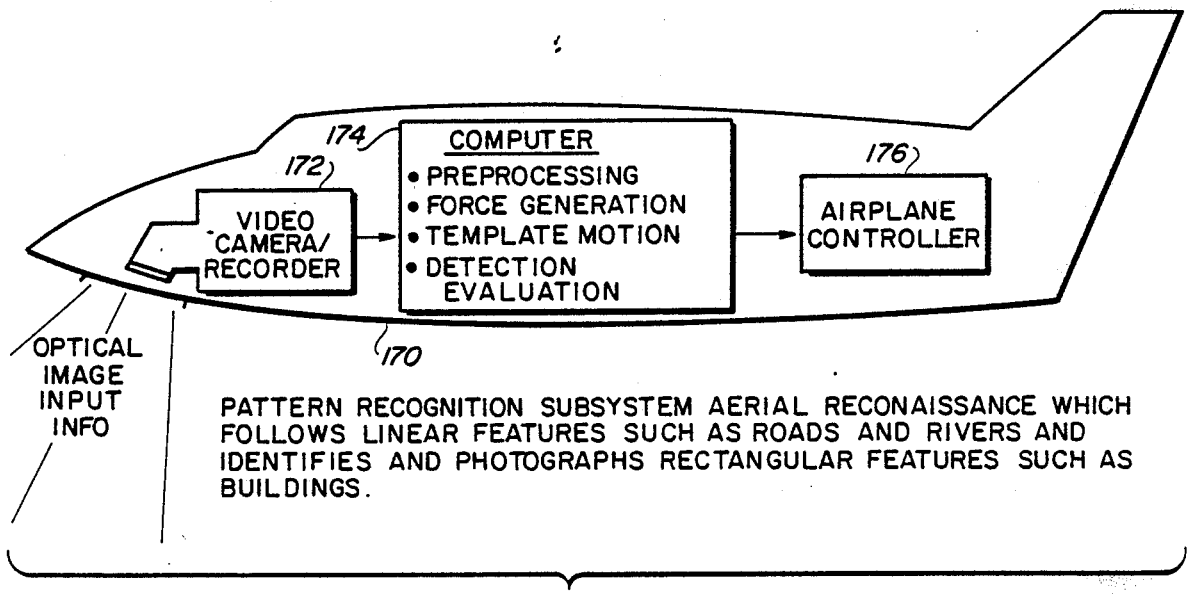

FIG. 11 is a representation of a sequence of images showing the results of the processing sequence for the detection process used in the multichannel warped signal correlator of FIG. 9, comprising (from top to bottom): (1) a display where each column is a short-time correlation between the two channels, (2) an attractive field generated by the fluid flow method, and (3) the detected position of signal track in the display;

FIG. 12 is a representation of a sequence of images showing the motion of the flexible template as it deforms to match the signal track in the display of the signal correlator of FIG. 9;

FIG. 13 is a block diagram of still another embodiment of the invention comprising an Imagery System;

FIGS. 14A and 14B are a flow chart for the feature extraction process used by the Imagery System of FIG. 13 when used for the detection of rectangular features in overhead imagery;

FIG. 15 is a sample digital image to be processed by the Imagery System of FIGS. 13 and 14;

FIGS. 16 and 17 are displays of the first and second preliminary visual fields, respectively, of the image of FIG. 15, according to the process of the present invention;

FIGS. 18 and 19 are displays of the horizontal and vertical components, respectively, of the first fluid flow generated from the first visual field of FIG. 16 according to the process of the present invention;

FIGS. 20 and 21 are displays of the horizontal and vertical components, respectively, of the second fluid flow generated from the second visual field of FIG. 17 according to the process of the present invention;

FIG. 22 is a display that shows the position of several templates as bold lines on an enlarged portion of the initial display of FIG. 15 according to the process of the present invention;

FIG. 23 illustrates a template for a rectangle finder used with the Rectangle Template Deformation subprocess of FIG. 14;

FIG. 14 is a diagram of the data gathering equipment used to collect off-shore geophysical data;

FIG. 25 is a block diagram of a workstation used to interpret the common depth point (CDP) display data derived from the data gathering equipment of FIG. 24;

FIG. 26 shows a diagram of a workstation used to interpret the zero offset primary reflection data (seismic data) obtained from the workstation of FIG. 25;

FIG. 27 is a diagram of a Radar Detection System based on a Multiscreen Track Detector Subsystem; and FIG. 28 illustrates an aerial reconnaissance system that incorporates a pattern recognition subsystem for detection of linear and rectangular features such as road, rivers and buildings.

Figure 4:
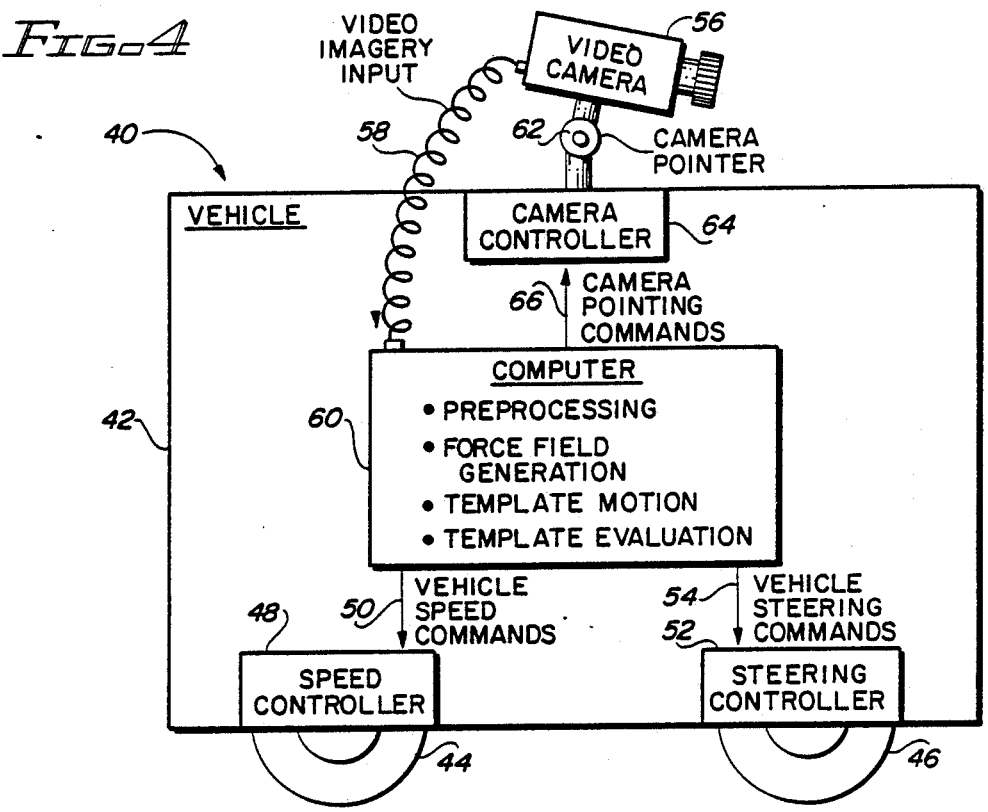
FIG. 4 is a block diagram of one embodiment of the present invention comprising an autonomous vehicle that includes a pattern recognition subsystem for control of the vehicle in following a road.

The features and advantages of the present invention will also be better understood and appreciated with reference to the following Appendices, filed concurrently herewith, wherein:

Appendix A provides a mathematical basis for the different ways in which attractive force fields due to fluid flow can be implemented;

Appendix B sets forth some examples of the differential equations which characterize the dynamics of templates;

Appendix C contains a program listing a computer program, ALV, used in connection with the simulation and operation of the autonomous road-following vehicle of FIG. 4, and includes additional figures, FIGS. C1 and C2, which are flow charts of the program ALV;

Appendix D contains listings of three computer programs, TAUGRAM, RUNTAU and FINDSUB, used in connection with the simulation and operation of the Multichannel Warped Signal Correlator System of FIG. 9, and includes additional figures, FIGS. D1, D2 and D3, which are simplified flow charts of these three programs; and Appendix E contains listings of two computer programs, RUNFLOW and FINDRECT, which are used in connection with the simulation and operation of the Imagery System of FIG. 13, and includes additional figures, FIGS. E1 and E2, which are simplified flow charts of these two programs.

DETAILED DESCRIPTION OF THE INVENTION

The following descriptions are of the best presently contemplated modes of carrying out the invention. These descriptions are not to be taken in a limiting sense, but are made merely for the purpose of describing the general principles of the invention. The scope of the invention should be determined with respect to the appended claims.

The present invention is directed to both: (1) a method for extracting features, and (2) a device or system for carrying out (applying) the method for specific applications. In the description that follows, a brief overview of the method is first presented, followed by a more detailed description of each step of the method. With an understanding of the method in hand, several different examples of applications of the invention are described, starting with brief general descriptions of a typical control system and a typical signal processing system, and concluding with more detailed descriptions of specific examples, such as a road-following autonomous vehicle, or a multichannel warped signal detector.

The Method—An Overview

Figure 1:
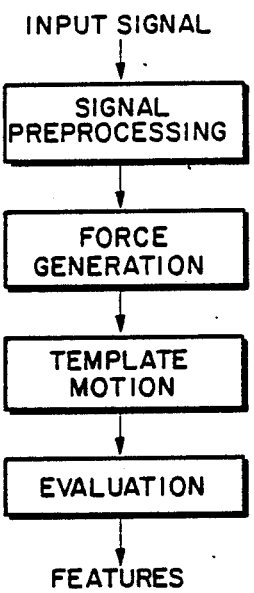
FIG. 1 is a simplified flow diagram depicting the four main steps of the feature-extraction method of the present invention.

The method of the present invention is a process for automating many of the pattern recognition functions currently carried out by human beings. This method may advantageously be applied to many different kinds of input signals, as illustrated by the various examples described below. Regardless of the type of input signal used, however, the basic method is carried out in a process of pattern recognition that includes four main steps or stages, as illustrated in FIG. 1. In the first step or stage, referred to as "Signal Preprocessing" in FIG. 1, preprocessors are applied to the input signal to produce one or more displays of two or more dimensions, which displays are called visual fields. The preprocessor for each of the visual fields is chosen so as to produce highlighted features in that visual field when certain properties of the signal are present. In the second step or stage of the process, termed "Force Generation" in FIG. 1, the highlighted features in the visual fields are caused to produce attractive forces. In the third step or stage, called "Template Motion" in FIG. 1, simple machines called templates are caused to move in the force so as to be attracted to the highlighted features, and to be deformed to match the shape of the features. Finally, in the fourth step or stage, called "Evaluation", statistical or heuristic decision rules, based on properties of the templates and properties of the display near the template, are used to detect and classify features in the image or display.

Advantageously, the process shown in FIG. 1 can be carried out physically, digitally, or in analog fashion. That is, as is described more fully below, several embodiments for fields and templates are possible. The fields and the mechanical properties of the templates are characterized by differential equations. Thus, the process may be implemented by physically constructing forces such as electric fields or fluid flows, and templates may be any suitable elements, such such as drafting or (perhaps) draftsman's splines, that move in the fields. Alternatively, the process may be simulated digitally through the use of standard techniques for solving differential equations, as described for instance in Richtmyer, R. D. and K. W. Morton, *Difference Methods for Initial Value Problems,* 2d Ed., John Wiley & Sons, 1967, pp. 271–286, 351–358 (hereafter "Richtmyer and Morton"). The process may also be implemented through analog means, such as through the use of an analog computer, in which electric circuits, designed to satisfy the differential equations, produce electrical outputs whose numerical values, when measured, correspond to the properties of the fields and templates.

The Method—A Detailed Description

As indicated in FIG. 1, the method of the present invention, in response to input signals, carries out four steps: (1) preprocessing, (2) force generation, (3) template motion, and (4) evaluation. A detailed examination of each of these steps, including the types of input signals that may be used by the invention, is now presented.

Input Signals

The process of the present invention may be applied to many different kinds of input signals. In general these signals may be classified by the following characteristics:

a. Dimensionality—This is the number of dimensions in which the signal is initially generated. Some examples of signals with dimensionality of one, two, and three are:

1-Dimension—time series such as speech,
2-Dimensions—photographs and other imagery, and
3-Dimensions—cloud chambers and time sequences of images.

b. Complexity—This is a classification of the variability of a signal as measured by the relative complexity of available models of the signal. Complexity is an empirical property, since a simple model of the signal may merely be unknown. In general, a signal will have a low complexity if all of its states can be approximated by a model with a small number of degrees of freedom. A straight line in a display is an example of a signal with low complexity, since there is a two-parameter model for straight lines in the plane. Human speech is an example of a signal with a high complexity, since there is as yet no model which characteristics speech in terms of a few variables.

c. Signal-to-Noise Ratio—This is a measure of the strength of the information-bearing portion of the signal relative to the non-information-bearing portion of the signal. Generally, in military applications such as radar or sonar, signals have low signal-to-noise ratios, since detection at extreme distances is required. In machine vision applications or speech recognition, the signal may commonly be quite clear and noise-free.

d. Space-bandwidth product—This is a measure of the number of independent samples of data in the signal. In standard digital signal processing, this quantity, usually called the time-bandwidth product, is calculated as the number of samples per unit time (the bandwidth), times the length of time over which samples are taken. The larger number of samples associated with a large time-bandwidth product is usually exploited to average out purely random noise features in a signal. In digital image processing, the space-bandwidth product relates to the degree to which a given feature is resolved, i.e. the number of pixels per unit area times the area of a given feature.

Step 1: Preprocessors

The first step or stage of the process of the present invention, as shown in FIG. 1, is Signal Preprocessing. It is during this stage that the original signal or image is processed to produce two-dimensional or higher dimensional displays (more generally, visual fields) in which features of interest are enhanced. There may be one or several such displays used in a given application.

If the initial signal quality is low, standard processing techniques, such as filtering and amplification, may be applied. If the signal is a time series, such as an electromagnetic or acoustic signal, filters may be used for the purpose of noise reduction. In the case of imagery, quality may be enhanced by smoothing, optimal filtering, contrast enhancement through histogram modification, or multispectral enhancement through false color processing.

After enhancement, the signal is processed to display form. This may be the standard display associated with an application, such as a standard sonar or radar display. An example of a standard sonar display is the tau-gram display described below in connection with Example 2, a Multichannel Warped Signal Correlator. For other applications, however, it may be desirable to combine a sequence of displays into a single higher dimensional display. For instance, for radar tracking a sequence of two dimensional displays may be stacked in time order; returns from a particular target then form a linear sequence in a three-dimensional display. Alternatively, in image interpretation applications, a single image may be decomposed into several images of different colors or intensity levels.

Finally, each of the displays is used to produce one or more visual fields in which particular features are enhanced. A visual field is a two-dimensional or higher-dimensional array of numbers in which a larger number at a particular location in the array is associated with the presence of a particular feature in the display at that location. The visual field may be the original display, as in a radar display where target tracks already appear as bright lines in the display. Alternatively, a visual field may be generated in which features such as road edges in the original display appear as bright lines in the visual field. Similarly, visual fields may be created in which regions of a particular texture, color, or combination of texture and spectral properties are enhanced.

In order to better understand and appreciate how two- or higher dimensional visual fields are generated during examples of several types of displays and visual fields are now presented:

a. In the road-following example, discussed more fully below in connection with Example 1, a two-dimensional image display of a road is processed to produce a single visual field in which the road edges appear as bright linear tracks.

b. In the multichannel warped signal correlator example, discussed more fully below in connection with Example 2, a one-dimensional acoustic time series is processed to produce a single two-dimensional display, containing one or several linear tracks. The display itself is used as the visual field.

c. In the rectangle-finder example, described more fully below in connection with Example 3, a two-dimensional overhead image display of an urban scene is processed to produce a pair of visual fields. In one visual field, large regions of homogeneous brightness are enhanced based on texture. In the second, the edges of the regions are enhanced.

Step 2: Force Generation

In the second step or stage of the process, a computation is carried out in which simulated force fields are generated which will attract templates toward the enhanced features in the visual fields. (Concurrently with, or alternatively to, the generation of attractive force fields, force fields could be generated which will repel templates away from non-enhanced features in the visual field.) These simulated force fields are generated by simulating physical processes in which the brightness level at a given pixel in the visual field is identified with a certain quantity of a physical property which itself generates an attractive force.

Several examples of physical analogies which can be used to generate attractive forces are:

a. Low pressre regions—In a compressible fluid or gas, low pressure regions attract material from regions of relatively higher pressure. When the reciprocal of intensity in a visual field is interpreted as a pressure field in a compressible fluid then fluid flows toward the enhanced regions. The moving fluid then produces a drag force on objects in the fluid. One formulation of the equation governing compressible fluid flow is the set of hyperbolic conservation laws with the equation of state, $p=\rho$, $$\frac{\partial U}{\partial t} + \frac{\partial}{\partial x} F(U) + \frac{\partial}{\partial y} G(U) = 0,$$

where $$U = \begin{pmatrix} \rho \\ m \\ n \end{pmatrix},$$

$$F(U) = \begin{pmatrix} m \\ m^2/\rho + p \\ mn/\rho \end{pmatrix},$$

$$G(U) = \begin{pmatrix} n \\ mn/\rho \\ (n^2/\rho) + p \end{pmatrix},$$

and m and n are the x and y components of momentum, and $\rho$ is the density. Finite difference methods for the solution of these equations on digital computers are given in Richtmyer and Morton. Several different ways of implementing the attractive force fields due to fluid flow are presented in Appendix A.

b. Distributions of mass, electrical charge, or fluid sources and sinks. All of these phenomena produce fields of force which can be calculated using the potential equation:

$$u_{xx} + u_{yy} = f(x,y)$$

The potential equation is a partial differential equation of elliptic type whose method of solution is described in chapter 4 of Courant, R. and D. Hilbert, *Methods of Mathematical Physics*, Vol. II, John Wiley & Sons, 1962, pp. 240–313. (hereafter "Courant and Hilbert"). When the intensity in a visual field is interpreted as a distribution of mass, and identified with the right-hand-side of the potential equation, then the gradient of the solution of the potential equation is a gravitational field in which objects are attracted toward the enhanced regions. Similarly, when the intensity in a visual field is identified with a distribution of electrical charge, then the gradient of the solution of the potential equation is an electrical field which attracts objects of opposite charge to the enhanced regions.

Another physical analogy with the potential equation is fluid flow between a distribution of fluid sources and sinks in an irrotational fluid as described in Batchelor, G. K., *An Introduction to Fluid Dynamics*, Cambridge University Press, 1962, pp. 84–93 (hereafter "Batchelor"). The image intensity is identified with the local rate of expansion of the fluid. The brighter, enhanced regions are associated with a distribution of fluid sinks, and the darker regions are associated with fluid sources. When this distribution of sources and sinks is identified with the right-hand-side of the potential equation, the gradient of the solution of the potential equation is the velocity of a fluid toward the enhanced regions.

c. Peaky Function Convolution—Attractive forces may also be generated by convolving a given image with a peaky function and taking the gradient of the result. This is analogous to solving a partial differential equation using a Green's function.

Step 3: Template Motion

In the third step or stage of the process, templates are caused to move and deform within the attractive or other force fields. As opposed to standard correlation methods, where templates are placed in every allowable position and tested for a match, in the present method the templates need only be close to a match. When close enough in position to a matching feature, the template is moved by the attracting forces to the correct position. Furthermore, the forces may rotate the template into the correct orientation or deform it to match one of a general class of features in the visual fields. The dynamics of the templates are modeled based on equations of mechanics or partial differential equations for common processes in modern physics.

In general, templates may be characterized by the following characteristics:

a. Dimensionality—Examples are:
   1-Dimension—a line for tracking in a radar display,
   2-Dimension—a rectangle for matching roofs of buildings,
   3-Dimension—a sphere for matching fuel tanks in stereo pairs of images.

b. Topology—Topology relates to:
   (1) the shape of the template, i.e. round, square, or irregular;
   (2) the number of holes in the template; and/or
   (3) the number of separate pieces in the template, also known as "connectivity".

c. Degrees of freedom

A small number of degrees of freedom refers to a template, such as a parametrized curve, that may move and deform only within the constraints of the parameters.

A large number of degrees of freedom refers to a template having a large but finite number of degrees of freedom, such as the finite-difference simulation of a flexible stick.

An "infinite" number of degrees of freedom refers to a template having an infinite number of degrees of freedom, such as the physical or analog realization of a flexible stick.

d. Dynamics:

Rigid—A template may be a rigid body in the sense of classical mechanics, whose only degrees of freedom are translation or rotation, and whose translational and rotational velocities are calculated from the attractive fields.

Parametrized—A template may be a curve, i.e., characterized by several parameters, where the parameters are generalized coordinates and the generalized velocities are calculated from the attractive fields.

Flexible—A template may be flexible, such as a rubber band, a flexible stick, or elastic membrane, for which generalized velocities may be calculated for each point on the template based on the attractive fields.

Hinged—A template may be hinged, comprising several pieces, each with its own dynamics, which are joined at endpoints or edges and where the joint acts as a hinge around which the pieces may rotate.

Multiple-part—A template may be comprised of many pieces connected by springs, each with its own dynamics, the pieces being joined at several points or edges by springs which constrain the motion of the individual pieces, Subject to Several forces—A template may also react to several forces. That is, a template may include one or several pieces which are each responding to some specified degree to each of several different attractive forces.

Appendix B sets forth some examples of the differential equations that can be used to characterize template dynamics.

Step 4: Evaluation

In the fourth and final step or stage of the method of the present invention, applied after the template motion of step 3 has occurred, an evaluation is performed of the final template location, orientation, and shape in order to determine the location, orientation and shape of the feature that attracted the template. That is, at the conclusion of step 3, many templates may be distributed over the display, each having been acted upon by the various force fields associated with the enhanced features, the templates having converged to an asymptotic state. The asymptotic state of each of the templates provides a hypothetical location, orientation, and shape for a feature in the display. Decision rules are thus used to accept or reject the hypothesis.

Discriminants to delineate between accepted and rejected hypotheses can be based either on properties of the templates or on properties of the displays and visual fields near the templates. For instance, a discriminant may test the parameters describing a template. When these parameters lie outside certain acceptable bounds, the hypothesis is rejected. Another class of discriminants may test properties of the image near the template or near certain portions of the template to determine if they lie within certain acceptable bounds. Two other types of discriminants are the following:

a. Template clustering—Clustering is the grouping of similar objects. In situations where features have a very low signal-to-noise level, it may be impossible to see the features in the display. However the effect of the feature may be observed. one approach to identifying features at low signal-to-noise level is to use a large number of templates, each starting from a different initial position. If a large fraction of them cluster close together around a given point, then it is likely that there is a feature in the image which has attracted them. When the number of templates clustering together exceeds a certain threshold, the hypothesis of the presence of a feature is accepted. The algorithmic process of identifying clusters in data is described in Hartigan, J. A., *Clustering Algorithms*, John Wiley & Sons, 1975, pp. 1-27 (hereafter "Hartigan"). Such an algorithm is based on a notion of distance between pairs of templates. for parametrized templates, the distance may be defined as the absolute difference between the respective parameters of two templates. For flexible templates, such as the vibrating rod, the distance may be the RMS distance between the rods.

b. Potential tracking—Another type of discriminant tracks the decrease in potential energy as a template converges from its initial position to its asymptotic state. This process is analogous to rolling a ball over a surface to find deep holes. After the ball has rolled to the bottom of a hole, one can measure the change in altitude of the ball. If there is a large drop in altitude, then it is likely the ball is in a deep hole. Similarly, when the attractive field is a potential field, i.e., a gradient of a function, standard techniques known in the art, see, e.g., Landau, L. D. and E. M. Lifshitz, *Course of Theoretical Physics*, Vol. 1, Mechanics, 3d Ed., 1976, pp. 1-24, 96-130 (hereafter "Landau and Lifshitz"), show how to calculate the potential energy of a template from the Hamiltonian formulation of the dynamical equations, without the dissipative term. When the potential energy falls by more than a specified amount, the hypothesis is accepted.

The Method—An Analogy and Summary

Each of the four steps in the method of the present invention, as described above and as supported by the material in Appendices A and B, is based on standard equations and techniques of applied mathematics and mathematical physics, as is the computer solution of the equations. However, the combination of these four steps in the manner proposed, and the application of these techniques for the purpose of detecting and interpreting features in images, displays and complex signals, is believed to be unique. The effect of the total process can be best appreciated in terms of a simple analogy. Suppose that the feature of interest is a straight slit in the bottom of a shallow tray of water. Water is draining from the tray through the slit. A toothpick is floating on the water. As the water drains, the toothpick is carried toward the slit, rotates to line up with the slit and falls through the slit. When this happens, the presence of the slit is detected. At the same time the position and orientation of the slit are discovered. This toothpick is the template. The drag force on the toothpick produced by the fluid motion is the attractive force.

Through computer simulation, more complicated templates consisting of collections of points and geometric shapes have been shown to converge to similar shapes in images. In the road-following example presented as Example 1 below, for instance, a general class of long curves is found to attract a long, straight, but deformable template. Depending on the rigidity of the template, it assumes the shape and position of curves in the image which attract it. Through this heuristic approach, a high level hypothesis about the position, orientation, and shape of the road edge in the image is generated.

The major strength of the method described herein is the informed use of structural knowledge about the things it is looking for, contained in the topology and dynamics of the flexible templates. Global structural properties of templates are enforced through local computation. This is a powerful concept—long rigid templates can find long objects even though there may be breaks due to noise in the object image.

APPLICATIONS OF THE INVENTION

Figure 2:
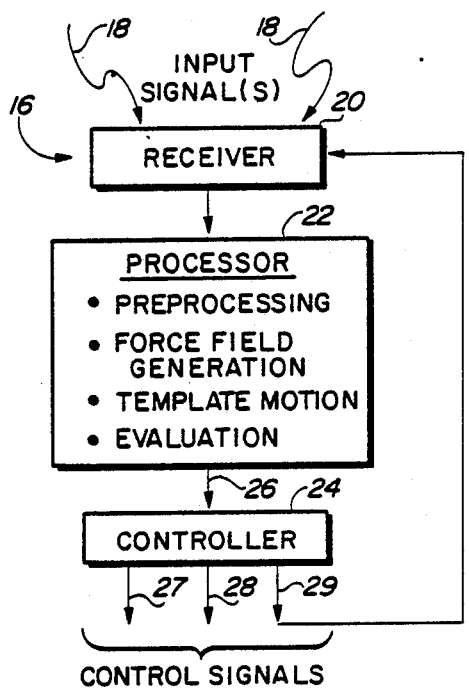
FIG. 2 is a block diagram of a control system that utilizes the method of the present invention in order to extract features from an input signal and then uses these extracted features to generate control signals for controlling a desired function.

A CONTROL SYSTEM—Referring next to FIG. 2, a block diagram of a generalized control system 16 is shown. An input signal, represented by wavy lines 18, is received by a conventional receiver 20. The receiver 20 may comprise any known or yet to be known device that collects and processes input signals, of any type, whether the input signals are classified as optical, electromagnetic, infrared, ultraviolet, RF, audio, or any other type of informational signal. The receiver may include a transducer for converting the raw input signal into a suitable form for further processing, and may also include one or more preamplifiers to strengthen and buffer the signal.

After the input signal 18 is received, it is presented to a processor 22. The processor 22 may take any number of forms, but typically it is realized with a suitable computer. The computer is programmed to carry out the four steps of the above-described method. That is, the computer preprocesses the received input signal in order to enhance selected features; generates an appropriate force field associated with the selected features; generates templates that are allowed to move and deform in response to the forces of the force fields; and then, after the templates have settled to an asymptotic state, evaluates the location, orientation, and position of the templates in order to identify the enhanced features of the input signal. Based on this final evaluation, a processor output signal(s) is sent to a controller 24 over signal line(s) 26. In response to this output signal, which output signal represents the extracted features from the input signal, the controller 22 generates appropriate control signals, on signal lines 27, 28, and 29, which control signals can then be used to carry out desired functions.

One of the control signals, such as the control signal on signal line 29, may be fed back to the receiver 20. This fed-back signal can control, for example, the repositioning of the receiver so as to better receive the input signal, and/or the readjustment of the gain of a preamplifier within the receiver so as to keep the signal strength of the input signal, as presented to the processor 22, within acceptable limits. The other control signals, such as those on lines 27 and 28, can likewise be used to perform any desired function, such as the starting/stopping of a motor, the actuation of a solenoid or pneumatic device, or other desired activity.

Figure 3:
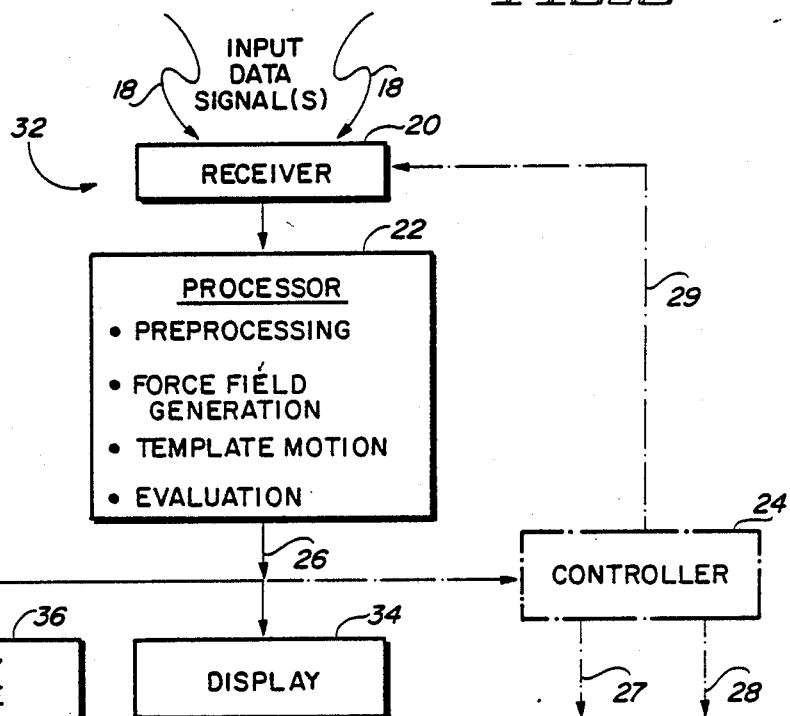
FIG. 3 is a block diagram of a signal processing system that utilizes the method of the present invention in order to aid in the display and interpretation of an input signal.

A Signal Processing System—Referring next to FIG. 3, a block diagram of a generalized signal processing system 32 is illustrated. In many respects, the signal processing system 32 of FIG. 3 is the same as the control system 16 of FIG. 2. Therefore, like numerals are used to identify like parts between these two and other figures.

In FIG. 3, a receiver 20 receives one or more input signals 18, which input signals are then processed in processor 22 according to the above-described method for the purpose of extracting selected features therefrom. The output signal(s) from the processor 22 of FIG. 3 are delivered to a display device 34, whereat the extracted features may be displayed and observed for the purpose of interpretation or other analysis, as desired.

The display device 34 may take any of a number of different forms. It can be a conventional CRT display, an X-Y plotter, a printer, a flat-screen LCD display, or combinations of these or similar devices.

The features that are extracted from the input signal may also be stored, in a suitable memory device 36, for the purpose of later retrieval and analysis. The memory device may also take many forms, such as a disk drive (magnetic and/or optical), a tape drive, or other non-volatile storage devices.

It will be appreciated by those skilled in the art that the generalized control system 16 of FIG. 2 can, if desired, readily be combined with the generalized signal processing system 32 of FIG. 3, as suggested by the phantom lines in FIG. 3. Such a combination advantageously provides a controlled signal processing system that can, for example, lock onto and track a given input signal.

EXAMPLE 1: An Autonomous Road-Following Vehicle

Referring next to FIG. 4, a block diagram of an autonomous vehicle 40 is shown. The vehicle 40 includes a body 42 suitably mounted on a first set of wheels 44 and a second set of wheels 46. A speed control subsystem 48 is coupled to the first set of wheels 44 for the purpose of driving said wheels at a desired speed as a function of vehicle speed command signals 50. Similarly, a steering control subsystem 52 is coupled to the second set of wheels 46 for the purpose of turning said wheels as desired as a function of vehicle steering command signals 54. Thus, the vehicle 40 can be driven at any desired speed and steered as required by generating appropriate command signals 50 and 54. The design and construction of the vehicle body 42, first and second sets of wheels 44, 46, speed control subsystem 48, and steering control subsystem 52 may be conventional, the details of which are not important to the present invention.

Suitably mounted on the vehicle body 42 is a video camera 56. The video camera 56 is electrically connected to an on-board computer 60 by way of a suitable video cable 58. The camera 56 is mechanically attached to the vehicle body 42 by way of a camera pointer arm 62. This arm 62 can be tilted or rotated as controlled by a camera control subsystem 64. The camera control subsystem 64 responds to electrical camera pointing command signals 66. Hence, the camera 56 can be pointed in any desired direction at any desired orientation by generating appropriate command signals 66 that control the arm 62 in conventional manner.

The on-board computer 60, and associated interface circuits, receives the video signal from the video camera 56 over video cable 58, processes the video signal in accordance with the feature-extraction method of the present invention in order to identify the edges of a road on which the vehicle is positioned, and generates the appropriate speed command signals 50, steering commands 54, and camera pointing commands 66 in order to cause the vehicle 50 to drive along the road.

Figure 5A:
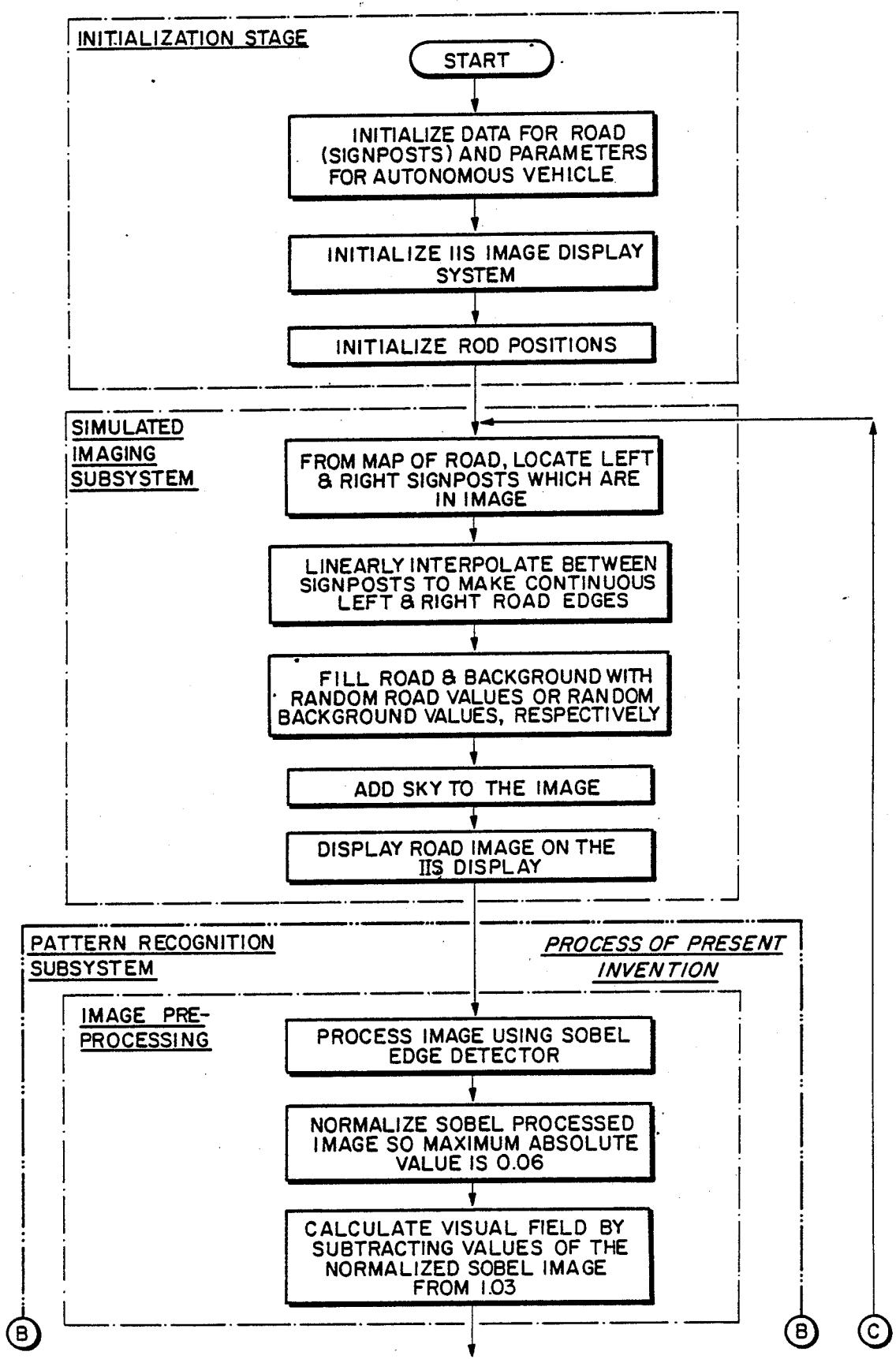
FIGS. 5A and 5B are a flow chart for the pattern recognition and control process used by the autonomous vehicle of FIG. 4.
Figure 5B:
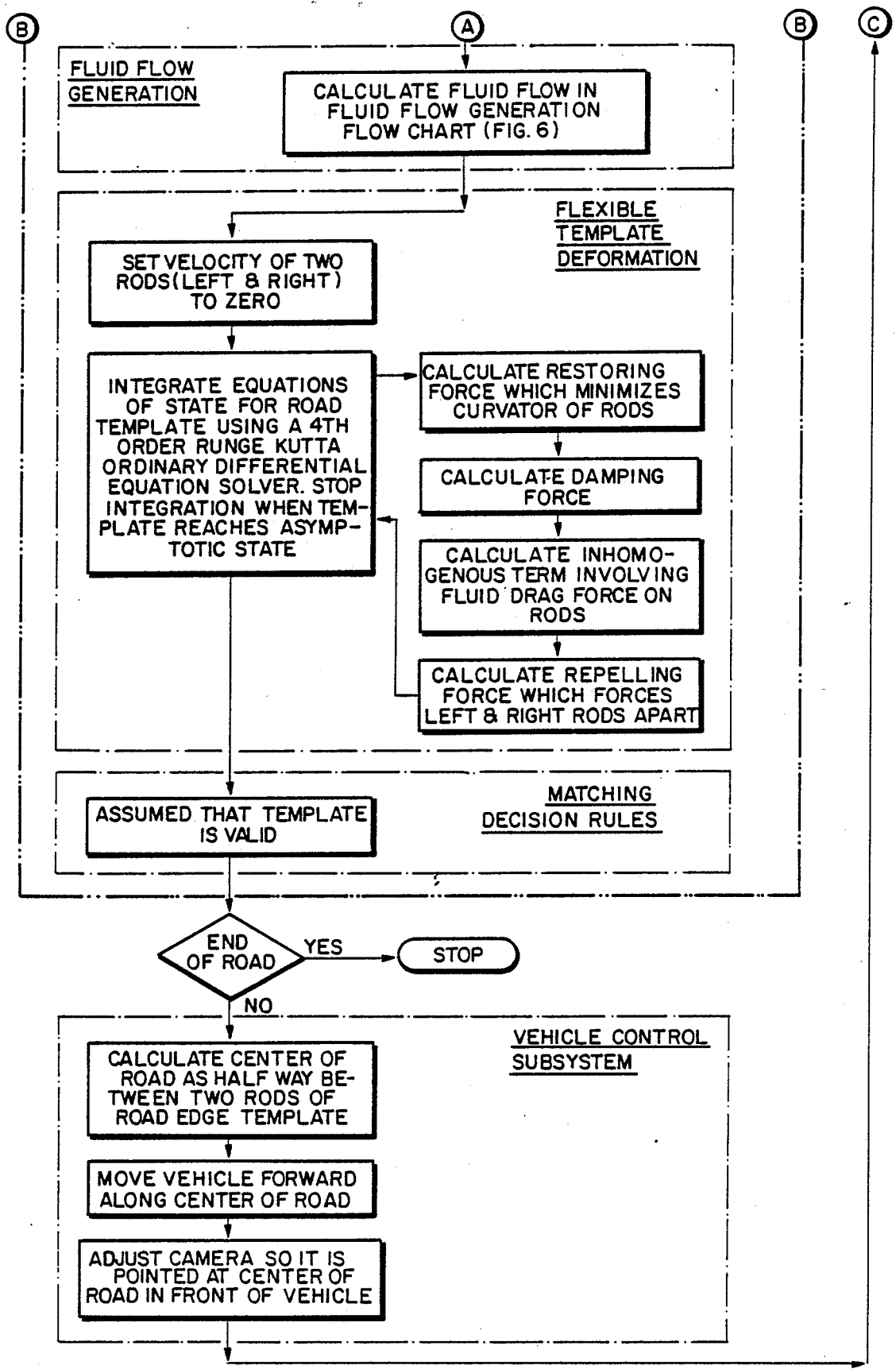

A simulation of the autonomous vehicle 40 following a road as shown in FIG. 4 has been implemented. The software was written in FORTRAN and runs on a VAX 11-785 computer with image displays appearing on an IIS display. A flow diagram of the program used for carrying out the simulation is shown in FIGS. 5A and 5B. This program is divided into four subsystems: (1) initialization; (2) simulated image; (3) pattern recognition; and (4) vehicle control. Each of these subsystems will now be described in more detail. The subsystems thus described can be readily adapted by those skilled in the art for use with an actual autonomous vehicle 40 of the type shown in FIG. 4.

After an initialization stage, the first subsystem, labeled "Simulated Imaging Subsystem" in FIG. 5A, produces a simulated image of a road. The simulated road image is generated from a table of points called sign posts which lie along the edges of the road. A list is tabulated of the set of sign posts that would be seen in the image frame of a camera located atop the vehicle. The positions of the sign posts are plotted in the image frame as seen in proper perspective for a camera atop the vehicle. The boundaries of the road are straight lines connecting the positions of consecutive sign posts. The road and background are set to different brightness levels in the image, the road darker than the background. A level of spatial white noise is added to the image. A bright horizontal stripe is added across the top of the image to simulate a horizon and sky. The image is then displayed in the IIS display, as shown in the first frame (1) of FIG. 7. (It is noted that the Simulated Imaging Subsystem herein described merely simulates the video signal and image that would be obtained from the video camera 56 positioned atop the vehicle 40 of FIG. 4.)

Figure 7:
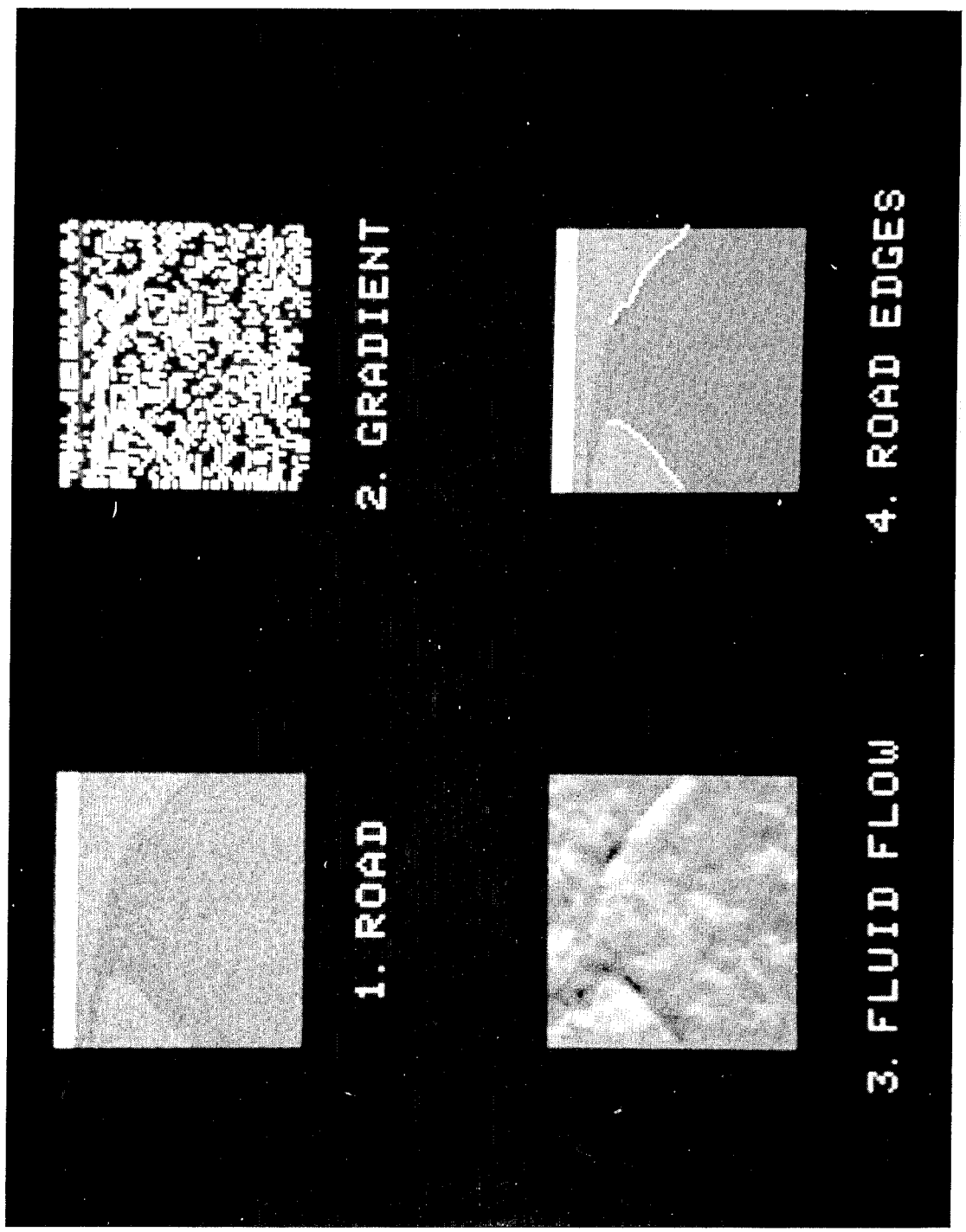
FIG. 7 is a representation of a sequence of images showing the results of the processing sequence for the pattern recognition function of the autonomous vehicle of FIG. 4, comprising: (1) a road image, (2) an edge enhanced version of the road image, (3) an attractive field generated by the fluid flow method, and (4) the detected position of the road edges.

A second subsystem, labeled "Pattern Recognition Subsystem", carries out the feature-extracting method of the present invention. For this road-following application, this method comprises four subprocesses: (1) Image Preprocessing, (2) the Fluid Flow Process, (3) the Flexible Template Deformation, and (4) the Matching Decision Rules. Frames (2)-(4) of FIG. 7 show the results of the first three subprocesses.

In the first subprocess of the Pattern Recognition Subsystem, labeled "Image Preprocessing" in FIG. 5A, the initial road image is processed so as to enhance the road edges. This is accomplished using a Sobel edge enhancement algorithm. Sobel edge enhancement, as described in Pratt, p. 487, is based on a 3 by 3 nonlinear edge enhancement operator. For each point in the image, the 3 by 3 square consisting of all of the neighboring squares is numbered according to the following pattern:

| A0 | A1 | A2 |
|----|----|----|
| A7 | PT | A3 |
| A6 | A5 | A4 | where PT is the point of interest. The intensity values at the locations labeled A0-A7 are then combined according to the formula:

$$G = \sqrt{X^2 + Y^2}$$

where, $$X = (A2 + 2A3 + A4) - (A0 + 2A7 + A6),$$

$$Y = (A0 + 2A1 + A2) - (A6 + 2A5 + A4).$$

The resulting value G is stored in a visual field at the location corresponding to the position in the original image of the point PT. The visual field resulting from the application of the Sobel process to the road image in frame (1) of FIG. 7 is shown in frame (2) of FIG. 7.

The visual field resulting from Sobel processing has all positive entries. In preparation for the generation of the fluid flow field, the visual field is modified by normalizing the visual field to have a maximum value of 0.06. This is accomplished by dividing all entries in the visual field by the value of the maxium entry and then multiplying by 0.06, the desired maximum value. Then the entries in the visual field are negated and added to 1.03, thus producing a visual field with a maximum value less than or equal to 1.03 and a minimum value of 0.97, where the lower values tend to lie along the enhanced road edges.

In the second subprocess of the Pattern Recognition Subsystem, labeled "Fluid Flow Generation" in FIG. 5B, an attractive force field is calculated. This calculation is based on the solution of the equation for a compressible fluid flow, previously discussed, with the equation of state, pressure equals density. Using the equation of state, the pressure, $p(x,y)$, is eliminated from the equations by replacing it with the density, $\rho(x,y)$. Boundary conditions at the edge of the image are chosen so that both the density and tangential velocity satisfy reflective boundary conditions, i.e. that the normal derivative is zero. The normal velocity is assumed to be zero on the boundary.

Figure 6:
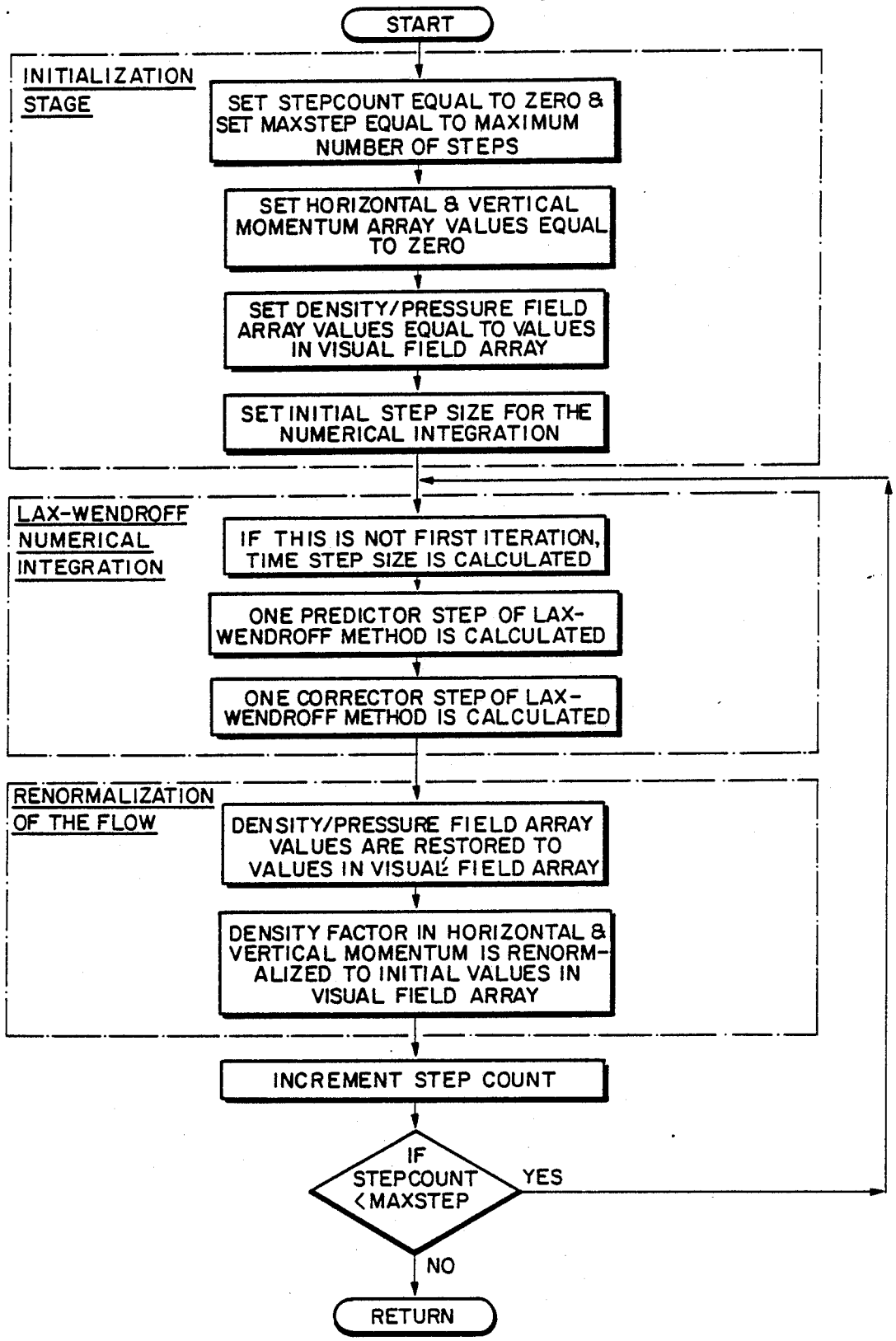
FIG. 6 is a flow chart for the fluid flow generation process referenced in the flow chart of FIGS. 5A and 5B.

The solution of the fluid flow equations is carried out using the two-step Lax-Wendroff finite-difference technique described in Richtmyer and Morton. An expanded flow chart for this subprocess is shown in FIG. 6. The process is initialized by setting the numerical arrays for the horizontal and vertical components of momentum equal to zero; the density array, and incidentally the pressure array since pressure equals density, is set equal to the values in the visual field. At this point an iterative process begins in which one step of the Lax-Wendroff Numerical Integration alternates with a Renormalization of the Flow. One step of the Lax-Wendroff Numerical Integration consists of a predictor step and a corrector step, which calculate respectively an estimate of the fluid flow at one time increment and two time increments beyond the current time. After one Lax-Wendroff step is carried out, the values in the density and momentum arrays have been modified. In the Renormalization of the Flow, the values in the density array are reset to their initial values, equal to the values in the visual field. In addition, as momentum is density times velocity, the values in the momentum arrays are renormalized by dividing them by the modified values of density and multiplying them by the initial values of density. The Integration and Renormalization steps are alternated for a specified number of steps. The number of steps is chosen so that the effects of attractive regions can propagate out to a range of several pixels. Also the fluid should generally have a maximum absolute velocity at the end of the iteration of about 0.1. The third frame (3) of FIG. 7 shows the horizontal component of the momentum in the fluid flow generated from the visual field. The darker regions in the display correspond to fluid moving toward the left; the lighter regions to the right.

In the third subprocess of the Pattern Recognition Subsystem, labeled "Flexible Template Deformation" in FIG. 5B, a road template is caused to move in response to the fluid flow. The road template is a pair of flexible rods (analogous physically to flexible drafting splines), each satisfying the vibrating rod equation:

$$XL_{tt}(Y,t) = -XL_{YYYY}(Y,t) - a\, XL_t(Y,t) -$$

$$b\, m(XL(Y,t),Y) - \frac{c}{(XL(Y,t) - XR(Y,t))^2},$$

$$XR_{tt}(Y,t) = -XR_{YYYY}(Y,t) - a\, XR_t(Y,t) -$$

$$b\, m(XR(Y,t),Y) + \frac{c}{(XL(Y,t) - XR(Y,t))^2}.$$

The functions XL(Y,t) and XR(Y,t) are the curves describing the shape of the left and right sides of the road, respectively. Since the road edges stretch out ahead of the vehicle, the curves are parametrized in terms of horizontal position, X, in the image as a function of vertical position, Y in the image. The four terms on the right hand sides of these equations are respectively the curvature-minimizing term of the vibrating rod equation involving the fourth derivative in X, a damping term involving a first derivative in time, an inhomogeneous term proportional to the horizontal component of the fluid momentum, m(x,y), and an inverse square repeller term between the curves. The parameters, a, b, and c, determine the relative strength of the damping, inhomogeneous, and repeller terms in the equation. The vibrating rod equation enforces continuity and straightness of the curves by producing a restoring force whenever the rod is bent. The damping term causes the solution to gradually slow down and approach some asymptotically stable solution. The inhomogeneous term causes the template to move toward the low-density/low-pressure regions in the visual field and assume their shape, within the constraints of continuity and straightness, imposed by the rod equation. The repeller term causes the two curves of the template to move apart, preventing them from converging to the same side of the road.

The vibrating rod equations are solved by finite difference methods on a uniform grid $\{Y_j\}$ in the independent variable, Y. Each of the equations is reduced to a set of first-order ordinary differential equations of the form:

$$XL_t(Y_j,t) = VL(Y_j,t),$$

$$VL_t(Y_j,t) = -\Delta^4 XL(Y_j,t) - a\, VL(Y_j,t) -$$

$$b\, m(XL(Y_j,t),Y_j) = \frac{c}{(XL(Y_j,t) - XR(Y_j,t))^2},$$

where $\Delta^4$ is the centered fourth-order difference operator. Boundary conditions at the end points are that the third- and second-order differences in $Y_j$ are zero. A similar set of first-order ordinary differential equations for XR($Y_j$,t) are defined. These ordinary differential equations are solved using a fourth-order Runge Kutta differential equation solver as described in Dahlquist, G. and A. Bjork, *Numerical Methods,* Prentice Hall, 1974, pp. 346-347 (hereafter "Dahlquist and Bjork"). There are several commercially available software packages for the solution of systems of ordinary differential equations which contain implementations of the Runge Kutta method, such as the program RKGS included in Appendix C. The fourth frame (4) of FIG. 3 shows the position of the road edge template (the two bold lines), correctly aligned with the road edges after it has converged to its asymptotic state.

In the fourth subprocess of the Pattern Recognition Subsystem, labeled "Matching Decision Rules" in FIG. 5B, no operation need be carried out for this particular application. However, in situations where there could be a possible ambiguity, several road templates may be used and decision rules are used to choose the most probable location of the road edge.

Figure 8:
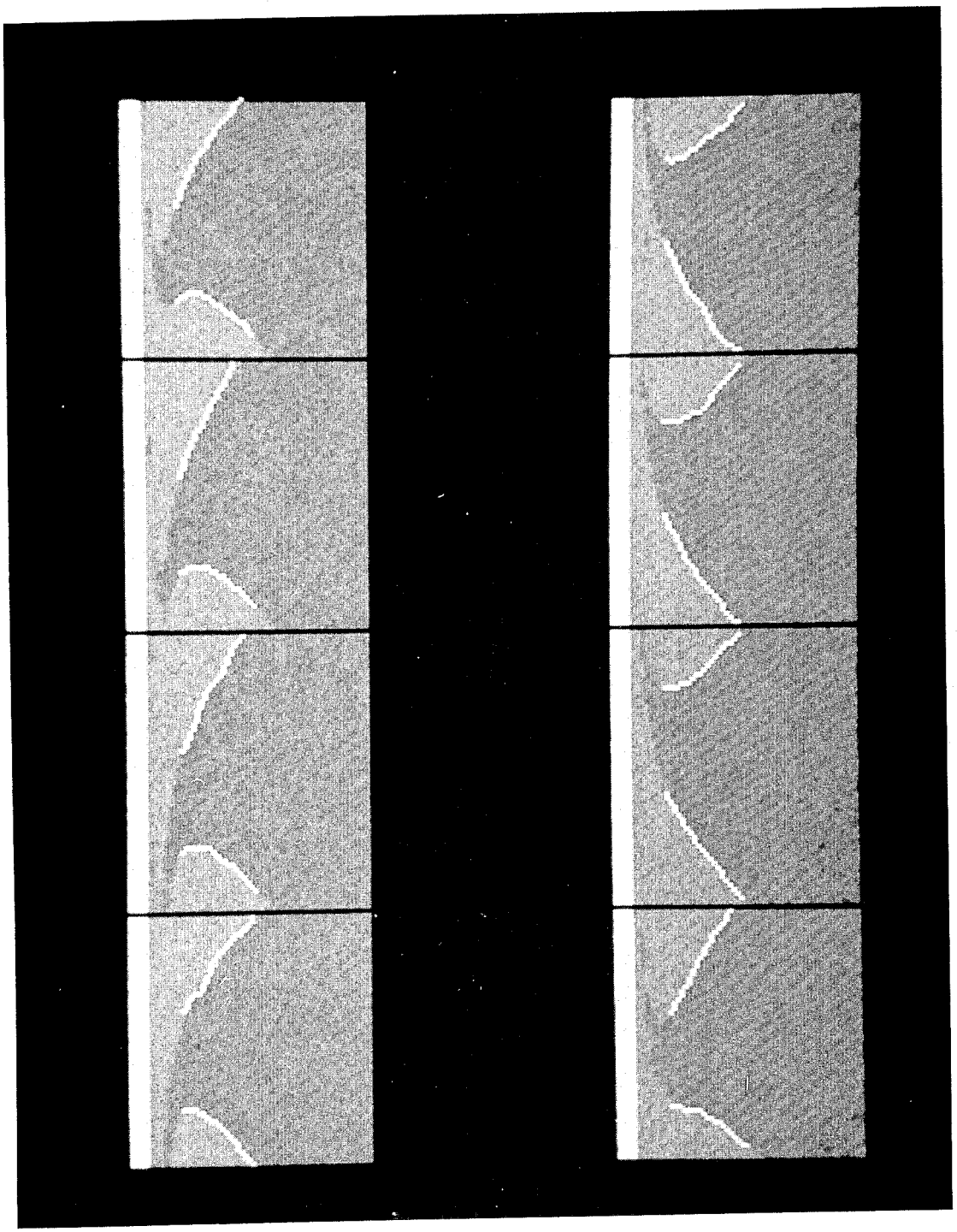
FIG. 8 is a representation of a sequence of road images as seen from the autonomous vehicle of FIG. 4 as it moves along the road under control of the pattern recognition control process.

The third subsystem, labeled "Vehicle control Subsystem" in FIG. 5B, identifies the center of the road, based on the assumption that it lies halfway between the positions of the road edges, as estimated by the road edge template. The direction of motion and next camera pointing angle are calculated by moving the vehicle forward a specified number of meters along the center of the road and pointing the camera at the center of the road a specified number of meters ahead of the vehicle. This process is illustrated in FIG. 8 where a sequence of eight frames, from left to right and top to bottom, shows the view from the vehicle camera as the vehicle moves itself through an S-curve on the simulated track. In the first frame, the template is initialized as a pair of parallel vertical lines, whose shape is thus quite dissimilar to the shape of the road edges. However, once the vehicle is following the road, the road edges tend to stay centered in the image and deform only slowly in the distance. The convergence of the road template is speeded up considerably by using the previous edge position as the template for finding the next edge position.

Appendix C, filed concurrently herewith, contains a program listing of a computer program, called ALV, that is presently used to carry out the generalized steps described above in connection with FIGS. 5A and 5B. FIGS. C1 and C2, in Appendix C, are a flow chart for the ALV program. Also included in Appendix C are program listings of the numerous subroutines that are invoked by the program ALV. Each of the program listings is liberally annotated with explanatory comments, thereby enabling one skilled in the art to understand and use these programs in order to practice the present invention.

Alternative Embodiments of EXAMPLE 1

In the Pattern Recognition Subsystem of Example 1, the Road Following example, both the second and third subprocess can be calculated by alternative means. Also by this means a matching decision rule may be implemented for use in the fourth subprocess of the Pattern Recognition Subsystem.

In the second subprocess, labeled "Fluid Flow Generation" in FIG. 5B, an attractive force is calculated. As an alternative to the fluid flow method, the attractive force may be generated by convolving the output of the Image Preprocessing subprocess with an appropriate function. This may be carried out in the following way. Designate the output of the Image Preprocessing Subprocess as S(x,y), where x is the horizontal coordinate in the image and y is the vertical coordinate. The following function, for some radius R, $$G(x,y) = \log((x^2+y^2)^{\frac{1}{2}}), \text{ for } x^2+y^2 \leq R^2$$

$$G(x,y) = 0, \text{ for } x^2+y^2 > R^2,$$

is then convolved with S(x,y) producing the result:

$$GS(x,y) = \int\int G(x-\xi, y-\eta)S(\xi, \eta)d\xi d\eta$$

The horizontal component of the attractive field, u(x,y), is then simply the x-derivative of GS(x,y):

$$u(x,y) = \frac{\partial}{\partial x} GS(x,y).$$

An alternative means of calculating the convolution, and avoiding the differential process to obtain u(x,y), is to calculate the Fourier transforms of S(x,y) and G(x,y). By definition, the Fourier transform of S(x,y) is:

$$\widetilde{S}(k_x, k_y) = \int\int e^{i(k_x x + k_y y)} S(x,y) dx dy,$$

and similarly:

$$\widetilde{G}(k_x, k_y) = \int\int e^{i(k_x x + k_y y)} G(x,y) dx dy.$$

The horizontal component of the force field can then be calculated as a Fourier transform according to the following formula:

$$u(x,y) = \frac{1}{2\pi} \int\int -ik_x e^{-i(k_x x + k_y y)} \sim G(k_x,k_y) S(k_x, k_y) \, dk_x dk_y.$$

This Fourier transform approach for the calculation of u(x,y) can be made very efficient through the use of standard Fast Fourier Transform implementations of the Fourier Transform.

The convergence process of the road edge template in the Flexible Template Deformation subprocess of the Pattern Recognition Subsystem can be carried out by attractive means, based upon results in Richtmyer and Morton, Chapter 11. The equations for XL are again discretized in the Variable Y in the form:

$$\frac{\partial XL(Y_j,t)}{\partial t} = VL(Y_j, t),$$

$$\frac{\partial VL(Y_j,t)}{\partial t} = -\Delta^4 XL(Y_j,t) - a\, VL(Y_j, t) -$$

$$b\, u(XL(Y_j,t), Y_j) - \frac{c}{(XL(Y_j,t) - XR(Y_j,t))^2},$$

and similarly for XR, by interchanging the letters R and L in the expression.

These equations may be solved using a backward time difference in the first equation and a forward time difference in the second equation. In other words, let $XL^{(n)}$ and $XL^{(n+1)}$ be the values of XL at the n-th and (n+1)-th time steps, $n\Delta t$ and $(n+1)\Delta t$, respectively. Similarly, for XR, VL, and VR, $XR^{(n)}$, and $VR^{(n)}$ are the values of these dependent variables at the n-th time step, and $XR^{(n+1)}$, $VL^{(n+1)}$, and $VR^{(n+1)}$ are their respective values at the (n+1)-th time step. The values of $VL^{(n+1)}$ can then be calculated from $XL^{(n)}$, $VL^{(n)}$, and $XL^{(n)}$ by the forward difference equation:

$$VL^{(n+1)}(Y_j) = VL^{(n)}(Y_j) +$$

$$S\left[ -\Delta^4 XL^{(n)}(Y_j) - a\, VL^{(n)}(Y_j) - b\, u(XL^n(Y_j), Y_j) - \frac{2}{(XL^{(n)}(Y_j) - XR^{(n)}(Y_j))^2} \right]$$

and the values of $XL^{(n+1)}$ can be calculated from $VL^{(n+1)}$ as:

$$XL^{(n+1)} = XL^{(n)} + S[VL^{(n+1)}(Y_j)],$$

where S is a stability factor. These expressions can be evaluated alternately to obtain a stable asymptotic solution of the template equations, as long as the parameter, S, is less than ½. There is a similar pair of expressions for XR and VR, which is obtained simply by interchanging the letters R and L in the above expressions. Fourth-order differences at the end points are calculated assuming that the second- and third-order derivatives of XL and XR are zero at the end points.

A machine decision rule which may be applied in the fourth subprocess of the Pattern Recognition subsystem is based on the following quantity:

$$E = \int GS(XL(y,t), Y)\, dy + \int GS(XR(y,t), y)\, dy.$$

After a set of templates have converged to hypothetical road edges, the quantity E is evaluated. If E is less than a certain predetermined value or "threshold", then the hypothetical road edges are accepted. If E is not less than the threshold, then a new set of hypothetical road edges are generated by allowing another road edge template to converge, the convergence process beginning at an alternate starting point.

A Variation of Example 1: An Air Reconnaissance System

In addition to the alternative embodiments of Example 1 described above relating to alternative techniques for carrying out the various steps of the feature-extraction method, it will be appreciated by those skilled in the art that operating principles of Example 1 have applications in many other areas other than an autonomous vehicle following a road. For example, as shown in FIG. 28, a similar pattern recognition system as is described above in connection with FIGS. 5A and 5B could be used in an aerial reconaissance system. Such a system includes an airplane 170 that has a video camera/recorder 172 strategically positioned on the underneath front portion thereof so as to provide an unobstructed view of the ground over which the airplane 170 is flying. An on-board computer 174 processes the input signal received from the camera/recorder 172 so as to extract features such as roads or rivers. (If clouds obscure the view from the camera/recorder 172, appropriate infra-red sensors could also be used to sense various ground temperatures, such as the relatively uniform temperature of the water flowing in a river.) Further, other features, such as building, could be identified using the rectangular identification procedures set forth below in Example 3. An airplane control system 176, responding to the extracted road/river features, could then control the airplane so as to follow such features.

EXAMPLE 2: A Multichannel Warped Signal Correlator

A block diagram of a multichannel warped signal correlator 80 is shown in FIG. 9. The correlator 80 includes a first sensor 82 and a second sensor 84, both of which receive a signal from a moving noise source 86. The signal received by sensor 82 is coupled, via a first input channel 88, to a short time correlator 90. Similarly, the signal received by sensor 84 is coupled, via a second input channel 92, to the short time correlator 90. The output of the short time correlator 90 is directed to a computer 94, which computer 94 includes a display memory 96, and program for carrying out the feature extraction process of the present invention. The end result of applying the process of the invention to the signals received from the moving noise source 86 is to display on a two or more dimensional display device 98, the trajectory of the noise source. The signal correlator 80 thus provides a display interpretation process for the detection of a parametrized family of curves used in certain types of radar or sonar displays.

Figure 10A:
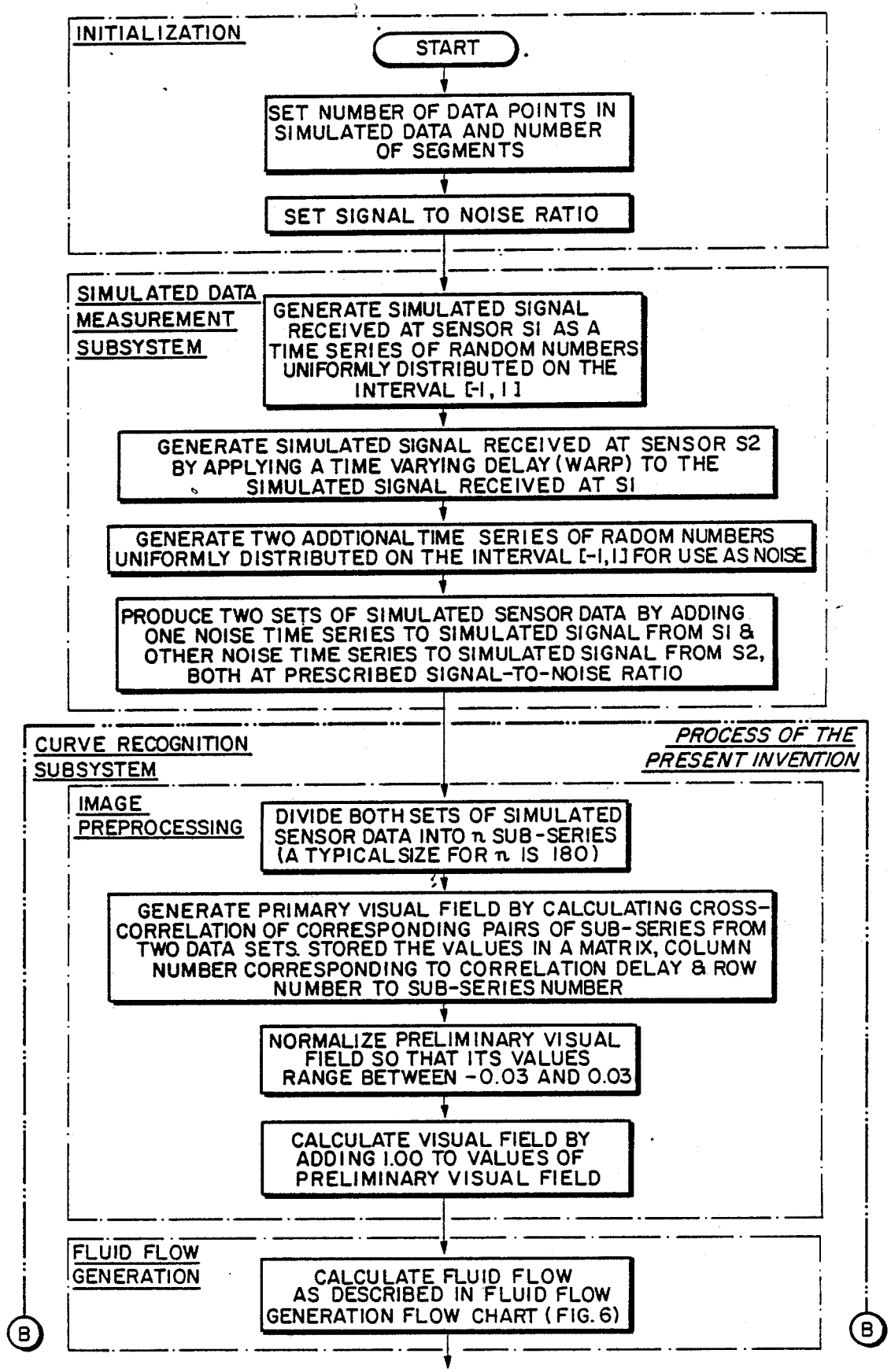
FIGS. 10A and 10B are a flow chart for the detection process used in the multichannel warped signal correlator of FIG. 9.
Figure 10B:
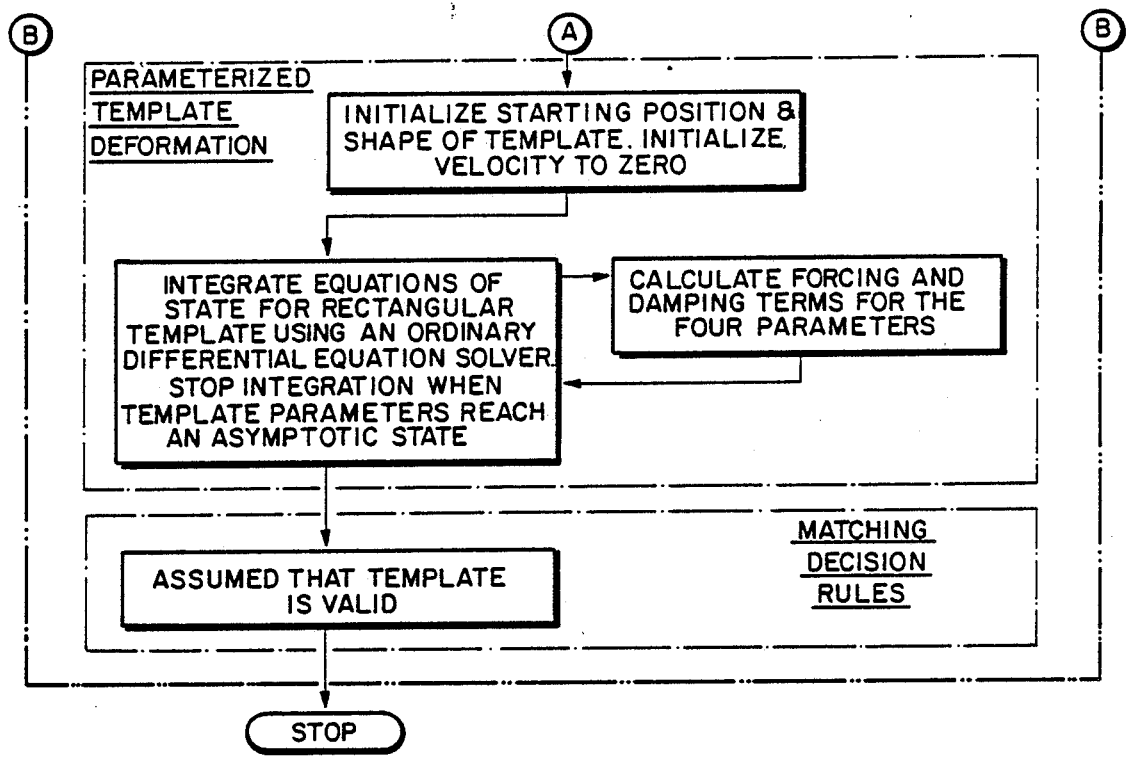

The software programs written for the computer 94 for this Example were written in FORTRAN to run on a VAX 11-785. The image displays appear on a IIS display. A flow diagram of the program is shown in FIGS. 10A and 10B. The program is divided into three main areas: (1) an initialization stage, (2) a simulated Data Measurement Subsystem, and (3) a subsystem carrying out the feature-extraction method of the present invention.

To better understand and appreciate the need for and operation of the warped signal correlator system shown in FIG. 9, some background information is now presented. In FIG. 9, the two sensors, 82 and 84, are in fixed positions, one above the other, with sensor 84 located at coordinate (O, O,—H) and sensor 82 located at coordinate (O, O, H). These two sensors receive a white-noise signal from the signal source 86 in motion with respect to the sensors. At any given instant the source 86 is at a distance $D_1$ from sensor 82 and distance $D_2$ from sensor 84. As the signal propagates at some finite velocity, c, there is a relative delay, $\tau$, between the detections of the signal at the nearer and farther of the two sensors. When the signal source is moving, the relative delay between detection of the signal at the two sensors varies in time. It is an object of the signal correlator 80 to estimate the properties of the trajectory of the signal source 86, particularly the time of closest approach, from the variation of $\tau$ with respect to time.

The estimate of the trajectory from the properties of the signal is complicated by the presence of noise in the environment. In realistic situations, the signal power will be substantially less than the ambient noise power. This makes detection of the signal extremely difficult. Another object, therefore, of the signal correlator 80 is to detect the presence of signals emitted from moving sources under conditions of low signal-to-noise level.

Standard techniques for processing white noise signals generally involve correlation of the two signals. The simplest representtion for a signal is a series of numbers called a time series. When each of the numbers in the series assumes a random value, statistically independent of all the other numbers in the series, then the sequence of numbers is called white noise. The time series is generally modified so that the average values of the random entries is zero. Correlation between two time series involves aligning the two series, number for number, multiplying the adjacent pairs of numbers from the two series, and adding together all the products. Correct alignment between two versions of the same series produces a large value for the correlation, whereas incorrect alignment produces a smaller value for the correlation. This is because when the series are correctly aligned, the adjacent pairs of numbers are identical, so that their product is positive. In summing up a large number of positive numbers, the correlation assumes a large value. When the series are incorrectly aligned, the product of the adjacent numbers from the two series are equally likely to be positive or negative. Thus in summing up a large number of positive and negative numbers, a great deal of cancellation occurs and the correlation assumes a relatively small value.

This correlation technique works even when additional uncorrelated white noise is present in each of the time series. Correlation at the correct alignment of the two signal components of the signal-plus-noise still produces a relatively large value as compared to correlation at an incorrect alignment, as long as the noise level is not too high. A more quantitative discussion of correlation processing and signal processing in general can be found in Moharty, N., *Random Signals Estimation and Identification*, Von Nostrand, 1986, pp. 109–136 (hereinafter "Moharty").

The measure of performance of correlation processing techniques, called gain, generally improves when longer time series are correlated. However in the current example of a multichannel warped signal correlator, only a relatively short subseries of the total time available may be used effectively due to the variability of the relative delay, $\tau$. Even though the time series from the two sensors may be correctly aligned at one point in the series, gradually the two series get out of alignment at points farther along the series. Effectively, one version of the signal is distorted with respect to the other. There is, however, a maximum length sequence of numbers over which the two series do remain more-or-less in alignment, called the maximum coherence length. It is this coherence length, rather than the length of the time series, which controls the maximum gain achievable by correlation processing.

A display called a tau-gram was developed to exploit the total length of a time series, even when its length exceeds the maximum coherence length. The tau-gram is generated by dividing each of the time series into several sub-series each of length equal to the maximum coherence length. Each of the sub-series from the first time series is correlated with the corresponding sub-series from the second time series and these short time correlations, as a function of relative delay, are aligned as columns in a display. These displays are currently exploited by human interpreters, who identify a locus of dark points forming a dark curving line in the display. These interpreters can find the locus of dark points even though the dark points may not be identifiable individually. It is a feature of the warped signal correlator described in this example to identify a parametrized family of curves in a display through their cumulative effect on flexible templates. It is another feature of the application described in this example to achieve a greater signal-to-noise gain than can be obtained by correlation processing.

With the preceding background information in mind, the multichannel warped signal correlation process carried out by the computer 94 in FIG. 9, as summarized in the flow diagram of FIGS. 10A and 10B, will now be presented. It is noted that what follows is a description of a simulation of such a correlation process. However, it is to be understood that the processes described are equally applicable to an actual warped signal correlator of the type shown in FIG. 9.

After initialization of the simulation system, the first subsystem, labeled "Simulated Data Measurement Subsystem" in FIG. 10A, produces a set of simulated data from two sensors. The data at each sensor consist of a signal component and a noise component. The simulated signal component for the first sensor 82 is generated, using a pseudo-random number generator, as a time series of random numbers uniformly distributed on the interval [−1, 1]. The simulated signal component for the second sensor 84 is calculated by distorting the time series at the first sensor 82. Let the time series at the first sensor 82 after j time units be $x_1(j)$. Suppose that the signal time series for the second sensor 84, after j time units, designated $x_2(j)$, is identical to the signal received at the first sensor 82, at a time $\tau(j)$ units in the past. Then $x_2(j)$ is defined to be equal to $x_1(J-\tau(j))$, as estimated by linear interpolation between data points. The noise components at each of the two sensors are generated as two additional independent time series, one for each sensor. The simulated signal and noise components at each sensor are added together at a specified signal-to-noise level.

The second subsystem, labeled "Curve Recognition Subsystem" in FIG. 10A, carries out the feature-extraction method of the present invention. This process comprises four subprocesses: (1) Image Preprocessing, (2) Fluid Flow Generation, (3) Parametrized Template Deformation, and (4) Matching Decision Rules. The three frames of FIG. 11 show, from top to bottom, the results of the first three subprocesses.

In the first subprocess of the Curve Recognition Subsystem, labeled "Image Preprocessing" in FIG. 10A, a tau-gram is calculated from simulated sensor data. An example of a tau-gram generated by this subprocess is shown in the top frame of FIG. 11. The horizontal axis is time and the vertical axis is the relative delay between the sub-series. This tau-gram was generated from two simulated time series of 720,000 samples. Each time series was divided into 180 sub-series, each of length 4000. Each pair of 4000-sample sub-series was correlated at relative delays of from 5 to 64 samples. The numerical results of these 180 sub-series correlations were aligned as columns in a matrix, with the relative delay of 5 at the bottom and 64 at the top. The tau-gram is thus a visual display of the correlation matrix in which a large correlation value produces a darker pixel than a small correlation value. The particular alignment of each sub-series which produces the correct alignment of the signal is easily seen as a dark point in the corresponding column. The locus of these dark points forms a dark curve in the display. A visual field based on the correlation matrix is generated by normalizing the correlation values to lie between plus or minus 0.03 and subtracting the resulting value from one.

In the second subprocess of the Curve Recognition Subsystem, labeled "Fluid Flow Generation" in FIG. 10A, an attractive force field is calculated. The middle frame of FIG. 11 shows a display of the vertical component of momentum in the fluid flow generated from the visual field. The darker regions in the display correspond to fluid moving down the display; the lighter regions correspond to fluid moving up the display. This calculation is based on the solution of the equations for a compressible fluid flow given previously, with the equation of state, pressure equals density. Using the equation of state, the pressure, p(x,y), is eliminated from the equations by replacing it with the density, p(x,y). Boundary conditions at the edge of the image are chosen so that both the density and tangential velocity satisfy reflective boundary conditions, i.e. that the normal derivative is zero. The normal velocity is assumed to be zero on the boundary.

The solution of the fluid flow equations is carried out using the two-step Lax-Wendroff finite-difference technique described in Richtmyer and Morton. An expanded flow chart for this subprocess is shown in FIG. 6. The process is initialized by setting the numerical arrays for the horizontal and vertical components of momentum equal to zero; the density array, and incidentally the pressure array since pressure equals density, is set equal to the values in the visual field. At this point an iterative process begins in which one step of the Lax-Wendroff Numerical Integration consists of a predictor step and a corrector step, which calculate respectively an estimate of the fluid flow at one time increment and two time increments beyond the current time. After one Lax-Wendroff step is carried out, the values in the density and momentum arrays have been modified. In the Renormalization of the Flow, the values in the density array are reset to their initial values, equal to the values in the visual field. In addition, as momentum is density times velocity, the values in the momentum arrays are renormalized by dividing them by the modified values of density and multiplying them by the initial values of density. The Integration and Renormalization steps are alternated for a specified number of steps. The number of steps is chosen so that the effects of attractive regions can propagate out to a range of several pixels. Also the fluid should generally have a maximum absolute velocity at the end of the iteration of about 0.1.

In the third subprocess of the Curve Recognition Subsystem, labeled "Parametrized Template Deformation" in FIG. 10B, a curved template depending on four parameters is caused to move in response to the fluid flow. The bottom frame of FIG. 11 shows the position of the curved template as a bold line, after it has deformed to match the dark correlation curve in the display. The deformation process is governed by the equations defined in Appendix B, Parametrized Curves.

The parametrized form of the templates in the current example is based on a particular model for the signal source motion. It is assumed that the signal source is moving on a straight, horizontal trajectory as a function of time given by the formula:

$$(R_0, V(t-t_0), H_S),$$

where $R_0$ is the distance to the signal source at its closest approach, V is the velocity of the signal source, $t_0$ is the time that the signal source is at closest approach, and $H_S$ is height of the signal source. For simplicity, this particular trajectory is parallel to the horizontal y-axis. However, the results are identical for a horizontal trajectory in any orientation.

The distances from the signal source to each of the sensors are:

$$D_1 = \sqrt{R_0^2 + V^2(t-t_0)^2 + (H_S + H)^2},$$

$$D_2 = \sqrt{R_0^2 + V^2(t-t_0)^2 + (H_S - H)^2}.$$

The relative delay, $\tau$, between the detection of a signal at the two sensors is thus a function of time, and four parameters:

$$\tau(t, R_0^2, V^2, H_3, t_0) = \frac{D_1 - D_2}{c},$$

where propagation of the signal along straight lines at constant velocity, c, is assumed. One sample curve from this family of curves appears as the locus of dark points in the top frame of FIG. 11.

This parametrized family of curves may be used to define a family of templates and, based on the methods discussed in Appendix B, the dynamics of the templates. The equations of motion for the parameters, $R_0^2$, $V^2$, $H_S$, and $t_0$ are:

$$\frac{d(R_0^2)}{ds} = V_R,$$

$$\frac{d(V_R)}{ds} = -a V_R + b_R F_R(v(t, \tau)),$$

$$\frac{d(V^2)}{ds} = V_V,$$

$$\frac{d(V_V)}{ds} = -a V_V + b_V F_V(v(t, \tau)),$$

$$\frac{d(H_3)}{ds} = V_H,$$

$$\frac{d(V_H)}{ds} = -a V_H + b_H F_H(v(t, \tau)),$$

$$\frac{d(t_0)}{ds} = V_T,$$

$$\frac{d(V_T)}{ds} = -a V_T + b_T F_T(u(t, \tau)).$$

The dependent variables, $V_R$, $V_V$, $V_H$, and $V_T$, are the generalized velocities associated with the parameters. The coefficient, a, controls the level of damping of each of the generalized velocities. Each of the terms involving the functionals, $F_R$, $F_V$, $F_H$, and $F_T$, is a forcing term for the equation which represents how the translational and bending forces on the templates by the fluid cause the parameters to change. The functionals are calculated by carrying out the following integrals over some specified interval of time centered around $t_0$:

$$F_R(v(t, \tau)) = \int \left(\frac{\partial \tau}{\partial(R_0^2)}\right) v(t, \tau(t, R_0^2, V^2, H_3, t_0)) dt,$$

$$F_V(v(t, \tau)) = \int \left(\frac{\partial \tau}{\partial(V^2)}\right) v(t, \tau(t, R_0^2, V^2, H_3, t_0)) dt,$$

$$F_H(v(t, \tau)) = \int \left(\frac{\partial \tau}{\partial(H_3)}\right) v(t, \tau(t, R_0^2, V^2, H_3, t_0)) dt,$$

$$F_T(u(t, \tau)) = \int u(t, \tau(t, R_0^2, V^2, H_3, t_0)) dt,$$

where $u(t,\tau)$ and $v(t,\tau)$ are the horizontal and vertical components of the fluid flow velocity. The coefficients $b_R$, $b_V$, $b_H$, and $b_T$, are chosen so that all of the four parameters converge at approximately the same rate.

These ordinary differential equations are solved using a fourth-order Runge-Kutta differential equation solver as described in Dahlquist and Bjork. There are several commercially available software packages for the solution of systems of ordinary differential equations which contain implementations of the Runge-Kutta method. FIG. 12 contains a sequence of four intermediate positions of the template as it converges to its asymptotic state.

This example (Example 2) shows how it is possible to design templates directly from a model of the phenomenon. In this case, the template is a good estimator for the value of $t_0$, which determines the horizontal position of the template. However, the other three parameters which govern the shape, are not determined uniquely. There are many sets of parameters which give nearly identical shapes for the template. In fact, wheen $R_0$ is much greater than $H_S$, then any two sets of parameters for which the ratios:

$$\frac{V^2}{R_0^2 + H^2}$$

$$\frac{H_s^2}{R_0^2 + H^2}$$

agree will produce templates with nearly identical shapes.

In one variation of Example 2, a single sensor and the signal source are located beneath a reflecting surface. In this instance, the data from the single sensor is either the sum or difference of the outputs of the two sensors described above, depending on whether the reflection coefficient of the surface is $+1$ or $-1$. All processing steps are the same, except for the generation of the tau-gram. In the case of a sum, the single time series of data is divided into several sub-series, each of length equal to the maximum coherence length. Each of the sub-series is then auto-correlated with itself. The results of these sub-series correlations, for all positive delays in some interval excluding zero, are aligned as columns in a $\tau$-gram matrix. For the case of a difference, the processing steps are the same, except that it is necessary to negate the values in the tau-gram matrix.

Appendix D, filed concurrently herewith, contains program listings of the three main programs, called TAUGRAM, RUNTAU, and FINDSUB, that are presently used to carry out the generalized steps described above in connection with FIGS. 10A and 10B. FIGS. D1, D2 and D3, included in Appendix D, are flow charts of these three programs. Also included in Appendix D are program listings of the subroutines, not already included in Appendix C, that are invoked by these three programs.

EXAMPLE 3: Feature Extraction of Rectangles in Imagery

Referring next to FIG. 13, a block diagram of an imagery system 100 is shown. This imagery system 100 includes means for generating digital imagery, such as a disk or tape storage device 102 on which digital imagery data has been previously stored; and a workstation 104 that receives and processes the digital imagery data. The workstation 104 includes a computer 106 that receives the digital imagery data and processes it according to the feature extraction method of the present invention. More particularly, as described below, the features that are extracted from the imagery data are rectangles, which rectangles presumably represent some form of man-made structure, such as a building. Appropriate input/output devices, such as a keyboard 108, mouse 110, and image display 112, are coupled to the computer 106 to allow an operator to control the imagery processing that occurs.

For the present example, rectangular features were detected in a two-dimensional overhead image of an urban scene. The software for the computer 106 was written in FORTRAN to run on a VAX 11-785 computer, with image displays appearing on an IIS display. A generalized flow diagram of the program is shown in FIGS. 14A and 14B. The program is divided into an initialization stage and a feature extraction stage. The feature extraction stage comprises four subprocesses. In a first subprocess, the image is processed to produce a pair of two-dimensional visual fields. In one visual field, large regions of homogeneous intensity are enhanced. In the second, the edges of regions are enhanced. In the second subprocess, fluid flows were generated for both the visual fields. In the third subprocess, a rectangular template responding to both flows deforms to surround and outline rectangular regions of homogeneous intensity. In the fourth subprocess, the region surrounded by the template, after the template has converged to an asymptotic state, is examined to determine if the region has a uniform intensity.

To better understand and appreciate the imagery system shown in FIG. 13, and the process used therein to extract rectangular features as summarized in FIGS. 14A and 14B, the following background information is presented.

This example involves the identification of regions of uniform intensity in images. The images are presented to the system in digital form, as a rectangular array of numbers. Each position in the array corresponds to a pixel in the image. The value of the number at each position is the birghtness level of the corresponding pixel. An example of an image is shown in FIG. 15.

Referring to FIGS. 14A and 14B, the subsystem labeled "Feature Extraction Subsystem" carries out the process of the present invention. This process includes four subprocesses: (1) Image Preprocessing, (2) the Fluid Flow Process, (3) the Rectangle Template Deformation, and (4) the Matching Decision Rules. FIGS. 16–22 show the results of the first three subprocesses.

In the first subprocess of the Pattern Recognition Subsystem, labeled "Image Preprocessing" in FIG. 14A, two Preliminary Visual Fields are produced from the initial image. The first Preliminary Visual Field is produced by processing the initial image so as to enhance the regions of uniform intensity. This is accomplished in the following steps:

(1) For each pixel, $P_1$, in the first Preliminary Visual Field, the corresponding pixel, $P_0$, in the initial image is identified.

(2) The values of the 25 pixels in the 5 by 5 square surrounding $P_0$ are extracted.

(3) The mean value, m, of the 25 pixels, ($p_j$, j=1, 25), is calculated according to the formula:

$$m = \left(\frac{1}{25}\right)\left(\sum_{j=1}^{25} p_j\right).$$

(4) The standard deviation, $\sigma$, of the 25 pixels, ($P_j$, j, j=1, 25), is calculated according to the formula:

$$\sigma = \sqrt{\left(\frac{1}{25}\right)\left(\sum_{j=1}^{25} p_j^2\right) - m^2}.$$

(5) The value:

$\sigma/m$ is calculated and stored in location $P_1$ in the first Preliminary Visual Field.

(6) The first five steps for each pixel in the first Preliminary Visual field array are repeated.

(7) Finally, large positive values are clipped, that is, pixels whose intensity values are greater than some maximum are reassigned that maximum as their intensity value.

The first Preliminary Visual Field as processed from the image in FIG. 15 according to the above seven steps is shown in FIG. 16.

A second Preliminary Visual Field is produced by processing the first Preliminary Visual Field so as to enhance edges. This is accomplished using a Sobel edge enhancement algorithm. Sobel edge enhancement, as described in Pratt, p. 487, is based on a 3 by 3 nonlinear edge enhancement operator. The algorithm consists of the following steps:

(1) For each pixel, $P_2$, in the second Preliminary Visual field, the corresponding pixel, $P_1$, in the first Preliminary Visual Field is identified.

(2) The nine pixels in the 3 by 3 square of pixels surrounding $P_1$ are numbered in the following pattern

| $A_0$ | $A_1$ | $A_2$ |
| $A_7$ | $P_1$ | $A_3$ |
| $A_6$ | $A_5$ | $A_4$ |

(3) The intensity values at the locations labeled $A_0$-$A_7$ are combined according to the formula:

$$G = \sqrt{X^2 + Y^2}$$

where, $X = (A_2 + 2A_3 + A_4) - (A_0 + 2A_7 + A_6).$ $Y = (A_0 + 2A_1 + A_7) - (A_6 + 2A_5 + A_4).$ (4) The resulting value, G, is stored in the second Preliminary Visual Field at location $P_2$.

(5) The first four steps for each pixel in the second Preliminary Visual Field array are repeated.

(6) Finally, the results are thresholded to produce a binary image.

The second Preliminary Visual Field as processed according to the above seven steps from the image in FIG. 15 is shown in FIG. 17.

Next, the two Preliminary Visual Fields are modified slightly to produce the two Visual Fields used in the generation of the fluid flow field. Both Preliminary Visual Fields have all positive entries. They are first modified by normalizing each to have a maximum value of 0.06. This is accomplished by dividing all entries in the each Preliminary Visual Field by the value of the maximum entry and then multiplying by 0.06, the desired maximum value. Then the normalized entries in the first Preliminary Visual Field are added to 0.97, producing the first Visual Field. The first Visual Field has a maximum value equal to 1.03 and a minimum value greater than or equal to 0.97, where the lower values tend to lie in regions of uniform intensity. The normalized entries in the second Preliminary Visual Field are subtracted from 1.03, producing the second Visual Field. The second Visual Field has a maximum value less than or equal to 1.03 and a minimum value equal to 0.97, where the lower values tend to lie along the edge of regions of uniform brightness.

In the second subprocess of the Feature Extraction Subsystem, labeled "Fluid Flow Generation" in FIG. 14A, an attractive force field is calculated for each of the two Visual Fields. This calculation is based on the solution of the equations for a compressible fluid flow given previously, with the equation of state, pressure equals density. Using the equation of state, the pressure, p(x,y), is eliminated from the equations by replacing it with the density, p(x,y). Boundary conditions at the edge of the image are chosen so that both the density and tangential velocity satisfy reflective boundary conditions, i.e. that the normal derivative is zero. The normal velocity is assumed to be zero on the boundary.

The solution of the fluid flow equations is carried out using the two-step Lax-Wendroff finite-difference technique described in Richtmyer and Morton. An expanded flow chart for this subprocess is shown in FIG. 6. The process is initialized by setting the numerical arrays for the horizontal and vertical components of momentum equal to zero; the density array, and also the pressure array since pressure equals density, is set equal to the values in one of the Visual Fields. At this point an iterative process begins in which one step of the Lax-Wendroff Numerical Integration alternates with a Renormalization of the Flow. One step of the Lax-Wendroff Numerical Integration consists of a predictor step and a corrector step, which calculate respectively an estimate of the fluid flow at one time increment and two time increments beyond the current time. After one Lax-Wendroff step is carried out, the values in the density and momentum arrays have been modified. In the Renormalization of the Flow, the values in the density array are reset to their initial values equal to the values in the visual field. In addition, as momentum is density times velocity, the values in the momentum arrays are renormalized by dividing them by the modified values of density and multiplying them by the initial values of density. The Integration and Renormalization steps are alternated for a specified number of steps. The number of steps is chosen so that the effects of attractive regions can propagate out to a range of several pixels. Also the fluid should generally have a maximum absolute velocity at the end of the iteration of about 0.1.

FIGS. 18 and 19 show the horizontal and vertical components of the momentum in the fluid flow generated from the first Visual Field. FIGS. 20 and 21 show the horizontal and vertical components of the momentum in the fluid flow generated from the second Visual Field. For displays of the horizontal components, the darker regions correspond to fluid moving toward the left; the lighter regions to the right. For displays of the vertical components, the darker regions correspond to fluid moving down the display; the lighter regions up the display.

In the third subprocess of the Feature Extraction Subsystem, labeled "Rectangle Template Deformation" in FIG. 14A, a rectangular template is caused to move in response to the fluid flow. FIG. 22 shows the position of several templates as highlighted rectangles on a portion of the initial image of FIG. 15, after they have converged on the boundaries of several rectangular regions of uniform intensity.

The rectangle template as shown in FIG. 23 comprises a rectangle, whose four edges are labeled $E_1$–$E_4$, and two diagonals, labeled $D_1$ and $D_2$. The diagonals cross at the center of the rectangle, which is located at coordinates: (X,Y). Diagonal, $D_1$, makes an angle of $A_1$ radians with respect to the horizontal, where angles are measured clockwise from the positive x-axis. Diagonal, $D_2$, makes an angle of $A_2$ radians with respect to the horizontal. Each of the two diagonals has a length equal to 2L, that is, the distance from the intersection of the diagonals to the ends of the diagonals is L. The equations of motion for the parameters X, Y, $A_1$, $A_2$, and L are:

$$\frac{dX}{dt} = V_X,$$

$$\frac{dV_X}{dt} = -\alpha V_X + a_X F_X,$$

$$\frac{dY}{dt} = V_Y,$$

$$\frac{dV_Y}{dt} = -\alpha V_Y + a_Y F_Y,$$

$$\frac{dA_1}{dt} = V_{A_1},$$

$$\frac{dV_{A_1}}{dt} = -\alpha V_{A_1} + a_{A_1} F_{A_1} + a_S F_S - b_A \left( A_2 - A_1 - \frac{\pi}{2} \right)^2,$$

$$\frac{dA_2}{dt} = V_{A_2},$$

$$\frac{dV_{A_2}}{dt} = -\alpha V_{A_2} + a_{A_2} F_{A_2} - a_S F_S + b_A \left( A_2 - A_1 - \frac{\pi}{2} \right)^2,$$

$$\frac{dL}{dt} = V_L$$

$$\frac{dV_L}{dt} = -\alpha V_L + a_L F_L + b_L (\min(L - L_0, 0))^2 - \epsilon$$

The dependent variables, $V_X$, $V_y$, $V_{A_1}$, $V_{A_2}$, and $V_L$, are the generalized velocities associated with the parameters. The coefficient, $\alpha$, controls the level of damping of each of the generalized velocities. Each of the terms involving the functionals, $F_X$, $F_Y$, $F_{A_1}$, $F_{A_2}$, $F_S$, and $F_L$, is a forcing term for the equation which represents how the translational and rotational forces on the template by the fluid flow cause the parameters to change. The coefficients, $a_X$, $a_Y$, $a_{A_1}$, $a_{A_2}$, $a_S$, and $a_L$, are chosen so that all of the five parameters converge at approximately the same rate. The term $$b_A \left( A_2 - A_1 - \frac{\pi}{2} \right)^2,$$

is a restoring force which attempts to make the diagonals perpendicular, where the coefficient, $b_A$, is chosen so that the term is relatively small compared to the forcing terms. The term, $b_L(\min(L-L_0, O))^2$, is a restoring force which causes the rectangle to expand whenever the size parameter, L, falls below $L_0$. The coefficient, $b_L$, is chosen so that the term is relatively large compared to the forcing terms. The positive variable, $\epsilon$, chosen to be small compared to the forcing function, is a restoring force which attempts to collapse the rectangle.

The functionals are calculated by carrying out the following line integrals, with respect to arclength s, over the edges and diagonals of the template shown in FIG. 23:

$$F_X = \left(\frac{1}{2L_1}\right) \int_{E_1+E_3} EF_1(x,y)ds +$$

$$\left(\frac{1}{2L_2}\right) \int_{E_2+E_4} EF_1(x,y)ds +$$

$$\left(\frac{1}{4L}\right) \int_{D_1+D_2} BF_1(x,y)ds,$$

$$F_Y = \left(\frac{1}{2L_1}\right) \int_{E_1+E_3} EF_2(x,y)ds +$$

$$\left(\frac{1}{2L_2}\right) \int_{E_2+E_4} EF_2(x,y)ds +$$

$$\left(\frac{1}{4L}\right) \int_{D_1+D_2} BF_2(x,y)ds,$$

$$F_{A_t} = \left(\frac{1}{2L}\right) \int_{D_1} BF(x,y) \times r \, ds,$$

$$F_{A_t} = \left(\frac{1}{2L}\right) \int_{D_2} BF(x,y) \times r \, ds,$$

$$F_S = \left(\frac{1}{2L_t}\right) \int_{E_1+E_3} EF(x,y) \cdot n \, ds -$$

$$\left(\frac{1}{2L_2}\right) \int_{E_2+E_4} EF(x,y) \cdot n \, ds,$$

$$F_L = \left(\frac{1}{2L_t}\right) \int_{E_1+E_2} BF(x,y) \cdot n \, ds +$$

$$\left(\frac{1}{2L_2}\right) \int_{E_2+E_4} BF(x,y) \cdot n \, ds$$

The symbols, $$\left(\frac{1}{2L_t}\right) \int_{E_1+E_2} ds \text{ and } \left(\frac{1}{2L_2}\right) \int_{E_2+E_4} ds,$$

stand for the sums of the line integrals taken over the corresponding edges, which are then divided by $2L_1$, twice the length of $E_1$, or $2L_2$, twice the length of $E_2$. The symbols, $$\left(\frac{1}{2L}\right) \int_{D_1} ds, \left(\frac{1}{2L}\right) \int_{D_2} ds, \text{ and } \left(\frac{1}{4L}\right) \int_{D_1+D_2} ds,$$

stand for the line integrals taken over one or both of the diagonals, $D_1$ and $D_2$, which are then divided by the length of the diagonal, 2L, or twice the length of 4L diagonal, 4L. The variable BF, which stands for "Body Flow", is the fluid flow vector field generated from the first Visual Field. BF has horizontal and vertical components: ($BF_1$, $BF_2$). The variable EF, which stands for "Edge Flow", is the fluid flow vector field generated from the second visual field. EF has horizontal and vertical components: ($EF_1$, $EF_2$). The variable r is the vector pointing from the midpoint, (X,Y), to the point (x,y) on the diagonal. The variable n is the outward unit normal to the rectangle edge at point (x,y). The quantity, BF(x,y) × r, is the vector cross product of BF with r. The quantities, BF(x,y).n and EF(x,y).n, are the vector dot products of BF and EF with n.

These ordinary differential equations are solved using a fourth-order Runge-Kutta differential equation solver as described in Dahlquist and Bjork. There are several commercially available software packages for the solution of systems of ordinary differential equations which contain implementation of the Runge-Kutta method.

In the fourth subprocess of the Feature Extraction Subsystem, labeled "Matching Decision Rules" in FIG. 14B, the region surrounded by the template, after the template has converged to an asymptotic state, is examined to determine if the region has uniform intensity. If the region satisfies this condition, then the edges of the rectangle template are drawn on the image.

Appendix E, filed concurrently herewith, contains program listings for two main programs, called RUNFLOW and FINDRECT, that are presently used to carry out the generalized steps described above in connection with FIGS. 14A and 14B. FIGS. E1 and E2, included in Appendix E, are flow charts of these two programs. Also included in Appendix E are program listings of the subroutines, not already included in Appendices C or D, that are invoked by these two programs.

EXAMPLE 4: Common Depth Point Display Interpretation and Seismic Trace Interpretation The problem of exploration geophysics is to predict locations where oil is most likely to be found beneath the earth's surface. The prediction is based on geologic structures observed on or below the earth's surface. The principle tool for exploring the structure beneath the surface is exploration seismology. This tool is based on the interpretation of the reflection of sound, generally produced by an explosion, from layers of rock with different properties.

Generally the properties of the rock are deduced from the time it takes a sound wave to propagate from its source, on the earth's surface, down to a reflector, and back to a sensor on the surface. This seemingly straightforward process is complicated by two problems. The first is that some of the reflections observed are due to a more complicated reflection geometry, in which the sound is reflected up and down between two or more reflectors before it is reflected back to the surface. These multiple reflections arrive at a later time than direct reflections from the same reflectors, and may be misidentified as direct reflections from structures deep in the earth. The second problem is that the explosive source and receiver are generally not located in the same place, so that the impulse from the explosive source propagates obliquely down to the reflector, suffering an unknown amount of refraction.

Expert interpreters of seismic reflection data can generally discount multiple reflections. However, it may happen that a multiple reflection is obscuring a direct reflection from a deep reflector. To avoid this problem the structure in the earth is observed from several directions. This is accomplished by varying the (non-zero) offset between the seismic source and receiver on the earth's surface. The data from this set of measurements is aligned in a display with time in the vertical axis and offset in the horizontal axis. Reflections from any given reflector form the locus of a curve in the display. The curves due to direct and multiple reflections generally have different shapes and can be differentiated by experts.

The zero-offset time series can be estimated in this process by extrapolating the curves due to direct reflections down to zero offset.

In the instant example, the present invention advantageously provides a tool that can be used to identify curves in a particular type of display, such as a Common Depth Point (CDP) display, that is obtained from exploration geophysics data. Further, the invention provides a mechanism for interpreting such data so as to produce a three-dimensional CDP display, which display can be used to help interpret seismic data.

Exploration geophysics data is typically obtained, at least for off-shore exploration, as illustrated in the diagram of FIG. 24. As shown there, a tow ship 120 carries an acoustic source 122 that periodically generates impulsive acoustic signals. These signals follow, in general, an acoustic signal path 124 to the sea bottom 125 and below until a deep seismic reflection point 126 is reached, at which point the signals are reflected back to the sea's surface along signal path 127. A tow line 128, carried behind the ship 120, carries a long linear (or sometimes two-dimensional, as discussed below) array of receivers 130, which receivers are designed to sense the reflected acoustic signals. The data collected by the receivers 130 is stored in a data recorder 132 carried on the ship 120.

The data 133 stored in data recorder 132 is subsequently presented to a computer 134, as shown in FIG. 25, for the purpose of generating a common depth point (CDP) display, according to methods known in the art. The present invention provides a tool for identifying curves in the CDP display, as explained more fully below.

In this example, a Common Depth Point (CDP) display is formed from the data 133 for which the source 122 and receiver 130 are equidistant from a common midpoint. When the reflecting layers are flat, then all reflections from a given depth occur at a common point, hence the name.

The data for a given source-receiver offset are collected in the form of a time series. The time series begins at the time of source detonation. The series is a record of the acoustic energy reflected to the receiver 130 in each of a sequence of equal time intervals, a few milliseconds in duration. A time series is collected for each of a sequence of incrementally increasing source-receiver offsets where the distance from the source of receiver to the midpoint is:

$$x = j\Delta x, \text{ for } j = 1, n.$$

Each of these time series is displayed as a column in a display, with the times of source detonation aligned at the top of the display and the time axis increasing downward. The columns are positioned from left to right by increasing source-receiver separation.

A simple model for the acoustic properties of the earth assumes the earth is a set of horizontal layers, $L_j$, each having constant sound speed, $c_j$, and thickness, $z_j$. In each of the CDP time series, there will be reflected returns from each interface between two layers. The locus of points formed by the reflection from each interface is well approximated by a parabola, since the source-receiver separation is generally much less than the depth of the layers. This parabola is parametrized in the form:

$$t = A + Bx^2$$

For the primary reflection from the bottom of the first layer, the locus of points, $T_{1,1}$, formed by the reflections, has the form:

$$t = \frac{2 z_1}{c_1} + \frac{x^2}{c_1 z_1},$$

The locus of points for the secondary reflection, $T_{1,2}$, down and up twice in the first layers is:

$$t = \frac{4 z_1}{c} + \frac{x^2}{2 c_1 z_1}.$$

For the primary reflection from the bottom of the second layer, the locus of points, $T_{2,1}$, formed by the reflections has the form:

$$t = \left[ \frac{2 z_1}{c_1} + \frac{2 z_2}{c_2} \right] + \frac{x^2}{c_1 z_1 + c_2 z_2}.$$

The curves $T_{1,2}$, and $T_{2,1}$, can be distinguished in the display. They may obscure each other at a point. For instance, they may have the same leading coefficient A. However, then their second coefficients, B, must be different. Since the curvature of each parabola is twice the second coefficient, the parabolas have different curvature and can be distinguished in the display.

Given the simple parametrized model for the shape of the curves formed by the locus of reflections in a CDP display $$t = A + Bx^2$$

it is a simple matter to develop parametrized templates for them. That is, using the workstation 136 shown in FIG. 25, which workstation is essentially identical to the workstation 104 shown in FIG. 13 insofar as hardware is concerned, the methods of the present invention previously described can be applied to develop a fluid flow directly from the CDP display. Parabolic templates are caused to move in response to the flow based on the following dynamical equations:

$$\frac{dA}{ds} = V_A,$$

$$\frac{dV_A}{ds} = -a V_A + b_A F_A(v(x,t)).$$

$$\frac{dB}{ds} = V_B,$$

$$\frac{dV_B}{ds} = -a V_B + b_B F_B(v(x,t)).$$

where $v(x,t)$ is the vertical, e.g., "t", component of the flow, and the functionals, $F_A$ and $F_B$ are defined as:

$$F_A(v(x,t)) = \int v(x,t(A, B, x)) \, dx.$$

$$F_B(v(x,t)) = \int x^2 \, v(x,t(A, B, x)) \, dx.$$

As a variation, a template consisting of two parabolas, corresponding to the primary and secondary reflection curves, $T_{1,1}$, and $T_{1,2}$, can be constructed which satisfies the same dynamical equations, with functionals, $F_A$ and $F_B$, defined as:

$$F_A(v(x,t)) = \int v(x,t(A, B, x)) \, dx +$$

$$\int v\left[x, t\left[2A, 2B, \frac{x}{2}\right]\right] dx,$$

$$F_B(v(x,t)) = \int x^2 \, v(x, t(A, B, x)) \, dx +$$

$$\int \frac{x^2}{4} v\left[x, t\left[2A, 2B, \frac{x}{2}\right]\right] dx.$$

As was indicated in FIG. 24, seismic data collection has historically been carried out with a source in line with a long linear array of receivers. This is particularly true for off shore exploration where a ship 120, carrying the acoustic source 122, is towing a streamer of hydrophones 130. Recently, two-dimensional arrays of sources and receivers have been used. In this case the offset between the sources and receivers is a vector, namely the difference between their positions on the earth's surface. When these data are collected in a Common Depth Point display the display is three-dimensional, depending on the x-offset, y-offset and time. In this case, the locus of points formed by the reflections from a given reflector is a two-dimensional surface in the display.

A template for detecting this surface is necessarily two-dimensional as well. This template is easily generalized from the one-dimensional version for the DP display, namely:

$$t = A + Bx^2 + Cy^2$$

The dynamics for this template are carried out as described in Appendix B.

The results of the Common Depth Point analysis of the seismic data are generally assembled into a display called a "seismic trace". As suggested in FIG. 26, such a display can readily be generated using a computer 140 programmed according to methods known in the art. The result of each individual CDP display is a single time series containing a sequence of zeros and ones, where the ones correspond to the estimated position in time of the reflected returns of primary reflections as extrapolated to zero offset around the midpoint. The seismic trace is thus formed by aligning these zero-offset traces in a display with the round-trip reflection time extending downward in the display and the position of the midpoint running from left to right in the display. The result in a display in which the locus of reflections, from a given reflecting interface, form a curving, horizontal line, in a two-dimensional display, similar in shape to the reflector itself. Advantageously, using the principles of the present invention, and a workstation 136' as shown in FIG. 26 (which workstation is, for all practical purposes, identical to the workstation 136 of FIG. 25, with the only difference being some modifications to the software), this line may be detected using a flexible rod template, much as was done in the road-following example of Example 1, and as described in Appendix B.

Similarly, if a three-dimensional seismic trace is assembled, the locus of reflections from a given reflector form a curving, horizontal surface in the display, similar in shape to the reflector itself. In this case, the surface may be detected using a template satisfying the equations of a vibrating plate as described in Appendix B.

EXAMPLE 5: Multi-Screen Track Detection

This example addresses the problem of detecting and tracking a non-stationary target at low signal-to-noise levels. This problem arises in systems, such as an active sonar or radar, which carry out multiple observations. Reflections from targets appear as bright points on a sequence of displays. The motion of a target is estimated from the apparent motion of a bright point through the time sequence of displays.

In the current state-of-the-art, the strength of reflections, called the target cross-section, is decreasing to such an extent that the points due to individual reflections are not visible in individual displays. Thus, to detect the target at all, it is necessary to detect a collection of points, forming a portion of the track in a sequence of displays. In this case, the detection problem and the tracking problem are indivisible. Attempts to solve this problem have been called "detect-on-track" and "joint space-time processing".

Two other areas suffering from this same problem are Moving-Target-Indicator (MTI) radars and the tracking of surface ship wakes. MTI radars, sometimes called look-down radars, are used to direct ground-hugging targets such as cruise missiles and low-level bombers. Conventional radars are limited for this purpose, since the ground reflection obscures the reflection from the target. MTI radar exploits the fact that reflections from a moving target are highly Doppler-shifted in frequency with respect to the ground reflection. Reflections with highly Doppler-shifted returns are highlighted as bright points on a sequence of displays.

Ship-wake tracking is limited by the background noise level, due to ocean roughness. In this case, the wake appears as a short segment in the imagery. This problem involves the detection of a track of line segments rather than a track of points.

Utilizing the principles of the present invention, a multi-screen tracker-detector system, as shown in FIG. 27, can be used to address these and other problems. Such a system includes conventional radar equipment, such as an antenna 150, radar signal generation and reception equipment 152, and a processing computer 154. The processing computer 154, using techniques known in the art, generates a three dimensional display from a sequence of two-dimensional displays. A second computer 156 (which, of course, could be the same computer 154 with a different program loaded therein), applies the feature-extraction process of the present invention in order to detect desired information and display it on a detector display 160. The process of the present invention carried out by the computer 156 for such a Multi-Screen Tracker Detection System includes, in addition to preprocessing: three subsystems: (1) an Attractive Force Generation subsystem, (2) a Flexible Template Deformation subsystem, and (3) a Matching Decision Rule subsystem.

The Attractive Force Generation subsystem generates an attractive force for each two-dimensional display in the time sequence of displays. This is carried out in one of several ways. For analog circuitry capable of the rapid solution of systems of ordinary differential equations, the Fluid Flow Generation process shown in FIG. 6 can be implemented efficiently. A visual field is calculated by normalizing the intensities in each image to lie between 0 and 0.06, with the result then subtracted from 1.03. This visual field is equated with pressure in the Fluid Flow Generation process to calculate a momentum field in the fluid. This momentum field is used in the flexible Template Deformation subsystem to produce a drag force on the templates, carrying them toward regions of low pressure, which correspond to regions of high intensity in each display.

For conventional digital circuitry, attractive fields may be calculated more efficiently using Fourier transform and convolution techniques. In this approach, a visual field is produced for each two-dimensional display in the sequence by convolving the intensity field in the display with a peaky function such as a two-dimensional Gaussian function. The attractive field is then simply the gradient of this visual field.

The Flexible Template Deformation subsystem generates templates for the multi-screen tracker-detector based on a pair of flexible rod equations:

$$X_{ss}(t,s) = -X_{tttt}(t,s) - aX_s(t,s) + bm(X(t,s), Y(t,s), t).$$

and $$Y_{ss}(t,s) = -Y_{tttt}(t,s) - aY_s(t,s) + bn(X(t,s), Y(t,s), t),$$

where, $X(t,s)$ and $Y(t,s)$ are the x- and y-coordinate functions describing a one-dimensional flexible rod in the three-space with coordinates, $(x,y,t)$, where x and y are the horizontal and vertical coordinates in a display appearing at time t.

There is not, of course, a continuum of displays in time, but a discrete sequence. Thus it is necessary to recast the flexible rod equations in the following discretized form:

$$\frac{d^2X_j}{ds^2} = -\Delta^4 X_j - a\frac{dX_j}{ds} + b\, m_j(X_j, Y_j),$$

$$\frac{d^2Y_j}{ds^2} = -\Delta^4 Y_j - a\frac{dY_j}{ds} + b\, n_j(X_j, Y_j).$$

where $X_j$ and $Y_j$ are the coordinates where the flexible rod intersects the plane of the j-th display, $\Delta^4$ is the centered fourth-order difference operator, and $m_j$ and $n_j$ are the horizontal and vertical components of the attractive field generated for the j-th display.

The Matching Decision Rule subsystem provides the basis for interpreting the template motion. That is, after each of a set of templates has converged to an asymptotic state, a decision must be made as to whether a given state corresponds to a target track. In general, at low signal-to-noise levels, the track is not visible in the display and the template state is close to a track, but not exactly aligned with it. Thus, discriminants on which to base a detection decision must depend only on properties of the templates themselves.

Three of the most commonly used discriminants are based on template clustering, potential energy tracking, and target track dynamics. In the first instance, if a large number of templates cluster close to a particular state, then that state is likely to correspond to a target track. Secondly, the potential energy of the template due to the attractive field may be tracked throughout the motion of the template. A large change in potential energy between the initial and final states of the template suggests that the final state is likely to correspond to a target track. Finally, the final state of each template may be examined to determine if the corresponding target lies within the operating envelope of the hypothetical target.

It is noted that in both Examples 4 and 5 presented above, the details of implementation and the best mode of practicing the invention could be readily ascertained by those skilled in the art with reference to the details of implementation presented for Examples 1, 2 and 3 in Appendices A, B and C, respectively. That is, while each example contains its own set of problems, it is clear from the descriptions presented above that the application of the present invention for each example also follows a general pattern. This general pattern has been fully developed above in connection with FIGS. 1-3 and accompanying text. This general pattern is then specifically applied to the applications presented in Examples 1, 2 and 3. Given this general and specific description, those skilled in the art could readily adapt the specific details presented in connection with Examples 1-3 and Appendices C-E to Examples 4 and 5 without undue experimentation.

Further, those skilled in the art will recognize that the principles of the present invention disclosed herein can be applied to other specific systems beyond those discussed herein. For example, reference is made to the many applications referenced in the "Summary of the Invention" portion of this application. Thus, while the invention herein disclosed has been described by means of specific embodiments and applications thereof, numerous modifications and variations could be made thereto by those skilled in the art without departing from the spirit and scope of the present invention. It is to be understood therefore that within the scope of the appended claims, the invention may be practiced otherwise than as specifically described herein.

APPENDIX A

Implementation of Attractive Force Fields due to Fluid Flow

There are several different ways to implement the attractive force fields due to fluid flow. Each of these methods may be easier to implement on certain kinds of computer hardware than on others. Furthermore, the equations which describe fluid flow may also be used to describe other force fields such as gravitational or electrical fields.

The first equation describing fluid flow is the equation of continuity:

$$\frac{\partial \rho}{\partial t} = -\nabla \cdot (\rho V) + S.$$

The operator $\nabla \cdot$ is the divergence operator, which is applied to vectors. In two dimensions, if $$v = \begin{pmatrix} a \\ b \end{pmatrix},$$

where a and b are the x and y components of $\vec{v}$ then $$\nabla \cdot v = \frac{\partial a}{\partial x} + \frac{\partial b}{\partial y}.$$

Similarly in three dimensions, if $$v = \begin{pmatrix} a \\ b \\ c \end{pmatrix},$$

then $$\nabla \cdot v = \frac{\partial a}{\partial x} + \frac{\partial b}{\partial y} + \frac{\partial c}{\partial z}.$$

This equation expresses the conservation of mass by equating the change in mass per unit volume, $$\frac{\partial \rho}{\partial t},$$

with the amount of fluid flowing out through the boundary of that volume, $-\nabla \cdot (\rho v)$, and the fluid flowing in from fluid sources, s.

One set of assumptions that produces a useful set of equations is that the fluid is homogeneous and incompressible, so that the density, $\rho$, is constant in both space and time. In this case, the equation of continuity reduces to:

$$\nabla \cdot v = \frac{s}{\rho}.$$

The right hand side of this equation, $s/\rho$, is identified with the intensity of the display.

In addition, for an attractive field to be useful for the present invention, the field must be irrotational. Otherwise, templates moving in the field will rotate without stopping. The field v is irrotational if it is a gradient field:

$$v = \nabla \phi,$$

where $\nabla$ is the gradient operator.

On substituting this into the equation of continuity for incompressible flow, there results the Poisson equation for the potential $\phi$:

$$\Delta \phi = \frac{s}{\rho},$$

where $\Delta$ is the Laplacian operator.

The gradient of the potential $\phi$ is the velocity field of the flow of an incompressible fluid due to a distribution of sources of fluid, s. This equation also describe other physical processes. For instance, if $s/\rho$ is a distribution of electrical charge, the gradient of $\phi$ is the associated electrical field. Similarly when $s/\rho$ is a distribution of mass, then the gradient of $\phi$ is the associated gravitational field.

Using the form of the Laplacian operator in two dimensions, the Poisson equation reduces to:

$$\frac{\partial^2 \phi}{\partial x^2} + \frac{\partial^2 \phi}{\partial y^2} = \frac{s}{\rho}.$$

and in three dimensions, it is:

$$\frac{\partial^2 \phi}{\partial x^2} + \frac{\partial^2 \phi}{\partial y^2} + \frac{\partial^2 \phi}{\partial z^2} = \frac{s}{\rho}.$$

The solution of Poisson's equation for the potential $\rho$ can be obtained by the formula:

$$\phi(x) = -\frac{1}{2\pi\rho} \int s(x') \log(|x - x'|)\, dV(x'),$$

in two dimensions and $$\phi(x) = -\frac{1}{4\pi\rho} \int \frac{s(x')}{|x - x'|} dV(x'),$$

in three dimensions.

These integral solutions of the Poisson equation are both convolutions, as is any integral of the form:

$$\int s(x') f(x - x') dV(x').$$

The integrals associated with the Poisson equation involve a particular function, f, which produces, in three dimensions, an attractive force inversely proportional to the square of the distance, and in two dimensions, an attractive force inversely proportional to the distance. In general, other choices of the function f can produce attractive forces with different behavior.

A different approach to the generation of attractive forces using fluid flow arises if the fluid is assumed to be compressible. In that case, an additional equation for fluid velocity, the Euler equation, is required:

$$\frac{\partial v}{\partial t} + (v \cdot \nabla) V = -\frac{1}{\rho} p,$$

where now $\nabla$ is the gradient operator and $v \cdot \nabla$ is the operator:

$$v_x \frac{\partial}{\partial x} + v_y \frac{\partial}{\partial y} + v_z \frac{\partial}{\partial z},$$

and $v_x$, $v_y$, $v_z$ are the x,y, and z components of the velocity. An equation of state, $p = \rho$, is also assumed.

The equations for the flow of a compressible fluid then take the form:

$$\frac{\partial \rho}{\partial t} = -\nabla \cdot (\rho v) + s, \text{ and}$$

$$\frac{\partial v}{\partial t} + (v \cdot \text{grad}) v = -\text{grad}(\log \rho).$$

The source function, s, may be related to the image intensity in many ways. The simplest way is to simply equate s to the image intensity, assuming of course that those portions of the image which must attract templates are associated with low intensity, otherwise s may be equated with the negative of the intensity.

Alternatively, we may choose to identify the image intensity with pressure/density, so that fluid will flow toward regions of low intensity. In this case, fluid may be added to the flow so that the density is held constant, i.e., $$s = \nabla \cdot (\rho v).$$

In this case, the equation of continuity becomes trivial and the equations for fluid flow reduce to:

$$\frac{\partial v}{\partial t} + (v \cdot \text{grad}) v = -\text{grad} (\log \rho),$$

where $\rho$ is the image intensity. The fluid flow described above is a form of this approach, expressed in the form of conservation laws.

APPENDIX B

Characterization of the Dynamics of Templates using Differential Equations

B.1 Rigid Sticks Performing rigid Body Translation and Rotation
B.2 Parametrized Curves
B.3 Rubber Bands Satisfying the Vibrating String Equation
B.4 Flexible Sticks Satisfying the Vibrating Rod Equation
B.5 Rigid and Flexible Geometric Figures
B.6 Two-Dimensional and Higher-Dimensional Templates Some examples of the differential equations which characterize the dynamics of templates are:

B.1

Rigid Sticks Performing Rigid Body Translation and Rotation

Here a two-dimensional display with horizontal and vertical coordinates (x,y) contains straight line features. The differential equations in this example describe a rigid straight-line template with two degrees of freedom, vertical translation and rotation. The following two equations control the vertical motion of the template:

$$\frac{dy(t)}{dt} = V(t),$$

$$\frac{dV(t)}{dt} = -a V(t) + b F(Y, A, v(x,y)).$$

The coordinate Y(t) is the y-coordinate of the center of the template at time t, and V(t) is the velocity in the vertical direction of the center of the template. In the second equation, the effect of the first term on the right hand side is to damp the motion of the template in the vertical direction, where the parameter, a, controls the level of damping. The second term on the right hand side of the second equation is a functional producing the vertical component of force on template, calculated by integrating v(x,y), the vertical component of the attractive field, as a line integral along the linear template, where the parameter, b, controls the relative strength of this inhomogeneous term.

The next two equations control the rotation of the template:

$$\frac{dY(t)}{dt} = W(t),$$

-continued $$\frac{dW(t)}{dt} = -c W(t) + d T(Y, A, v(x,y)).$$

The coordinate A(t) is the angle between the line template and the horizontal, and W(t) is the angular velocity of the template. In the second equation, the effect of the first term on the right hand side is to damp the rotation of the template around its midpoint, where the parameter, c, controls the level of damping. The second term on the right hand side of the second equation is a functional producing the moment of torque on the template, associated with v(x,y), the vertical component of the attractive field, where the parameter, d, controls the relative strength of this inhomogeneous term.

B.2

Parametrized Curves

A more general type of template is the parametrized template. This is a one-dimensional flexible template with a small number of degrees of freedom whose shape is characterized as a parametrized curve in a two-dimensional display:

$$y = y(x, A, B, C, D, \ldots),$$

where x and y are the horizontal and vertical coordinates, and A,B,C,D, . . . are an arbitrary number of parameters controlling the shape of the template. An equation of motion controls the evolution in time of each of the parameters which are the generalized coordinates of the template. The equation of motion for the parameter, A(t), is:

$$\frac{dA(t)}{dt} = V_A,$$

$$\frac{dV_A(t)}{dt} = a V_A + b F_A (v(x,y)).$$

The dependent variable $V_A(t)$ is the generalized velocity associated with A(t). In the second equation, the effect of the first term on the right hand side is to damp the rate of change of the dependent variable A(t), where the parameter, a, controls the level of damping. The second term on the right hand side of the second equation is an inhomogeneous term for the equation, where $F_A$ is calculated by integrating the quantity:

$$\frac{dy(x, A, B, C, D, \ldots)}{dA} v(x,y),$$

with respect to x as a line integral along the template, where v(x,y) is the vertical component of the attractive field, and where the parameter, b, controls the relative strength of this inhomogeneous term. This type of template has been reduced to practice in the Multichannel Warped Signal Correlator discussed in Section 6.2.

There is similarly a pair of dynamical equations and a functional for each of the other parameters, B, C, D, . . . in the expression, $$y = y(x, A, B, C, D, \ldots),$$

for y. For example, the equations for the parameter B are $$\frac{dB}{dt} = V_B$$

$$\frac{dV_B}{dt} = -a\,V_B + b\,F_B(v(x,y)).$$

where $F_B$ is calculated by integrating the quantity $$\frac{dy(x,A,B,C,D,\ldots)}{dB}\,v(x,y)$$

with respect to x as a line integral along the template.

B.3

Rubber Bands Satisfying the Vibrating String Equation

Another general type of template corresponds physically to a vibrating string. This is a one-dimensional flexible template with an infinite number of degrees of freedom whose shape is arbitrary except that some relationship exists between the position and slope of the end points. The simplest conditions on the end points is that their position is fixed or that slope is zero. The equation of motion, which controls the evolution in time of the position of each point on the string, is the one-dimensional wave equation with a damping term and an inhomogeneous term proportional to the vertical component of the attractive force, v(x,y):

$$y_{tt} = y_{xx} - ay_t + bv(x,y),$$

where subscripts x and t denote partial differentiation with respect to those variables. This equation can be cast in the following form which is parallel in structure to the equations of motion in the previous examples:

$$\frac{dy(x,t)}{dt} = V(x,t),$$

$$\frac{dV(x,t)}{dt} = \frac{d\,y(x,t)}{dx^2} - a\,V(x,t) + b\,v(x,y).$$

Here y(x,t) is the y-coordinate of the string at position x and time t. The parameters, a and b, determine the relative strength of the damping and inhomogeneous terms in the equation.

The flexible template satisfying the vibrating string equation, here called a "rubberband", can easily be generalized to displays of higher dimensions. This has been carried out in Section 6.5 for the vibrating rod equation. For example, in a three-dimensional display with coordinates x, y, and z, the y and z coordinates of the vibrating string template may be considered functions of x which satisfy a pair of vibrating string equations:

$$y_{tt} = y_{xx} - ay_t + bv(x,y,z),$$

$$z_{tt} = z_{xx} - az_t + bw(x,y,z),$$

where the subscripts x and t again denote partial differentiation and where v and w are the y and z components of the relevant force field.

B.4

Flexible Sticks Satisfying the Vibrating Rod Equation

Another general type of template corresponds physically to a vibrating rod or stick. This is a one-dimensional flexible template with an infinite number of degrees of freedom whose shape is arbitrary except that two conditions must be satisfied at each of the endpoints among the position of the endpoint and the first three spatial derivatives at the endpoint. The simplest condition at the end points is that the second and third derivatives are zero. The equation of motion which controls the evolution in time of the position of each point on the rod is the vibrating rod equation with a damping term, and an inhomogeneous term proportional to the vertical component of the attractive force, v(x,y):

$$y_{tt}(x,t) = -y_{xxxx}(x,t) - ay_t(x,t) - bv(x,y),$$

where subscripts in x and t indicate partial differentiation with respect to these variables. Here y(x,t) is the y-coordinate of the rod at position x and time t. The parameters, a and b, determine the relative strength of the damping and inhomogeneous terms in the equation. The first term on the right-hand side of the vibrating rod equation enforces continuity and straightness of the template by producing a restoring force whenever the rod is bent. The damping term causes the solution to eventually cease vibrating and reach some asymptotically stable solution. The inhomogeneous term causes the template to move toward the attractive features in the image and assume their shape, within the constraints of continuity and straightness imposed by the beam equation. This type of template has been reduced to practice in Section 6.1, Pattern Recognition and Control for Road Following.

The vibrating rod template can easily be generalized to displays of higher dimensions. This has been carried out for a three-dimensional display in Section 6.5. For example, in a three dimensional display with coordinates x, y, and z, the y and z coordinates of the template may be considered functions of x which satisfy the pair of equations:

$$y_{tt} = -y_{xxxx} - ay_t + bv(x,y,z),$$

$$z_{tt} = -z_{xxxx} - az_t + bw(x,y,z).$$

where again subscripts in x and t indicate partial differentiation, and where v and w are the y and z components of the force field. The vibrating rod template may also be generalized to a rod which is free to rotate and to translate in both the x and y directions, responding to both the horizontal and vertical components of the attractive force.

B.5

Rigid and flexible geometric figures

The first four examples of linear templates may be combined with templates of geometrical shapes made up of linear components joined at corners and intersections. The dynamics of these shapes can be generalized directly from the dynamics of linear templetes. Templates of this type may have the following characteristics:

1. Linear components of the template may be joined at some intersection,
2. Linear components joined at an intersection may rotate around this intersection,
3. The rotation of linear components around an intersection may be constrained by spring forces, and 4. The individual linear components of a template may respond to force fields or fluid flows generated from different visual fields.

Each of these objects has been reduced to practice in the implementation of the rectangular template discussed in Section 6.3.

A simple first example is a rigid triangle composed of three linear segments joined at the corners of the triangle. The dynamics of the triangle, like those of a linear rigid rod, are characterized by the position of the center of mass of the triangle, and the orientation of the triangle, characterized by the angle between the horizontal and a line from the center of mass to one of the corners.

The dynamical equations for the midpoint of the triangle, with coordinates $X=(x_1, x_2)$ are:

$$\frac{d\vec{x}}{dt} = \vec{V},$$

$$\frac{d\vec{V}}{dt} = -a\vec{V} + \vec{F}(v),$$

where $\vec{V}=(v_1,v_2)$ is the generalized velocity of the midpoint of the triangle, and $$\vec{F}(v) = \sum_{j=1}^{3} b_j \int_{l_j} \vec{v}(\vec{x}(s))\, ds,$$

is the weighted sum of the integrated force over each of the three sides, $l_j$, where s is arc length, $\vec{x}(s)$ is a point on the triangle, and $\vec{v}(\vec{x}(s))$ is the force vector at the point $\vec{x}(s)$.

The orientation of the triangle is driven by similar dynamical equations in which the forcing function is a weighted sum of the integrated torque over each of the edges. Namely, the dynamical equations are:

$$\frac{dA}{dt} = V_A,$$

$$\frac{dV_A}{dt} = -a V_A + T_{V_A},$$

where A is the angle between the horizontal and a line from the center of mass to one of the corners. $T_{V_A}$ is the weighted sum of the integrated torque over each of the edges, $l_j$:

$$T_{V_A} = \sum_{j=1}^{3} c_j \int_{l_j} v(x(s)) \, X \, (x(s) - X) \, ds,$$

where s is the arc length, $\vec{x}(s)$ is a point on the triangle, the symbol X is the two-dimensional cross product and $\vec{v}(\vec{x}(s))$ is the force vector at position $\vec{x}(s)$.

When two linear segments are joined at an intersection, each of the segments rotate freely around the intersection. In this case, the dynamics of the structure is characterized by the position of the point of intersection and the orientation of each of the two segments.

Generally, there will be included in the dynamics of the template a force that will hold the linear segments apart. The dynamical equations for the intersecting segments with spring forces are:

$$\frac{d\vec{X}}{dt} = \vec{V}_x,$$

-continued $$\frac{d\vec{V}_x}{dt} = -\alpha \vec{V}_x + a F_x,$$

$$\frac{dA_1}{dt} = V_{A_1},$$

$$\frac{dV_{A_1}}{dt} = -\beta V_{A_1} + b F_{A_1} - c\left(A_2 - A_1 - \frac{\pi}{2}\right)^2,$$

$$\frac{dA_2}{dt} = V_{A_2},$$

$$\frac{dV_{A_2}}{dt} = = V_{A_2} + b F_{A_2} + c\left(A_2 - A_1 - \frac{\pi}{2}\right)^2,$$

where X is the coordinate of the point of intersection, $A_1$ and $A_2$ are the angles of orientation of the two segments, $F_x$ is the integrated force over both segments, and $F_{A_1}$ and $F_{A_2}$ are the torques on each of the two segments, calculated with respect to the point of intersection. The terms with coefficient c are quadratic spring terms, which tend to keep the segments oriented 90° apart. When the coefficient, c, is zero, the equations reduce to the freely rotating case.

As a final generalization, each of the various linear components of a template may have dynamics which cause them to respond to one or more of several different forces. The resultant force on the template is then the weighted sum of the integrated force on each segment. An example of this is discussed in Section 6.3. In particular, different forces may act on individual points of the template.

B.6

Two-Dimensional and Higher-Dimensional Templates

Each of the linear templates in the first four examples can be generalized to higher dimensional templates. For example the dynamics of the motion of a rigid plate in a force field in three dimensions is a direct generalization of the dynamics of a rigid linear template. The system has five degrees of freedom, three describing the position of the center of mass and two for the orientation of the plate.

Additionally, the dynamics of the parameters of a parametrized surface such as a paraboloid or ellipsoid may satisfy equations similar to those in 5.4.2. In that case, the surface is described by the function:

$$z=z(x,y,A,B,C,\ldots).$$

The dynamical equation for the parameter A is identical except that the functional $F_A$ in the dynamical equation is evaluated by integrating the quantity:

$$\frac{dz(x,y,A,B,C,\ldots)}{dA} w(x,y,z(x,y,A,B,C,\ldots))$$

over the surface, where $w(x,y,z)$ is the z-component of the field of force acting on the template.

The wave equation for the vibrating string has a two-dimensional generalization in the equation for the vibrating membrane:

$$z_{tt}=z_{xx}+z_{yy}-z_t+bw(x,y,z),$$

where z(x,y) is the height of the membrane at the point (x,y) and w(x,y,z) is the z-component of force on the membrane at that point.

The wave equation for the vibrating rod has a two-dimensional generalization in the equation for the vibrating plate:

$$z_{tt} = z_{xxxx} + 2z_{xxyy} + z_{yyyy} - z_t + bw(x,y,z).$$

where once again z(x,y) is the height of the plate at the point (x,y) and w(x,y,z) is the z-component of force on the plate at that point.

Just as these templates have been generalized from one or two dimensions they can be generalized to three and higher dimensions. For instance, a parametrized template of the three dimensions in a four dimensional display has the form:

$$Z = Z(\vec{x}, A, B, C, \ldots),$$

where x is a vector of three or higher dimensions.

The dynamical equations for the parameters are again of the form:

$$\frac{dA}{dt} = V_A,$$

$$\frac{dV_A}{dt} = -aA + F_A(\vec{x}, Z(\vec{x}, A, B, C, \ldots)),$$

where the function $F_A$ is again the integral of $$\frac{dZ}{dA} w(\vec{x}, Z(\vec{x}, A, B, C, \ldots))$$

over the template.

For the vibrating membrane or plate, the generalized equations for an n−1 dimensional template in an n-dimension display are:

$$z_{tt} = \Delta z - z_t + bw(\vec{x}, z(\vec{x})),$$

and $$z_{tt} = \Delta^2 z - z_t + bw(\vec{x}, z(\vec{x})),$$

where $\Delta$ is the (n−1)-dimensional Laplacian operator with respect to the (n−1)-dimensional vector x=(x$_1$, x$_2$, ..., x$_{n-1}$), $$\Delta = \sum_{j=1}^{n-1} \frac{\partial^2}{\partial x_j^2}.$$

APPENDIX C

Figs. C1 and C2

Program Listing of ALV

Program Listings of Subroutines:

| | |
|---|---|
| INITSY | INITDSPL |
| IMGOUT | INTCNT |
| CREIMG | SGNPST |
| FILIMG | ENDPTS |
| ERASELINE | WRTIMG |
| FNDEDG | GSOBEL |
| LAXWEN | SECRK |
| RKGS | FUNC |
| OUTPUT | DRAWLINE |
| CNTALV | NXTLOC |
| PNTCAM | |

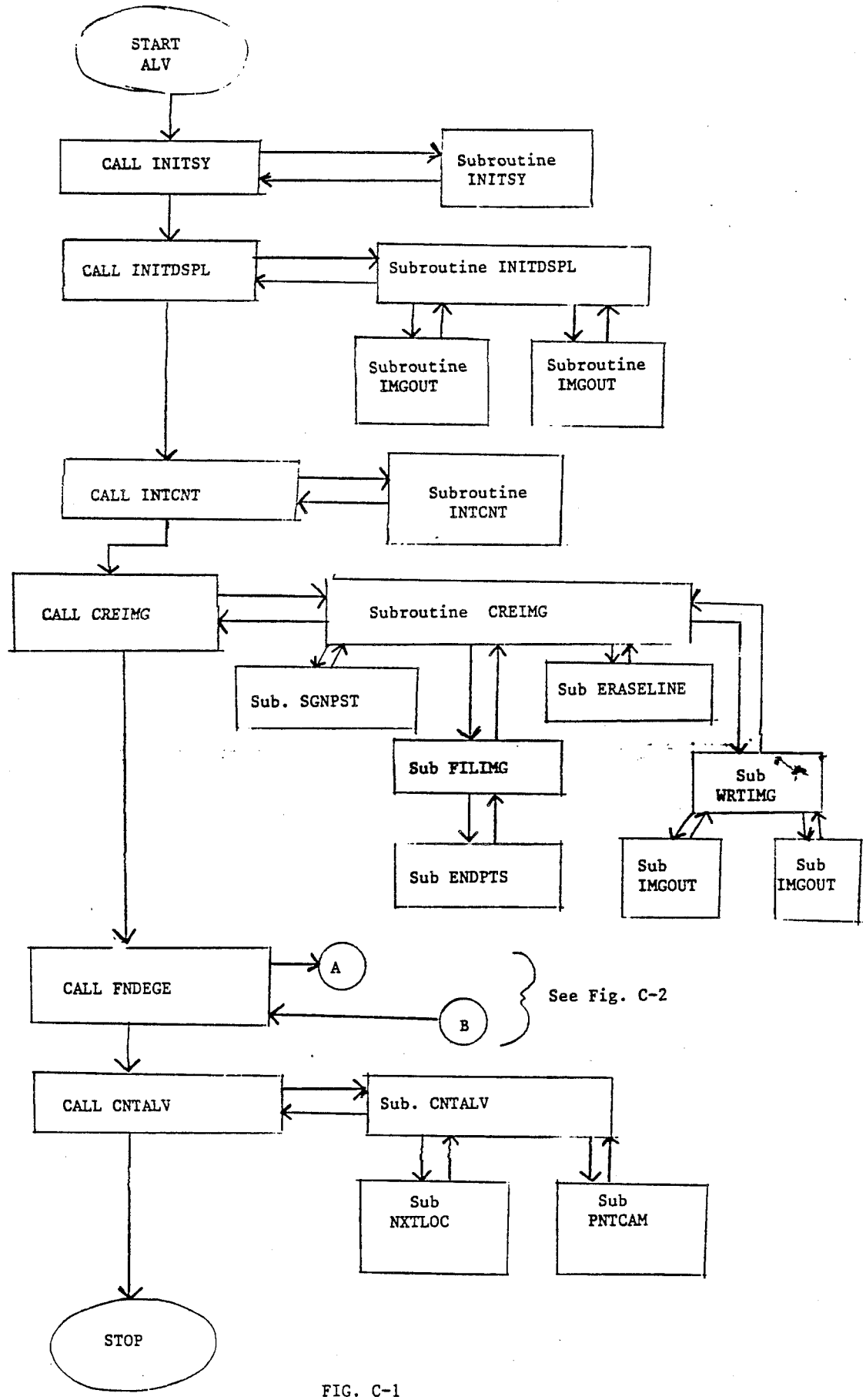
FIG. C-1

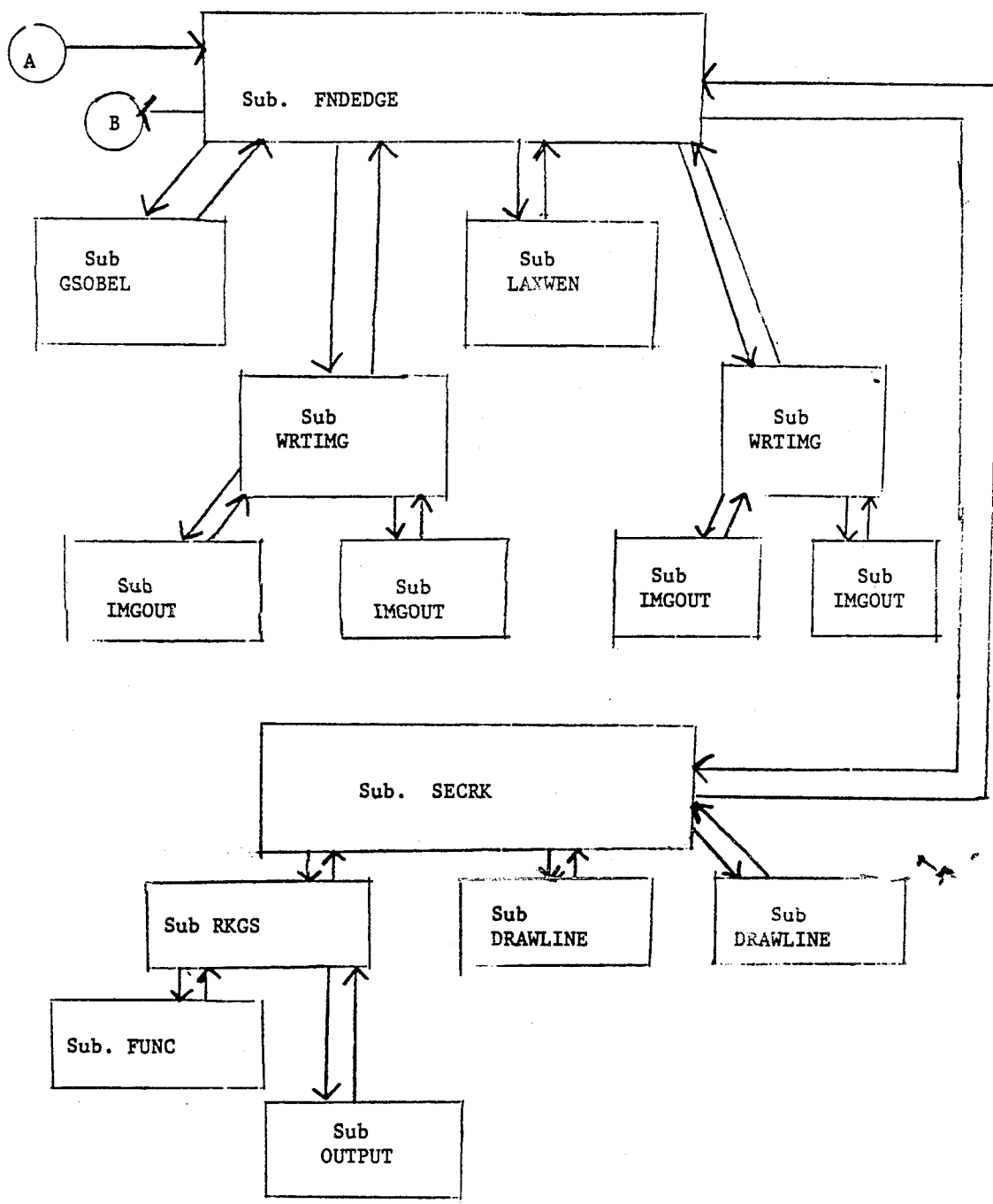
FIG. C-2

```
C       Program ALV
C       This program performs a simulation of the ALV sensing system. It
C       then tests a new algorithm to find the edge of the road. Finally,
C       the ALV is told to move based on this knowledge of the edge of the
C       road.
C
C       Subroutines:
C
C       INITSY          initials the road and ALV parameters
C       CREIMG          CReates the IMAGE from the road parameters
C       FNDEGD          FiND the EDGEs does just that
C       CNTALV          CoNTroL AVL uses the info from FNDEDGE to keep
C                       ALV on the road as it is moved.
C
C
C
C       Meaning of Variables:
C
C       View    is the Current view of the road
C       Dvert   is the delta increment in the vertical direction
C       Dhor    is the delta increment in the hor. direction
C       LRoad   is the array containing the left sign posts
C       RRoad   is the array containing the right sign posts
C       LRd     is the location of the ALV in the Left Road array
C       RRd     is the location of the ALV in the Right Road array
C       ALVloc  is the array containing the x,y position of the ALV
C       ALVvel  is the velocity (sped) of the ALV
C       ALVang  is the angle the ALV is facing (North pi/2, East 0)
C       CAMh    is the angle the ALV camera is facing
C       CAMv    is the depression angle of the camera
C       CAMmdp  is the Maximum depression that is in the field of view
C       CAMdp   is the minimum depression that is in the field of view
C       CAMhfv  is the horizontal (sp) field of view
C       CAMvfv  is the vertical field of view
C       CAMhgt  is the CAMera HeiGhT from the road
C       Tfield  is the total vertical filed of view
C       H0      is the left side of the camera in radians
C       FillRd  is the value of the road in the image
C       SignPost Locations:
C       RDang   is the array containing the depression angles of the right SP
C       RSP     is the array containing the hor. angles of the right SP
C       LDang   is the array containing the depression angles of the left SP
C       LSP     is the array containing the hor. angles of the left SP
C
C------------------------------------------------------------------------
C
C ***************************************************************
C *                                                             *
C *     Define Data Areas                                       *
C *.                                                            *
C ***************************************************************
C
        Include 'ALVinc.inc'
        Real*4 x(0:MaxRd), Y(0:MaxRd), Angle(0:MaxRd)
        Integer*4 Kroad, endroad, maxloop
        common/tmp_test/ kroad REAL * 4 TIME, TIMER
C
C ***************************************************************
```

```
C *                                                                    *
C *      Initialize the Program                                        *
C *                                                                    *
C **********************************************************************
C
        print *, 'Enter maximum number of loops : '
        accept *, maxloop
        endroad = MaxRd-10
        if(endroad.gt.maxloop) endroad = maxloop D       TIMER = SECNDS(0.0)
        Call INITSY
        Call InitDSpl
C       Call INTCNT(x,y,angle)
D       TIME = SECNDS(TIMER)
D       PRINT *,' INTIALIZATION TIME: ', TIME
C
C **********************************************************************
C *                                                                    *
C *          ****   Master Loop   ****                                 *
C *                                                                    *
C **********************************************************************
C
        Do 100 Kroad=1, endroad
        Write(*,*) 'Image No. ',Kroad
C
C **********************************************************************
C *                                                                    *
C *      Create Image of Road                                          *
C *                                                                    *
C **********************************************************************
C
D       TIMER = SECNDS(0.0)
        Call CREIMG
D       TIME = SECNDS(TIMER)
D       PRINT *,' CREATE IMAGE TIME :', TIME
C
C **********************************************************************
C *                                                                    *
C *      Find the Edges of the Road                                    *
C *                                                                    *
C **********************************************************************
C
D       TIMER = SECNDS(0.0)
        Call FNDEDG(View)
D       TIME = SECNDS(TIMER)
D       PRINT *,' FIND EDGE TIME :', TIME
C
C **********************************************************************
C *                                                                    *
C *      CoNTrol the ALV                                               *
C *                                                                    *
C **********************************************************************
C
D       TIMER = SECNDS(0.0)
C       Call CNTALV(x(Kroad),y(Kroad),Angle(Kroad))
        Call CNTALV()
D       TIME = SECNDS(TIMER)
D       PRINT *,'ALV CONTROL TIME :', TIME
C C **********************************************************************
C *                                                                    *
C *      End the program                                               *
C *                                                                    *
C **********************************************************************
C
  100   Continue
        Stop
        End
```

- C4 -

```fortran
      Subroutine INITSY
C
C     This routine reads in the dat afor the road and the ALV parameters
C     It initializes the necassary variables, etc.
C
      Include 'ALVinc.inc'
      INCLUDE 'ALVINC4.INC'
      Character*40 Roadin, ALVin
      Integer*4 I, channl
C
C
C     Note this is in the ALVinc2.inc file *** note ****
C
      Integer*2 loop1,loop2,Force1,Force2
      Common /paralv/ loop1,loop2,Force1,Force2
C Write(*,*) ' Please enter the road file name: '
      Read(*,'(A)') Roadin
C
      Open(unit=50,file=Roadin, Status='old')
      Read(50,*,end=999) (LRoad(1,I),LRoad(2,I),RRoad(1,I)
     1         ,RRoad(2,I),i=1,MaxRd)
      Close(unit=50)
C
C
C
      Write(*,*) ' Please enter the ALV file name: '
      Read(*,'(A)') ALVin
      Open(Unit=50,File=ALVin, Status='old')
      Read(50,102) ALVloc(1),ALVloc(2)
      Read(50,100) ALVvel
      Read(50,100) ALVang
      Read(50,100) CAMh
      Read(50,100) CAMv
      Read(50,100) CAMvfv
      Read(50,100) CAMhfv
      Read(50,100) CAMhgt
      Read(50,101) Channl
      Read(50,101) LRd
      Read(50,101) RRd
      Read(50,103) FillRd,RanRd
      Read(50,103) FillBk,RanBk
      Read(50,103) FillSk,RanSk
      Read(50,101) Loop1
      Read(50,101) Loop2
      Read(50,101) Force1
      Read(50,101) Force2
      READ(50,101) WDSIZE
      READ(50,100) WDCONST
      Close(Unit=50)
100   Format(E20.8)
101   Format(I6)
102   Format(2E20.8)
103   FORMAT(2I6)
C
C     Initialize the constants
C
      Tfield = 2.0 * CAMvfv
      Dvert = Tfield / Float(MaxImg)
```

```
          Dhor = 2.0 * CAMhfv / Float(MaxImg)
          CAMmdp = CAMv + CAMvfv
          CAMdp  = CAMv - CAMvfv C**------Initialize the window (for mult with FFT)
          CALL INITWD Return
C
   999    Continue
          Write(6,*) ' There were not enough road points'

Subroutine IMGOUT(fcb,chanl,MaxImg,view)
C
C         This routine writes out the image, it assumes that the data is scaled
C
          Implicit none
          Integer*2 Fcb(*), chanl, MaxImg, View(0:MaxImg,0:MaxImg)
          Integer*2 I,J,k,START
C
C         Write(*,*) ' '
C         Write(*,1000) 100,(k,k=0,MaxImg)
C         Write(*,*) ' '
          START = 255 - MAXIMG/2
          Do 100 I=0,MaxImg
             j = 255 + MaxImg/2-I
C            Write(*,1000) j,(View(k,j),k=0,MaxImg)
             Call I2S_image(View(0,I),START,J,MaxImg,0,chanl,-1,0,1
         1                  ,0,0,0,0,0)
   100    Continue
  1000    Format(' 'i2,'  ',70i2)
C
          Call I2S_Dexec()
```

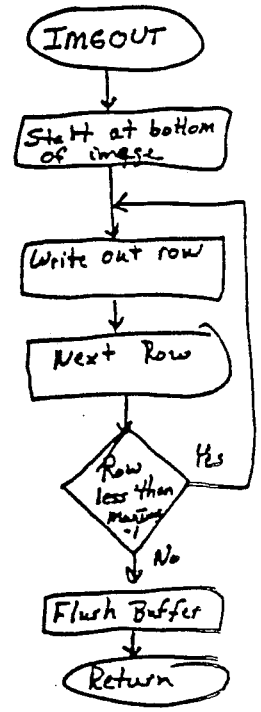

```
          Subroutine CREIMG
          Include 'ALVinc.inc'
C
          Integer*2 Minimg
          Integer*4 LTop,RTop
          Integer*2 x2(0:MaxStk),y2(0:MaxStk),x3(0:MaxStk),y3(0:MaxStk)
          Common /stick/ x2,y2,x3,y3
C
C
C         Find the locations of the sign posts in the image
          Call SGNPST(LTop,RTop)
C
C         Fill the image
          Call FILIMG(Ltop,Rtop)
C
C         Erase the lines
          Call Eraseline(x2,y2,MinStk,MaxStk)
          Call Eraseline(x3,y3,MinStk,MaxStk)
C
C         Write out the image
          Call WRTIMG(View,MaxImg)
          Return
```

- C6 -

```
      Subroutine FILIMG(Ltop,Rtop)
C
C     This routine FILls the IMaGe with the road.
C     It starts with the sign posts at the bottom of the image and works
C     its way up to the top of the image.
      Include 'ALVinc.inc'
      Integer*4 Lpt,Rpt,I,j,Lcnt,Rcnt,Ltop,Rtop,ImgHor
      Real*8 Seed
      Real*4 Rand
      Real*4 T1(0:MaxImg),TT2(0:MaxImg),TT1(0:MaxImg)
      Integer*4 Top
      External Rand
      Data Seed /2.123457/
      Common /p4014 / T1,TT1,TT2,top
C
C     Start at the beginning of the sign post arrays
      Lcnt = 1
      Rcnt = 1
C        Value of the horz. at the Horz.
C
      ImgHor = Nint((CAMvfv + Camv)/dvert)
C
C     Master loop controls the row that is currently being calculated.
      Top = Imghor
      Do 100 i=0,MaxImg
         T1(i) = i
C
C
C
         IF( I .ge. ImgHor ) then
            Do 120 j=0,MaxImg
               View(j,i) = FillSk+NInt((Rand(seed)-.5)*RanSk)
120         Continue
         Else
            Call EndPts(Lpt,Rpt,I,Lcnt,Rcnt,Ltop,Rtop)
               TT1(i) = Lpt
               TT2(i) = Rpt
            Do 110 j=0,MaxImg
               If( j .ge. Lpt .and. j .le. Rpt) then
                  View(j,i) = FillRd+NInt((Rand(seed)-.5)*RanRd)
               Else
                  View(j,i) = FillBk + Nint((Rand(seed)-.5)*RanBk)
               End if
110         Continue
         End if
100   Continue
C
C     That's it! The image has been calculated and stored.
C SUBROUTINE EraseLINE(x2, y2,sno,eno)
      Include 'alvinc2.inc'
      Integer*2 x2(0:MaxImg),y2(0:MaxImg)
      INTEGER * 2 Sno, Eno
      INTEGER * 2 DXOFF, DYOFF, i, J
      INTEGER * 4 CNT, COORDS(2*MXIMG), ERASE_DATA(2*MXIMG)
      DATA ERASE_DATA/MXIMG*0, MXIMG*0/
```

```
C
C**----Erase previous line.
      DXOFF = 256 - Maximg/2
      DYOFF = DXOFF
      J = 1
      Do 100 i=Sno,Eno
         COORDS(J) = DXOFF + x2(i)
         COORDS(J+1) = DYOFF + y2(i)
         J = J + 2
 100  Continue
      CNT = ENO - SNO + 1
      CALL CURVE_DS(-1, COORDS, CNT, 0, '0300'X, ERASE_DATA)

Subroutine FNDEDG(Image1)
C
         Include 'ALVinc2.inc'
         Integer*2 Image1(0:MaxImg,0:MaxImg),Loop,i,j
         Integer*2 Image2(0:MaxImg,0:MaxImg),Iflag,Iloop
         Real*4 Umax, TMP, TMPMAX
         Data Iflag / 1 /
C
C
C ****************************************************************
C *                                                              *
C *    Take the gradient of the image                            *
C *                                                              *
C ****************************************************************
C
         Call Gsobel(Image1,Disp,MaxImg, TMP)
         Write(*,*) 'Diff'
D        Do j=Mstart,MaxImg
D          Do i=0,MaxImg
D            Image2(i,j) = Nint((-disp(i,j)+1.03)*4000 )
D          End do
D        End do
D        Call WrtImg(Image2,MaxImg)
C        Call WImg(disp,Maximg)
C
C
C ****************************************************************
C *                                                              *
C *    Initialize the density "image"                            *
C *                                                              *
C ****************************************************************
C
         DO 300 J = Mstart,MaxImg
           DO 300 I = 0,MaxImg

DISP(I,J) = 1.03 - DISP(I,J)
              R1(I,J) = DISP(I,J)

300     CONTINUE
C
C ****************************************************************
C *                                                              *
C *    Calculate the Fluid Flow                                  *
C *                                                              *
C ****************************************************************
C
         If( Iflag .le. 2) then
           Iloop = Loop1
         Else
           Iloop = Loop2
         End if
```

```
C
        DO 500 LOOP = 1,Iloop
C
C         WRITE(*,2) LOOP
C    2    FORMAT(' CALL LAXWEN   ', I2)
C
         CALL LAXWEN(loop)
         If( 0 .eq. 1 ) then
C          WRite(*,*) 'u1'
C          Call WImg(u1,MaxImg)
C          Write(*,*) 'v1'
C          Call WImg(v1,MaxImg)
C        End if
C
C         WRITE(*,3)
C    3    FORMAT(' RENORMALIZE DATA')
C
         Umax = 0.0
         DO 510 J = Mstart,MaxImg
           DO 510 I = 0,MaxImg
C
C          Reset the density and the velocity (LAXWEN uses momentum)
C
           U1(I,J) = U1(I,J) * DISP(I,J) / R1(I,J)
           V1(I,J) = V1(I,J) * DISP(I,J) / R1(I,J)
           R1(I,J) = DISP(I,J)
           If( umax .lt. abs(U1(i,j)) ) Umax = abs(U1(i,j))

510    CONTINUE
  500   CONTINUE

PRINT *, ' UMAX: ', UMAX

Umax = 126/Umax
D       Do j=Mstart,MaxImg
D         Do i=0,MaxImg
D           Image2(i,j) = Nint(Umax*U1(i,j) ) +127
D         End do
D       End do
D       Call WrtImg(Image2,MaxImg)

C ****************************************************************
C *                                                              *
C *   Throw the stick to find the edges                          *
C *                                                              *
C ****************************************************************
C
        Write(*,*) ' Throwing the sticks'
        Call Stick(Iflag)
        If( Iflag .le. 2 ) Iflag = Iflag + 1
C
C**------LAXWEN4
        SUBROUTINE LAXWEN(Istep)
        Include 'alvinc2.inc'
        INTEGER*2 I, J,Istep REAL*4    A, B,scale,tempu,tempv
        REAL * 4 TIMER, TIME
        TIMER = SECNDS(0.0)
```

```
C*********************
C  ESTIMATE TIME STEP
C*********************

B = 0

C   find largest velocity in two loops
         If( Istep .ne. 1 ) then

DO 200 I = 0,MaxImg-1,2
         DO 200 J = Mstart,MaxImg-1,2
           If( Abs(U1(i,j)) .lt. 1e-9 .and. Abs(V1(i,j)).lt. 1e-9)
    1       goto 200
                 A =  U1(I,J)*U1(I,J) + V1(I,J)*V1(I,J)

IF ( A .GT. B ) B = A

200    CONTINUE

DO 201 J = Mstart+1,MaxImg,2
         DO 201 I = 1,MaxImg,2

A =  U1(I,J)*U1(I,J) + V1(I,J)*V1(I,J)

IF ( A .GT. B ) B = A

201    CONTINUE
         Else if( Istep .eq. 1) then
         Do i=0,MaxImg
         Do j=Mstart,MaxImg
           U1(j,i) = 0.0
           V1(j,i) = 0.0
         end do
         end do
         End if
C
C        Reset the velocity field
C
         If( B .ne. 0 .and. Istep .eq. 1) then
           scale = .02/B
           Do 123 i=0,MaxImg
             Do 124 j=Mstart,MaxImg
               U1(j,i) = U1(j,i)*scale
               V1(j,i) = V1(j,i)*scale
  124        Continue
  123      Continue
         End if C   formula for time step

B = .9 / ( (1 + SQRT(B)) * SQRT(2.) )

A = B / 2
```

- C10 -

```
C*******************************************
C    CALCULATE CONSERVATION LAW QUANTITIES
C    FOR PREDICTOR STEP, IN TWO LOOPS
C*******************************************

DO 400 J = Mstart,MaxImg-1,2
      DO 400 I = 0,MaxImg-1,2

FR(I,J) = U1(I,J)
           Tempu = U1(i,j)/R1(i,j)
           FU(I,J) = U1(I,J)*Tempu + R1(I,J)
           FV(I,J) = Tempu * V1(I,J)

GR(I,J) = V1(I,J)
           GU(I,J) = FV(I,J)
           Tempv = V1(i,j)/R1(i,j)
           GV(I,J) = V1(I,J)*Tempv + R1(I,J)

400  CONTINUE

DO 401 J = Mstart+1,MaxImg,2
      DO 401 I = 1,MaxImg,2

FR(I,J) = U1(I,J)
           Tempu = U1(i,j)/R1(i,j)
           FU(I,J) = U1(I,J)*Tempu + R1(I,J)
           FV(I,J) = Tempu * V1(I,J)

GR(I,J) = V1(I,J)
           GU(I,J) = FV(I,J)
           Tempv = V1(i,j)/R1(i,j)
           GV(I,J) = V1(I,J)*Tempv + R1(I,J)

401  CONTINUE

C****************************************************************
C   TAKE THE PREDICTOR STEP OF TWO-STEP LAX-WENDROFF IN TWO LOOPS
C****************************************************************

DO 500 I = 2,MaxImg-1,2
      DO 500 J = Mstart+1,MaxImg-2,2

R2(I,J) =             FR(I+1,J) - FR(I-1,J)

R2(I,J) = R2(I,J) + GR(I,J+1) - GR(I,J-1)

R2(I,J) = (R1(I-1,J  ) +
     *                R1(I+1,J  ) +
     *                R1(I  ,J-1) +
     *                R1(I  ,J+1) ) / 4
     *              - A * R2(I,J)

U2(I,J) =             FU(I+1,J) - FU(I-1,J)

U2(I,J) = U2(I,J) + GU(I,J+1) - GU(I,J-1)

U2(I,J) = (U1(I-1,J  ) +
     *                U1(I+1,J  ) +
     *                U1(I  ,J-1) +
     *                U1(I  ,J+1) ) *.25
     *              - A * U2(I,J)
```

- C11 -

```
500     CONTINUE
             V2(I,J) =             FV(I+1,J) - FV(I-1,J)

V2(I,J) = V2(I,J) + GV(I,J+1) - GV(I,J-1)

V2(I,J) = (V1(I-1,J  ) +
     *                  V1(I+1,J  ) +
     *                  V1(I  ,J-1) +
     *                  V1(I  ,J+1) ) / 4
     *                - A * V2(I,J)

DO 501 I = 1,MaxImg-2,2
      DO 501 J = Mstart+2,MaxImg-1,2

R2(I,J) =             FR(I+1,J) - FR(I-1,J)

R2(I,J) = R2(I,J) + GR(I,J+1) - GR(I,J-1)

R2(I,J) = (R1(I-1,J  ) +
     *                  R1(I+1,J  ) +
     *                  R1(I  ,J-1) +
     *                  R1(I  ,J+1) ) / 4
     *                - A * R2(I,J)

U2(I,J) =             FU(I+1,J) - FU(I-1,J)

U2(I,J) = U2(I,J) + GU(I,J+1) - GU(I,J-1)

U2(I,J) = (U1(I-1,J  ) +
     *                  U1(I+1,J  ) +
     *                  U1(I  ,J-1) +
     *                  U1(I  ,J+1) ) / 4
     *                - A * U2(I,J)

V2(I,J) =             FV(I+1,J) - FV(I-1,J)

V2(I,J) = V2(I,J) + GV(I,J+1) - GV(I,J-1)

V2(I,J) = (V1(I-1,J  ) +
     *                  V1(I+1,J  ) +
     *                  V1(I  ,J-1) +
     *                  V1(I  ,J+1) ) / 4
     *                - A * V2(I,J)

C**************************************************************
C   CALCULATE THE PREDICTOR STEP OF TWO-STEP LAX-WENDROFF
C   ON THE BOUNDARIES
C**************************************************************

C left vertical boundary

DO 510 J = Mstart+1,MaxImg-2,2

R2(0,J) = FR(1,J) + FR(1,J)
```

- C12 -

```
510     CONTINUE

R2(0,J) = R2(0,J) + GR(0,J+1) - GR(0,J-1)

R2(0,J) = (R1(1,J  ) +
     *                 R1(1,J  ) +
     *                 R1(0  ,J-1) +
     *                 R1(0  ,J+1) ) / 4
     *               - A * R2(0,J)

U2(0,J) = 0

V2(0,J) = FV(1,J) + FV(1,J)

V2(0,J) = V2(0,J) + GV(0,J+1) - GV(0,J-1)

V2(0,J) = (V1(1,J  ) +
     *                 V1(1,J  ) +
     *                 V1(0  ,J-1) +
     *                 V1(0  ,J+1) ) / 4
     *               - A * V2(0,J)

C    right vertical boundary

DO 520 J = Mstart+2,MaxImg-1,2

R2(MaxImg,J) = - FR(MaxImg-1,J) - FR(MaxImg-1,J)

R2(MaxImg,J) = R2(MaxImg,J) + GR(MaxImg,J+1)
     1                   - GR(MaxImg,J-1)

R2(MaxImg,J) = (R1(MaxImg-1,J  ) +
     *                      R1(MaxImg-1,J  ) +
     *                      R1(MaxImg  ,J-1) +
     *                      R1(MaxImg  ,J+1) ) / 4
     *                    - A * R2(MaxImg,J)

U2(MaxImg,J) = 0
            V2(MaxImg,J) = - FV(MaxImg-1,J) - FV(MaxImg-1,J)

V2(MaxImg,J) = V2(MaxImg,J) + GV(MaxImg,J+1)
     1                   - GV(MaxImg,J-1)

V2(MaxImg,J) = (V1(MaxImg-1,J  ) +
     *                      V1(MaxImg-1,J  ) +
     *                      V1(MaxImg  ,J-1) +
     *                      V1(MaxImg  ,J+1) ) / 4
     *                    - A * V2(MaxImg,J)

C    bottom horizontal boundary

DO 511 I = 1,MaxImg-2,2

R2(I,Mstart) =      FR(I+1,Mstart) - FR(I-1,Mstart)
```

- C13 -

```
            R2(I,Mstart) = R2(I,Mstart)
    *       + GR(I  ,Mstart+1) + GR(I   ,Mstart+1)

R2(I,Mstart) = (R1(I-1,Mstart  ) +
    *                  R1(I+1,Mstart  ) +
    *                  R1(I   ,Mstart+1  ) +
    *                  R1(I   ,Mstart+1  ) ) / 4
    *              - A * R2(I,Mstart)

U2(I,Mstart) =        FU(I+1,Mstart) - FU(I-1,Mstart)

U2(I,Mstart) = U2(I,Mstart)
    *       + GU(I  ,Mstart+1) + GU(I   ,Mstart+1)

U2(I,Mstart) = (U1(I-1,Mstart  ) +
    *                  U1(I+1,Mstart  ) +
    *                  U1(I   ,Mstart+1  ) +
    *                  U1(I   ,Mstart+1  ) ) / 4
    *              - A * U2(I,Mstart)

V2(I,Mstart) = 0

511    CONTINUE

C   top horizontal boundary

DO 521 I = 2,MaxImg-1,2

R2(I,MaxImg) =       FR(I+1,MaxImg) - FR(I-1,MaxImg)

R2(I,MaxImg) = R2(I,MaxImg)
  1                     - GR(I   ,MaxImg-1) - GR(I   ,MaxImg-1)

R2(I,MaxImg) = (R1(I-1,MaxImg  ) +
    *                  R1(I+1,MaxImg  ) +
    *                  R1(I   ,MaxImg-1  ) +
    *                  R1(I   ,MaxImg-1  ) ) / 4
    *              - A * R2(I,MaxImg)

U2(I,MaxImg) =  FU(I+1,MaxImg) - FU(I-1,MaxImg)

U2(I,MaxImg) = U2(I,MaxImg)
  1                     - GU(I   ,MaxImg-1) - GU(I,MaxImg-1)

U2(I,MaxImg) = (U1(I-1,MaxImg  ) +
    *                  U1(I+1,MaxImg  ) +
    *                  U1(I   ,MaxImg-1  ) +
    *                  U1(I   ,MaxImg-1  ) ) / 4
    *              - A * U2(I,MaxImg)

V2(I,MaxImg) = 0

521    CONTINUE

C
C       The corners
C
```

```
              R1(0,MaxImg) = (R1(1,MaxImg) + R1(0,MaxImg-1) )*.5
    1                - A * (- GR(0,MaxImg-1) - GR(0,MaxImg-1)
    *                + FR(1,MaxImg) + FR(1,MaxImg))

R1(MaxImg,Mstart) = (R1(MaxImg,Mstart+1)
    1                + R1(MaxImg-1,Mstart) )*.5
    1                - A * (GR(MaxImg,Mstart+1) + GR(MaxImg,Mstart+1)
    *                - FR(MaxImg-1,Mstart) - FR(MaxImg-1,Mstart))

C*******************************************
C   CALCULATE CONSERVATION LAW QUANTITIES
C   FOR CORRECTOR STEP, IN TWO LOOPS
C*******************************************

DO 600 J = Mstart+1,MaxImg,2
        DO 600 I = 0,MaxImg-1,2

FR(I,J) = U1(I,J)
              Tempu = U1(i,j)/R1(i,j)
              FU(I,J) = U1(I,J)*Tempu + R1(I,J)
              FV(I,J) = Tempu * V1(I,J)

GR(I,J) = V1(I,J)
              GU(I,J) = FV(I,J)
              Tempv = V1(i,j)/R1(i,j)
              GV(I,J) = V1(I,J)*Tempv + R1(I,J)

600     CONTINUE

DO 601 J = Mstart,MaxImg-1,2
        DO 601 I = 1,MaxImg,2

FR(I,J) = U1(I,J)
              Tempu = U1(i,j)/R1(i,j)
              FU(I,J) = U1(I,J)*Tempu + R1(I,J)
              FV(I,J) = Tempu * V1(I,J)

GR(I,J) = V1(I,J)
              GU(I,J) = FV(I,J)
              Tempv = V1(i,j)/R1(i,j)
              GV(I,J) = V1(I,J)*Tempv + R1(I,J)

601     CONTINUE
C***************************************************************
C   TAKE THE CORRECTOR STEP OF TWO-STEP LAX-WENDROFF IN TWO LOOPS
C***************************************************************

DO 700 J = Mstart+2,MaxImg-1,2
        DO 700 I = 2,MaxImg-1,2

R1(I,J) = R1(I,J) - B * (GR(I,J+1) - GR(I,J-1)
    *                          + FR(I+1,J) - FR(I-1,J))

U1(I,J) = U1(I,J) - B * (GU(I,J+1) - GU(I,J-1)
    *                          + FU(I+1,J) - FU(I-1,J))
```

```
              V1(I,J) = V1(I,J) - B * (GV(I,J+1) - GV(I,J-1)
       *                             + FV(I+1,J) - FV(I-1,J))

700    CONTINUE

DO 701 J = Mstart+1,MaxImg-2,2
         DO 701 I = 1,MaxImg-2,2

R1(I,J) = R1(I,J) - B * (GR(I,J+1) - GR(I,J-1)
       *                             + FR(I+1,J) - FR(I-1,J))

U1(I,J) = U1(I,J) - B * (GU(I,J+1) - GU(I,J-1)
       *                             + FU(I+1,J) - FU(I-1,J))

V1(I,J) = V1(I,J) - B * (GV(I,J+1) - GV(I,J-1)
       *                             + FV(I+1,J) - FV(I-1,J))

701    CONTINUE

C*********************************************************
C   CALCULATE THE CORRECTOR STEP OF TWO-STEP LAX-WENDROFF
C   ON THE BOUNDARIES
C*********************************************************

DO 710 J = Mstart+2,MaxImg-1,2

C   left vertical boundary

R1(0,J) = R1(0,J) - B * (FR(1,J  ) + FR(1,J  ) +
       *                               GR(0,J+1) - GR(0,J-1))

V1(0,J) = V1(0,J) - B * (FV(1,J  ) + FV(1,J  ) +
       *                               GV(0,J+1) - GV(0,J-1))

710    Continue
C  right vertical boundary
         DO 712 J = Mstart+1,MaxImg-2,2

R1(MaxImg,J) = R1(MaxImg,J)
      1            - B * (-FR(MaxImg-1,J  ) - FR(MaxImg-1,J  ) +
       *              GR(MaxImg,J+1) - GR(MaxImg,J-1))

V1(MaxImg,J) = V1(MaxImg,J)
      1            - B * (-FV(MaxImg-1,J  ) - FV(MaxImg-1,J  ) +
       *              GV(MaxImg,J+1) - GV(MaxImg,J-1))

712    CONTINUE

DO 711 I = 2,MaxImg-1,2
```

C  bottom horizontal boundary

```
            R1(I,Mstart) = R1(I,Mstart) - B * (GR(I  ,1) + GR(I  ,1)
    *                         + FR(I+1,Mstart) - FR(I-1,Mstart))

U1(I,Mstart) = U1(I,Mstart) - B * (GU(I  ,1) + GU(I  ,1)
    *                         + FU(I+1,Mstart) - FU(I-1,Mstart))
711     Continue C  top horizontal boundary
        DO 713 I = 1,MaxImg-2,2

R1(I,MaxImg) = R1(I,MaxImg)
   1              - B * (-GR(I  ,MaxImg-1) - GR(I  ,MaxImg-1)
    *                  + FR(I+1,MaxImg) - FR(I-1,MaxImg))

U1(I,MaxImg) = U1(I,MaxImg)
   1              - B * (-GU(I  ,MaxImg-1) - GU(I  ,MaxImg-1)
    *                  + FU(I+1,MaxImg) - FU(I-1,MaxImg))

713     CONTINUE

R1(0,Mstart) = R1(0,Mstart)
    *              - B * (GR(0,Mstart+1) + GR(0,Mstart+1)
    *                   + FR(1,Mstart) + FR(1,Mstart))

R1(MaxImg,MaxImg) = R1(MaxImg,MaxImg)
   1              - B*(-GR(MaxImg,MaxImg-1)-GR(MaxImg,MaxImg-1)
    *                  -FR(MaxImg-1,MaxImg) - FR(MaxImg-1,MaxImg))

TIME = SECNDS(TIMER)
        PRINT *, 'ORIG LAXWEN TIME : ', TIME

RETURN
        END
C       SUBROUTINE RKGS
C
C       PURPOSE
C          TO SOLVE A SYSTEM OF FIRST ORDER ORDINARY DIFFERENTIAL
C          EQUATIONS WITH GIVEN INITIAL VALUES.
C
C       USAGE
C          CALL RKGS (PRMT,Y,DERY,NDIM,IHLF,FCT,OUTP,AUX)
C          PARAMETERS FCT AND OUTP REQUIRE AN EXTERNAL STATEMENT.
C
C       DESCRIPTION OF PARAMETERS
C          PRMT    - AN INPUT AND OUTPUT VECTOR WITH DIMENSION GREATER
C                    OR EQUAL TO 5, WHICH SPECIFIES THE PARAMETERS OF
C                    THE INTERVAL AND OF ACCURACY AND WHICH SERVES FOR
C                    COMMUNICATION BETWEEN OUTPUT SUBROUTINE (FURNISHED
C                    BY THE USER) AND SUBROUTINE RKGS. EXCEPT PRMT(5)
C                    THE COMPONENTS ARE NOT DESTROYED BY SUBROUTINE
C                    RKGS AND THEY ARE
C          PRMT(1)- LOWER BOUND OF THE INTERVAL (INPUT),
C          PRMT(2)- UPPER BOUND OF THE INTERVAL (INPUT),
C          PRMT(3)- INITIAL INCREMENT OF THE INDEPENDENT VARIABLE
C                    (INPUT),
C          PRMT(4)- UPPER ERROR BOUND (INPUT). IF ABSOLUTE ERROR IS
```

```
C                     GREATER THAN PRMT(4), INCREMENT GETS HALVED.
C                     IF INCREMENT IS LESS THAN PRMT(3) AND ABSOLUTE
C                     ERROR LESS THAN PRMT(4)/50, INCREMENT GETS DOUBLED.
C                     THE USER MAY CHANGE PRMT(4) BY MEANS OF HIS
C                     OUTPUT SUBROUTINE.
C            PRMT(5)- NO INPUT PARAMETER. SUBROUTINE RKGS INITIALIZES
C                     PRMT(5)=0. IF THE USER WANTS TO TERMINATE
C                     SUBROUTINE RKGS AT ANY OUTPUT POINT, HE HAS TO
C                     CHANGE PRMT(5) TO NON-ZERO BY MEANS OF SUBROUTINE
C                     OUTP. FURTHER COMPONENTS OF VECTOR PRMT ARE
C                     FEASIBLE IF ITS DIMENSION IS DEFINED GREATER
C                     THAN 5. HOWEVER SUBROUTINE RKGS DOES NOT REQUIRE
C                     AND CHANGE THEM. NEVERTHELESS THEY MAY BE USEFUL
C                     FOR HANDING RESULT VALUES TO THE MAIN PROGRAM
C                     (CALLING RKGS) WHICH ARE OBTAINED BY SPECIAL
C                     MANIPULATIONS WITH OUTPUT DATA IN SUBROUTINE OUTP.
C            Y      - INPUT VECTOR OF INITIAL VALUES.  (DESTROYED)
C                     LATERON Y IS THE RESULTING VECTOR OF DEPENDENT
C                     VARIABLES COMPUTED AT INTERMEDIATE POINTS X.
C            DERY   - INPUT VECTOR OF ERROR WEIGHTS.  (DESTROYED)
C                     THE SUM OF ITS COMPONENTS MUST BE EQUAL TO 1.
C                     LATERON DERY IS THE VECTOR OF DERIVATIVES, WHICH
C                     BELONG TO FUNCTION VALUES Y AT A POINT X.
C            NDIM   - AN INPUT VALUE, WHICH SPECIFIES THE NUMBER OF
C                     EQUATIONS IN THE SYSTEM.
C            IHLF   - AN OUTPUT VALUE, WHICH SPECIFIES THE NUMBER OF
C                     BISECTIONS OF THE INITIAL INCREMENT. IF IHLF GETS
C                     GREATER THAN 10, SUBROUTINE RKGS RETURNS WITH
C                     ERROR MESSAGE IHLF=11 INTO MAIN PROGRAM. ERROR
C                     MESSAGE IHLF=12 OR IHLF=13 APPEARS IN CASE
C                     PRMT(3)=0 OR IN CASE SIGN(PRMT(3)).NE.SIGN(PRMT(2)-
C                     PRMT(1)) RESPECTIVELY.
C            FCT    - THE NAME OF AN EXTERNAL SUBROUTINE USED. THIS
C                     SUBROUTINE COMPUTES THE RIGHT HAND SIDES DERY OF
C                     THE SYSTEM TO GIVEN VALUES X AND Y. ITS PARAMETER
C                     LIST MUST BE X,Y,DERY. SUBROUTINE FCT SHOULD
C                     NOT DESTROY X AND Y.
C            OUTP   - THE NAME OF AN EXTERNAL OUTPUT SUBROUTINE USED.
C                     ITS PARAMETER LIST MUST BE X,Y,DERY,IHLF,NDIM,PRMT.
C                     NONE OF THESE PARAMETERS (EXCEPT, IF NECESSARY,
C                     PRMT(4),PRMT(5),...) SHOULD BE CHANGED BY
C                     SUBROUTINE OUTP. IF PRMT(5) IS CHANGED TO NON-ZERO,
C                     SUBROUTINE RKGS IS TERMINATED.
C            AUX    - AN AUXILIARY STORAGE ARRAY WITH 8 ROWS AND NDIM
C                     COLUMNS.
C
C        REMARKS
C            THE PROCEDURE TERMINATES AND RETURNS TO CALLING PROGRAM, IF
C            (1) MORE THAN 10 BISECTIONS OF THE INITIAL INCREMENT ARE
C                NECESSARY TO GET SATISFACTORY ACCURACY (ERROR MESSAGE
C                IHLF=11),
C            (2) INITIAL INCREMENT IS EQUAL TO 0 OR HAS WRONG SIGN
C                (ERROR MESSAGES IHLF=12 OR IHLF=13),
C            (3) THE WHOLE INTEGRATION INTERVAL IS WORKED THROUGH,
C            (4) SUBROUTINE OUTP HAS CHANGED PRMT(5) TO NON-ZERO.
C
C        SUBROUTINES AND FUNCTION SUBPROGRAMS REQUIRED
C            THE EXTERNAL SUBROUTINES FCT(X,Y,DERY) AND
C            OUTP(X,Y,DERY,IHLF,NDIM,PRMT) MUST BE FURNISHED BY THE USER.
C
C        METHOD
C            EVALUATION IS DONE BY MEANS OF FOURTH ORDER RUNGE-KUTTA
C            FORMULAE IN THE MODIFICATION DUE TO GILL. ACCURACY IS
C            TESTED COMPARING THE RESULTS OF THE PROCEDURE WITH SINGLE
```

```
C           AND DOUBLE INCREMENT.
C           SUBROUTINE RKGS AUTOMATICALLY ADJUSTS THE INCREMENT DURING
C           THE WHOLE COMPUTATION BY HALVING OR DOUBLING. IF MORE THAN
C           10 BISECTIONS OF THE INCREMENT ARE NECESSARY TO GET
C           SATISFACTORY ACCURACY, THE SUBROUTINE RETURNS WITH
C           ERROR MESSAGE IHLF=11 INTO MAIN PROGRAM.
C           TO GET FULL FLEXIBILITY IN OUTPUT, AN OUTPUT SUBROUTINE
C           MUST BE FURNISHED BY THE USER.
C           FOR REFERENCE, SEE
C           RALSTON/WILF, MATHEMATICAL METHODS FOR DIGITAL COMPUTERS,
C           WILEY, NEW YORK/LONDON, 1960, PP.110-120.
C
C           ..........................................................
C
      SUBROUTINE RKGS(PRMT,Y,DERY,NDIM,IHLF,FCT,OUTP,AUX)
C
C
      INTEGER*2 NDIM,IHLF
      REAL*4 Y(Ndim),DERY(NDim),AUX(8,NDIM),A(4),B(4),C(4),PRMT(5)
      Common /step/ H
      DO 1 I=1,NDIM
    1 AUX(8,I)=.06666667*DERY(I)
      X=PRMT(1)
      XEND=PRMT(2)
      H=PRMT(3)
      PRMT(5)=0.
      CALL FCT(X,Y,DERY)
C
C     ERROR TEST
      IF(H*(XEND-X))38,37,2
C
C     PREPARATIONS FOR RUNGE-KUTTA METHOD
    2 A(1)=.5
      A(2)=.2928932
      A(3)=1.707107
      A(4)=.1666667
      B(1)=2.
      B(2)=1.
      B(3)=1.
      B(4)=2.
      C(1)=.5
      C(2)=.2928932
      C(3)=1.707107
      C(4)=.5
C
C     PREPARATIONS OF FIRST RUNGE-KUTTA STEP
      DO 3 I=1,NDIM
      AUX(1,I)=Y(I)
      AUX(2,I)=DERY(I)
      AUX(3,I)=0.
    3 AUX(6,I)=0.
      IREC=0
      H=H+H
      IHLF=-1
      ISTEP=0
      IEND=0
C
C
C     START OF A RUNGE-KUTTA STEP
    4 IF((X+H-XEND)*H)7,6,5
    5 H=
    6
C
C     R            AL VALUES OF THIS STEP
```

```
      7 CAL          IREC,NDIM,PRMT)
        IF(
      8 ITE
      9 IST
C
C
C       START OF INNERMOST RUNGE-KUTTA LOOP
        J=1
     10 AJ=A(J)
        BJ=B(J)
        CJ=C(J)
        DO 11 I=1,NDIM
        R1=H*DERY(I)
        R2=AJ*(R1-BJ*AUX(6,I))
        Y(I)=Y(I)+R2
        R2=R2+R2+R2
     11 AUX(6,I)=AUX(6,I)+R2-CJ*R1
        IF(J-4)12,15,15
     12 J=J+1
        IF(J-3)13,14,13
     13 X=X+.5*H
     14 CALL FCT(X,Y,DERY)
        GOTO 10
C       END OF INNERMOST RUNGE-KUTTA LOOP
C
C
C       TEST OF ACCURACY
     15 IF(ITEST)16,16,20
C
C       IN CASE ITEST=0 THERE IS NO POSSIBILITY FOR TESTING OF ACCURACY
     16 DO 17 I=1,NDIM
     17 AUX(4,I)=Y(I)
        ITEST=1
        ISTEP=ISTEP+ISTEP-2
     18 IHLF=IHLF+1
        X=X-H
        H=.5*H
        DO 19 I=1,NDIM
        Y(I)=AUX(1,I)
        DERY(I)=AUX(2,I)
     19 AUX(6,I)=AUX(3,I)
        GOTO 9
C
C       IN CASE ITEST=1 TESTING OF ACCURACY IS POSSIBLE
     20 IMOD=ISTEP/2
        IF(ISTEP-IMOD-IMOD)21,23,21
     21 CALL FCT(X,Y,DERY)
        DO 22 I=1,NDIM
        AUX(5,I)=Y(I)
     22 AUX(7,I)=DERY(I)
        GOTO 9
C
C       COMPUTATION OF TEST VALUE DELT
     23 DELT=0.
        DO 24 I=1,NDIM
     24 DELT=DELT+AUX(8,I)*ABS(AUX(4,I)-Y(I))
        IF(DELT-PRMT(4))28,28,25
C
C       ERROR IS TOO GREAT
     25 IF(IHLF-10)26,36,36
     26 DO 27 I=1,NDIM
     27 AUX(4,I)=AUX(5,I)
        ISTEP=ISTEP+ISTEP-4
        X=X-H
```

```
      IEND=0
      GOTO 18
C
C     RESULT VALUES ARE GOOD
   28 CALL FCT(X,Y,DERY)
      DO 29 I=1,NDIM
      AUX(1,I)=Y(I)
      AUX(2,I)=DERY(I)
      AUX(3,I)=AUX(6,I)
      Y(I)=AUX(5,I)
   29 DERY(I)=AUX(7,I)
      CALL OUTP(X-H,Y,DERY,IHLF,NDIM,PRMT)
      IF(PRMT(5))40,30,40
   30 DO 31 I=1,NDIM
      Y(I)=AUX(1,I)
   31 DERY(I)=AUX(2,I)
      IREC=IHLF
      IF(IEND)32,32,39
C
C     INCREMENT GETS DOUBLED
   32 IHLF=IHLF-1
      ISTEP=ISTEP/2
      H=H+H
      IF(IHLF)4,33,33
   33 IMOD=ISTEP/2
      IF(ISTEP-IMOD-IMOD)4,34,4
   34 IF(DELT-.02*PRMT(4))35,35,4
   35 IHLF=IHLF-1
      ISTEP=ISTEP/2
      H=H+H
      GOTO 4
C
C
C     RETURNS TO CALLING PROGRAM
   36 IHLF=11
      CALL FCT(X,Y,DERY)
      GOTO 39
   37 IHLF=12
      GOTO 39
   38 IHLF=13
   39 CALL OUTP(X,Y,DERY,IHLF,NDIM,PRMT)
   40 RETURN
      END
      Subroutine Output(x,y,Dery,Ihlf,Ndim,Param)
C
      Include 'ALVinc2.inc'
C     Include 'AlvInc3.inc'
      Real*4 PARAM(5),TestP(MinStk:MaxStk,2),Acc,x
      Real*4 W(2,MinStk:MaxStk,2),dery(2,MinStk:MaxStk,2)
      Real*4 Y(2,MinStk:MaxStk,2),H
      Integer*4 i,Ndim,ihlf
      INTEGER * 4 ICNT Integer*2 X2(0:maxStk),Y2(0:maxStk),X3(0:maxStk),Y3(0:maxStk)
      common/stick/ x2, y2, x3, y3
      Common /test/ TestP,Acc, ICNT
      Common /step/ H
      integer * 4 kroad, kroad_val
      common/tmp_test/ kroad

ICNT = ICNT + 1 kroad_val = KROAD
      if(kroad.eq.kroad_val) then
```

```
c**--------examine loop closer for debug
        call eraseline(x2, y2, minstk, maxstk)
        call eraseline(x3, y3, minstk, maxstk)
        do i=Minstk,Maxstk
           x2(i) = nint(y(1,i,1))
           x3(i) = nint(y(1,i,2))
           y2(i) = maximg - i - 1
           y3(i) = y2(i)
        enddo
        call drawline(x2, y2, minstk, maxstk)
        call drawline(x3, y3, minstk, maxstk)
      endif
C
C     Write(*,*) ' Step= ',step
C     Write(*,*) ' Ihlf=',Ihlf
      Do 100 i=MinStk,MaxStk
      IF (ABS(Y(1,i,1) -TestP(i,1)).GT. Acc .OR.
   1      ABS(Y(1,i,2) -TestP(i,2)).GT. Acc ) goto 200
 100  Continue
C     If we made it through the loop we are done and should stop
      PARAM(5) = 1.
      Write(*,*) ' Converged ************** Make it'
      WRITE(*,*) ' STEPS = ',ICNT
      Return
C
 200  Continue
      IF( ICNT .LT. 150) GOTO 205
      PARAM(5) = 1.
      Write(*,*) ' DID NOT CONVERGE '
      RETURN
 205  CONTINUE
C     We are not done so save the current location
      Do 300 i=MinStk,MaxStk
         TestP(i,1) = Y(1,i,1)
         TestP(i,2) = Y(1,i,2)
 300  Continue
C     Write(*,*) ' Left line'
C     WRITE(6,102) Y(1,12,1),Y(1,16,1),Y(1,20,1),Y(1,24,1),Y(1,28,1)
C     WRITE(6,102) Y(2,12,1),Y(2,16,1),Y(2,20,1),Y(2,24,1),Y(2,28,1)
-C    Write(*,*) ' Right Line'
C     WRITE(6,102) Y(1,12,2),Y(1,16,2),Y(1,20,2),Y(1,24,2),Y(1,28,2)
C     WRITE(6,102) Y(2,12,2),Y(2,16,2),Y(2,20,2),Y(2,24,2),Y(2,28,2)
C 102 FORMAT(1X,5F10.3)
C
      RETURN
      END
      Subroutine CNTALV()
C     Subroutine CNTALV(x1,y1,Angle)
C
C
      Include 'ALVinc.inc'
      Include 'ALVinc3.inc'
      Real*4 x1,y1,angle
C
C     Get the next location
C
      Call NXTLOC(x1,y1)
C
C     Next direction to point the camera
C
      Call PNTCAM(X1,Y1)

D     Write(*,*) ' Old Location ',ALVloc(1),ALVloc(2)
D     Write(*,*) ' New Location ',X1,Y1
```

```
            ALVloc(1) = X1
            ALVloc(2) = Y1

Return
            End
            Subroutine PNTCAM(x1,y1)
C
            Include 'ALVinc.inc'
            Include 'ALVinc3.inc'
            Real*4 x1,y1,angle,Sdep,ImgDep,AvgAng,x2,y2,xyang
            Integer*2 J1,j2
C    Depression of the spot on the road we want the camera pointed at
C
C    This is only approximate but should be very close
            Sdep = atan(Camhgt/(20.))
C
C    Zero at the bottom of the image this is the depression stop
C
            ImgDep = CAMmdp - Sdep
C
C    line above and line below
            J1 = Int(ImgDep/Dvert)
C           Write(*,*) ' This is the image row ',j1
            J2 = J1 + 1
C    find the average angle for the "middle of the road"
C
            avgang = .25*(y(1,j1,1) + y(1,j1,2)+y(1,j2,1)+y(1,j2,2))*Dhor
C
C    x2,y2 angle is then:
C
C
            xyang = -avgang + h0
C           Write(*,*) ' The Average Angle is',AvgAng
C           Write(*,*) ' The Average XYang Angle is',Xyang
C
C    The new x2,y2 position of the camera is
C
            X2 = ALVloc(1) + 20. * cos(xyang)
            Y2 = ALVloc(2) + 20. * sin(xyang)
C           WRITE(*,*) ' The Camera spot ',X2,Y2
C
C    Have the new camera direction
C
            CAMh = Atan2( y2-y1,x2-x1)
C           Write(*,*) ' Camera angle ',Camh
            Return
            End
      SUBROUTINE INITDSPL
      IMPLICIT NONE C**---Subroutine to initialize I2S, display the 31x31 density & velocity
C**   ford files and zoom.

INTEGER * 4 TRANSP

C**---Set colors.
      TRANSP = 0
      CALL OVERLAY_MAP_DS(1.0, 0.0, 0.0, TRANSP, 0, '0100'X)
      CALL OVERLAY_MAP_DS(0.0, 1.0, 0.0, TRANSP, 0, '0200'X)
      CALL OVERLAY_MAP_DS(1.0, 1.0, 0.0, TRANSP, 0, '0300'X)
      CALL OVERLAY_MAP_DS(0.0, 0.0, 1.0, TRANSP, 0, '0400'X)
      CALL OVERLAY_MAP_DS(1.0, 0.0, 1.0, TRANSP, 0, '0500'X)
      CALL OVERLAY_MAP_DS(0.0, 1.0, 1.0, TRANSP, 0, '0600'X)
      CALL OVERLAY_MAP_DS(1.0, 1.0, 1.0, TRANSP, 0, '0700'X)
C**---Blank all channels.
```

```
        CALL CLEAR_DS(127, 1,1, 512,512, 0, '00FF'X)
        CALL CLEAR_DS(  0, 1,1, 512,512, 0, '0F00'X)

C**----Zoom to center of screen.
        CALL ROAM_DS(256, 256, 0)
        CALL ZOOM_DS(8, 0)

RETURN
        END
           Subroutine INTCNT(x,y,Angle)
C
C       This routine initializes the ALV path for test run
C
        Include 'ALVinc.inc'
C
        Real*4 X(0:MaxRd),Y(0:MaxRd),Step,Kroad
        Real*4 Angle(0:MaxRd),Dangle,width
        Integer*4 I,N
        Character*40 Filein
C
        Write(*,*) ' Please enter the input file name'
        Read(*,1002) filein
        Open(Unit=50,File=Filein,Status='Old')
 1002   Format(a)
C
        Read(50,*) Step
        Read(50,*) Angle(0)
        Read(50,*) Width
        Read(50,*) x(0),y(0)
        Kroad = 0
  100   Continue
        Read(50,*,end=120) DAngle,N
        Do 110 i=1,N
           Kroad = Kroad + 1
           If( Kroad .gt. MaxRd) go to 120
           Angle(Kroad) = Angle(Kroad-1) + Dangle
           x(Kroad) = x(Kroad-1) + cos(Angle(Kroad))*step
           y(Kroad) = y(Kroad-1) + sin(Angle(Kroad))*step
  110   Continue
        Go to 100
  120   Continue
        Return
        End
C**------SGNPST2
        Subroutine Sgnpst(Lk,Rk)
C
        Include 'ALVinc.inc'
        Real*4 Xtemp,Ytemp,Rtemp
        Integer*4 Rk,Lk,I
        Real*4 Pi,Pi2
        Parameter( Pi = 3.141592654, Pi2 = 6.283185308 )
C
C       This routine calculates the locations of the left and right sign
C       posts. These sign posts are stored in arrays. The first and last
C       array elements are "off" the bottom and top of the image,
C       respectively. In addition, the sign posts may be off to either
C       side of image, we do not make note of this.
C
C       Initialize the value of the left side of the field of view.
C
        H0 = CAMh + CAMhfv
C       Write(*,*) 'H0= ',h0
C       Write(*,*) 'CAMmdp=', Cammdp
C
```

```
C ***************************************************************
C *                                                               *
C * Calculate the location of the Left Sign Posts in the Image    *
C *                                                               *
C ***************************************************************
C
C              Finds the sign posts which are the first off the image
C              the first on the bottom of the image.
C
C              vertical location of the first sign post
C                      (1,LRd)-ALVloc(1)
C                      (2,LRd)-ALVloc(2)
C                      XTEMP*XTEMP + YTEMP*YTEMP)
C                   n2(YTEMP, XTEMP) + H0
C                    'LSP(1) = ',LSP(1)
         If( LSP(1) .le. -Pi ) LSP(1) = LSP(1) + Pi2
         If( LSP(1) .ge.  Pi ) LSP(1) = LSP(1) - Pi2
         LDang(1) = Atan2(CAMhgt,RTEMP*cos(LSP(1)-CAMhfv))
C
C        Write(*,*) 'R=',RTEMP
C        Write(*,*) 'LDang(1)= ',Ldang(1)
         If( LDang(1) .lt. CAMmdp ) then
            Write(*,*) ' Did not find first left signpost'
         End if
C
  110    Continue
C        Calculate the vertical location of the second sign post
         Xtemp = Lroad(1,LRd+1)-ALVloc(1)
         Ytemp = Lroad(2,LRd+1)-ALVloc(2)
         Rtemp = SQRT(XTEMP*XTEMP + YTEMP*YTEMP)
         LSP(2) = -atan2(Ytemp,Xtemp) + H0
         If( LSP(2) .le. -Pi ) LSP(2) = LSP(2) + Pi2
         If( LSP(2) .ge.  Pi ) LSP(2) = LSP(2) - Pi2
         LDang(2) = Atan2(CAMhgt, Rtemp*cos(LSP(2)-CAMhfv) )
C        Write(*,*) 'LRd+1= ',Lrd+1,' LDang= ',LDang(2)
         If( .not. (LDang(1).ge.CAMMdp.and.LDang(2).le.CAMMdp)) then
            LDang(1) = LDang(2)
            LSP(1) = LSP(2)
            LRd = LRd + 1
            Go to 110
         End if
C
         LDang(1) = -LDang(1) + CAMmdp
         LDang(2) = -LDang(2) + CAMmdp
C        Write(*,*) 'LRd= ',Lrd,' LDang = ',LDang(1),LDang(2)
C
C
C        Find all sign post in the image plus the next one
C
         LK = 2
         Do 100 i=LRd+2,MaxRd-1
C
            LK = LK+1
            Xtemp = Lroad(1,i)-ALVloc(1)
            Ytemp = Lroad(2,i)-ALVloc(2)
            RTEMP = SQRT(XTEMP*XTEMP + YTEMP*YTEMP)
            LSP(Lk) = -atan2(Ytemp,Xtemp) + H0
            If( LSP(Lk) .le. -Pi ) LSP(Lk) = LSP(Lk) + Pi2
            If( LSP(Lk) .ge.  Pi ) LSP(Lk) = LSP(Lk) - Pi2
            LDang(Lk) = -Atan2(CAMhgt,RTEMP*Cos(LSP(Lk)-CAMhfv)) +
     +                  CAMmdp
            If( LDang(Lk) .ge. Tfield ) then
               Go to 120
            End if
  100    Continue
```

```
    120   Continue
C
C
C ***************************************************************
C *                                                             *
C * Calculate the location of the Right Sign Posts in the Image *
C *                                                             *
C ***************************************************************
C
C       This loop finds the sign posts which are the first off the image
C       bottom and the first on the bottom of the image.
C
C       Calculate the vertical location of the first sign post
        XTEMP = Rroad(1,RRd)-ALVloc(1)
        YTEMP = Rroad(2,RRd)-ALVloc(2)
        RTEMP = SQRT(XTEMP*XTEMP + YTEMP*YTEMP)
        RSP(1) =-Atan2(YTEMP, XTEMP) + H0
        If( RSP(1) .le. -Pi ) RSP(1) = RSP(1) + Pi2
        If( RSP(1) .ge.  Pi ) RSP(1) = RSP(1) - Pi2
        RDang(1) = Atan2(CAMhgt,RTEMP*cos(RSP(1)-CAMhfv))
C
        If( RDang(1) .lt. CAMmdp ) then
          Write(*,*) ' Did not find first right signpost'
        End if
    150 Continue
C       Calculate the vertical location of the second sign post
        Xtemp = Rroad(1,RRd+1)-ALVloc(1)
        Ytemp = Rroad(2,RRd+1)-ALVloc(2)
        RTEMP = SQRT(XTEMP*XTEMP + YTEMP*YTEMP)
        RSP(2) = -atan2(Ytemp,Xtemp) + H0
        If( RSP(2) .le. -Pi ) RSP(2) = RSP(2) + Pi2
        If( RSP(2) .ge.  Pi ) RSP(2) = RSP(2) - Pi2
        RDang(2) = Atan2(CAMhgt, RTEMP*cos(RSP(2)-CAMhfv) )
        If( .not.(RDang(1).ge.CAMMdp.and.RDang(2).le.CAMMdp)) then
          RDang(1) = RDang(2)
          RSP(1) = RSP(2)
          RRd = RRd + 1
          Go to 150
        End if
C
        Rdang(1) = -RDang(1) + CAMmdp
        Rdang(2) = -RDang(2) + CAMmdp C
C       Find all sign post in the image plus one more which is outside
C       the image
C
        RK = 2
        Do 130 i=RRd+2,MaxRd-1
C
          RK = RK+1
          Xtemp = Rroad(1,i)-ALVloc(1)
          Ytemp = Rroad(2,i)-ALVloc(2)
          RTEMP = SQRT(XTEMP*XTEMP + YTEMP*YTEMP)
C
C         fixed the mod 2pi problem
C
          RSP(Rk) = -atan2(Ytemp,Xtemp) + H0
          If( RSP(Rk) .le. -Pi ) RSP(Rk) = RSP(Rk) + Pi2
          If( RSP(Rk) .ge.  Pi ) RSP(Rk) = RSP(Rk) - Pi2
          RDang(Rk) = -Atan2(CAMhgt,RTEMP*Cos(RSP(Rk)-CAMhfv)) +
     +                CAMmdp
          If( RDang(Rk) .ge. Tfield )then
            Go to 140
```

```
              End if
      130  Continue
      140  Continue
C
C         That gives us the sign posts
C
          Return
          End
          Subroutine EndPts(Lpt,Rpt,Irow,Lcnt,Rcnt,Lk,Rk)
C
C         Given the signposts that are in the image this routine finds the edges
C         of the road for each row in the image.
C
          Include 'ALVinc.inc'
          Integer Lpt,Rpt,Irow,Lcnt,Rcnt,Lk,Rk
C
C         Left Side
C
C
C         Find the signpost which stradles the row
C
      100  Continue
          If( LDang(Lcnt)/Dvert .le. Irow .and.
     1        LDang(Lcnt+1)/Dvert .ge. Irow) then
C
C           Calculate the Left starting point.
C
            Lpt=Nint((((LSP(Lcnt+1)-LSP(Lcnt))/(LDang(Lcnt+1)-LDang(Lcnt))
     1         *(Dvert*Irow - LDang(Lcnt)) ) + LSP(Lcnt) )/Dhor)
C           Write(*,*) 'IROW = ',IROW,' Lcnt= ',Lcnt
C           Write(*,*) 'LDang= ',LDang(lcnt),LDang(lcnt+1)
C           Write(*,*) 'LSP= ',LSP(lcnt),LSP(lcnt+1)
          Else If( Lcnt+1 .ge. Lk) then
            Lpt = MaxImg + 1
          Else
            Lcnt = Lcnt + 1
            Go to 100
          End if
C
C         Finished the Left side
C C
C         Right Side
C
C
C         Find the signpost which stradles the row
C
      160  Continue
          If( RDang(Rcnt)/Dvert .le. Irow .and.
     1        RDang(Rcnt+1)/Dvert .ge. Irow) then
C
C           Calculate the Right ending point.
C
            Rpt=Nint((((RSP(Rcnt+1)-RSP(Rcnt))/(RDang(Rcnt+1)-RDang(Rcnt))
     1         *(Dvert*Irow - RDang(Rcnt))) + RSP(Rcnt) )/Dhor)
C           Write(*,*) 'RSP= ',RSP(Rcnt),RSP(Rcnt+1)
          Else If( Rcnt+1 .ge. Rk) then
            Rpt = MaxImg + 2
          Else
            Rcnt = Rcnt + 1
            Go to 160
          End if
```

```
C
C      Finished the BOTH sides
C
       Return

End
       Subroutine WRTIMG(View,MaxImg)
C
C      This routine write the image to the I2S.  The Image is "from
C      the bottom up" and this is taken care of here.
C      This routine is patterned off of DISPLAY so if it doesn't
C      make sense -- Too Bad!
C
C      This routine writes out the image, it assumes that the data is scaled
       Implicit none Integer*4 MaxImg
       Integer*2 View(0:MaxImg,0:MaxImg)
       INTEGER * 2 X, Y, YLOC, START
       INTEGER * 2 STARTX, STARTY, IMAGE(512,512)
       INTEGER * 4 SIZE
       PARAMETER (SIZE = 512 * 512)
       DATA IMAGE/ SIZE * 127/

STARTX = 256 - MAXIMG/2
       STARTY = 256 + MAXIMG/2
       DO Y = 0, MAXIMG
          YLOC = STARTY - Y
          DO X = 0, MAXIMG
             IMAGE(STARTX+X, YLOC) = VIEW(X,Y)
          ENDDO
       ENDDO

CALL WRITE_DS(IMAGE, 1,1, 512,512, 0, 0, '00FF'X, 1)

Return
       End
       Subroutine GSobel(Image1,Image2,MaxImg, ABSMAX)
C
C      This routine uses a bidirection Sobel edge finder to create
C      the density field needed to drive the fluid flow problem.
C
       Integer*2 MaxImg,i,j
       Integer*2 Image1(0:MaxImg,0:MaxImg)
       Real*4 Xtemp,Ytemp,Image2(0:MaxImg,0:MaxImg+2)
       REAL * 4 TMAX, SCALE, ABSMAX, ABSVAL
C
       Tmax = -1
       ABSMAX = -1
C
C      Take the Difference in both directions
C
       Do 100 i=1,MaxImg-1
          Do 200 j=1,MaxImg-1
             Xtemp = Image1(j-1,i-1) + Image1(j-1,i) + Image1(j-1,i)
     1              +Image1(j-1,i+1)
     1              - Image1(j+1,i-1) - Image1(j+1,i) - Image1(j+1,i)
     1              -Image1(j+1,i+1)
             Ytemp = Image1(j-1,i-1) + Image1(j,i-1) + Image1(j,i-1)
     1              +Image1(j+1,i-1)
     1              - Image1(j-1,i+1) - Image1(j,i+1) - Image1(j,i+1)
     1              -Image1(j+1,i+1)
C            Image2(j,i) = Sqrt( Xtemp*Xtemp + Ytemp*Ytemp )
```

```
c           image2(j,i) = abs(xtemp)
            Image2(j,i) = abs(Xtemp) + abs(Ytemp)
c           age2(j,i) .ge. Tmax ) Tmax = Image2(j,i)
cd               = ABS(IMAGE2(J,I))
cd               X.LT.ABSVAL) ABSMAX = ABSVAL
        200
        100 c
c              es of the image
c
        Do 300 I=1,MaxImg-1
c
c       Top
c
           Image2(i,MaxImg) = Image2(i,Maximg-1)
c
c       Bottom
c
           Image2(i,0) = Image2(i,1)
c
c       Left Side
c
           Image2(0,i) = Image2(1,i)
c
c       Right Side
c
           Image2(MaxImg,i) = Image2(MaxImg-1,i)
    300 Continue
c
c       The Corners
c
        Image2(MaxImg,MaxImg) = .5*(Image2(MaxImg-1,MaxImg)
       1                        + Image2(MaxImg,MaxImg-1))
c
        Image2(0,0) = .5*( Image2(0,1)+Image2(1,0) )
c
        Image2(MaxImg,0) = .5*( Image2(MaxImg-1,0)+Image2(MaxImg,1) )
c
        Image2(0,MaxImg) = .5*( Image2(1,MaxImg)+Image2(0,MaxImg-1) )
c
c       Image2 is full
c
c       Rescale Image2
         SCALE = .06/Tmax
         CALL MUL('CFTOAF', SCALE, IMAGE2, (MXIMG+1)*(MXIMG+1))

c       Do 400 i=0,MaxImg
c         Do 500 j=0,MaxImg
c           Image2(j,i) = Image2(j,i) * SCALE
c   500   Continue
c   400 Continue Return
        End
        Subroutine Secrk(Iflag)
c
c - CONVERGENCE TO LINEAR FEATURES - SAMPLE PROGRAM
c - BASED ON RUNGE KUTTA SOLUTION OF SYSTEM OF 1ST ORDER DIFF. EQNS.
c
c PROBLEM: this is not current
c       Y1' = Y2                        WITH Y1(0) GIVEN BETWEEN 0 AND 31
c       Y2' = X force  - Alpha*y2       WITH Y2(0) = 0
```

```fortran
C      Y3' = Y4                         WITH Y3(0) GIVEN BETWEEN 0 AND 31
C      Y4' = Y Force - Beta*Y4          WITH Y4(0) = 0
C      Y5' = Y6                         WITH Y5(0) GIVEN BETWEEN -90 AND 90
C      Y6' = Rot force - Gamma*y6       WITH Y6(0) = 0
C      Y7' = Y8                         WITH Y7(0) GIVEN BETWEEN 0 AND 100
C      Y8' = Compression Force - Beta*Y8 WITH Y8(0) = 0
       Include 'alvinc2.inc'
       Integer*2 NoStk
       Parameter( NoStk = MaxStk-MinStk+1)
       EXTERNAL Func
       EXTERNAL Output
       Real*4 AUX(2,8,MinStk:MaxStk,2)
       Real*4 Y(2,MinStk:MaxStk,2)
       Common /edges/ y Real*4 PARAM(5)
       INTEGER*4 NDIM,Ihlf,Itemp,i
       REAL*4 D,Acc
       Real*4 Alpha(MinStk:MaxStk,2),Beta(MinStk:MaxStk,2),AlphaT
       Real*4 TestP(MinStk:MaxStk,2),Betat
       Re         MinStk:MaxStk,2),dery(2,MinStk:MaxStk,2)
                  TIMER
                  :MaxStk),y2(0:MaxStk),x3(0:MaxStk),y3(0:MaxStk)
                  g,Iflag2

C
                / x2,y2,x3,y3
                / Alpha,Beta,Iflag2
       Co       IGHT/ D
       Common /test/ TestP,Acc, ICNT
       Data y / NoStk*5.0,NoStk*5.0, NoStk*54.0 ,NoStk*54.0 /
       Data x2,y2,x3,y3 / MaxStk*0,0,MaxStk*0,0,MaxStk*0,0,MaxStk*0,0/

ICNT = 0
       TIMER = SECNDS(0.0)
C
C      Pass the flag
       Iflag2 = Iflag
       NDIM=4*(MaxStk-MinStk+1)
C
C      Set the starting value
C
       Do 213 i=MinStk,MaxStk
         TestP(i,1) = 0.0
         TestP(i,2) = 0.0
 213   Continue
       do 210 i=MinStk,MaxStk
         y(2,i,1) = 0.0
         y(2,i,2) = 0.0
 210   Continue
C      Write(*,*) ' Enter Alpha'
C      Read(*,*) AlphaT
C      Write(*,*) ' Enter Beta'
C      Read(*,*) BetaT
       AlphaT = 1.0
       BETAT = .3
C
C      Set Alpha and beta values
C
       Do 211 i=MinStk,MaxStk
         Alpha(i,1) = AlphaT
         Beta(i,1) = BetaT
         Alpha(i,2) = AlphaT
```

```
            Beta(i,2) = BetaT
211     Continue
c
c
c
        Acc = .03
c       WRITE(*,*) 'ACC=?'
c       READ(*,*) ACC
c
c           PRMT    - AN INPUT AND OUTPUT VECTOR WITH DIMENSION GREATER
c                     OR EQUAL TO 5, WHICH SPECIFIES THE PARAMETERS OF
c                     THE INTERVAL AND OF ACCURACY AND WHICH SERVES FOR
c                     COMMUNICATION BETWEEN OUTPUT SUBROUTINE (FURNISHED
c                     BY THE USER) AND SUBROUTINE RKGS. EXCEPT PRMT(5)
c                     THE COMPONENTS ARE NOT DESTROYED BY SUBROUTINE
c                     RKGS AND THEY ARE
c           PRMT(1)- LOWER BOUND OF THE INTERVAL (INPUT),
        PARAM(1) =  0.
c           PRMT(2)- UPPER BOUND OF THE INTERVAL (INPUT),
        PARAM(2) = 2000.
c           PRMT(3)- INITIAL INCREMENT OF THE INDEPENDENT VARIABLE
c                    (INPUT),
        PARAM(3) = .5
c           PRMT(4)- UPPER ERROR BOUND (INPUT). IF ABSOLUTE ERROR IS
c                    GREATER THAN PRMT(4), INCREMENT GETS HALVED.
c                    IF INCREMENT IS LESS THAN PRMT(3) AND ABSOLUTE
c                    ERROR LESS THAN PRMT(4)/50, INCREMENT GETS DOUBLED.
c                    THE USER MAY CHANGE PRMT(4) BY MEANS OF HIS
c                    OUTPUT SUBROUTINE.
        PARAM(4) =  .06
c           PRMT(5)- NO INPUT PARAMETER. SUBROUTINE RKGS INITIALIZES
c                    PRMT(5)=0. IF THE USER WANTS TO TERMINATE
c                    SUBROUTINE RKGS AT ANY OUTPUT POINT, HE HAS TO
c                    CHANGE PRMT(5) TO NON-ZERO BY MEANS OF SUBROUTINE
c                    OUTP. FURTHER COMPONENTS OF VECTOR PRMT ARE
c                    FEASIBLE IF ITS DIMENSION IS DEFINED GREATER
c                    THAN 5. HOWEVER SUBROUTINE RKGS DOES NOT REQUIRE
c                    AND CHANGE THEM. NEVERTHELESS THEY MAY BE USEFUL
c                    FOR HANDING RESULT VALUES TO THE MAIN PROGRAM
c                    (CALLING RKGS) WHICH ARE OBTAINED BY SPECIAL
c                    MANIPULATIONS WITH OUTPUT DATA IN SUBROUTINE OUTP.
c
c
c  DERY CONTAINS (INITIALLY) THE WEIGHTING FACTORS FOR THE ERRORS
c
c       These parameters keep track of the last calculated points
        Do 220 i=MinStk,MaxStk
          Dery(1,i,1) = 1.0/float(4*(MaxStk-MinStk+1))
          Dery(2,i,1) = 1.0/float(4*(MaxStk-MinStk+1))
          Dery(1,i,2) = 1.0/float(4*(MaxStk-MinStk+1))
          Dery(2,i,2) = 1.0/float(4*(MaxStk-MinStk+1))
220     Continue
c
c       METHOD
c           EVALUATION IS DONE BY MEANS OF FOURTH ORDER RUNGE-KUTTA
c           FORMULAE IN THE MODIFICATION DUE TO GILL. ACCURACY IS
c           TESTED COMPARING THE RESULTS OF THE PROCEDURE WITH SINGLE
c           AND DOUBLE INCREMENT.
c           SUBROUTINE RKGS AUTOMATICALLY ADJUSTS THE INCREMENT DURING
c           THE WHOLE COMPUTATION BY HALVING OR DOUBLING. IF MORE THAN
c           10 BISECTIONS OF THE INCREMENT ARE NECESSARY TO GET
c           SATISFACTORY ACCURACY, THE SUBROUTINE RETURNS WITH
c           ERROR MESSAGE IHLF=11 INTO MAIN PROGRAM.
c           TO GET FULL FLEXIBILITY IN OUTPUT, AN OUTPUT SUBROUTINE
c           MUST BE FURNISHED BY THE USER.
```

```
C              FOR REFERENCE, SEE
C              RALSTON/WILF, MATHEMATICAL METHODS FOR DIGITAL COMPUTERS,
C              WILEY, NEW YORK/LONDON, 1960, PP.110-120.

CALL RKGS(PARAM,Y,DERY,NDIM,IHLF,Func,OUTPUT,AUX)
C
C              Write(*,*) ' Finished Left Line'
C              WRITE(6,102) Y(1,16,1),Y(1,20,1),Y(1,24,1),Y(1,28,1)
C              WRITE(6,102) Y(2,16,1),Y(2,20,1),Y(2,24,1),Y(2,28,1)
C              Write(*,*) ' Finished Right Line'
C              WRITE(   )  Y(1,16,2),Y(1,20,2),Y(1,24,2),Y(1,28,2)
C                          Y(2,16,2),Y(2,20,2),Y(2,24,2),Y(2,28,2)
                          ,MaxStk
                          y(1,i,1))
                          w(1,i,2))
                          g - i - 1
                          g - i - 1
234       C.
               ca..         (x2,y2,MinStk,MaxStk)
               cal.         (x3,y3,MinStk,MaxStk)
102            FORMAT(1X,5F10.3)
C
C

TIME = SECNDS(TIMER)
               PRINT *, ' RK TIME:', TIME

Write(*,*) ' Finished the calculation '
               WRITE(*,*) ' ENTER 1 TO CONTINUE '
               Read(*,*) Itemp
               Itemp = Itemp
               Return
               END
               Subroutine Func(x,w,Dery)
C
C              This is the function which gives the values of the der.
C
               Include 'ALVinc2.inc'
C
               Real*4 Alpha(MinStk:MaxStk,2),Beta(MinStk:MaxStk,2)
               Integer*2 i,j,Iflag,Force
               Integer*4 j1,j2
               Real*4 Dx
               Common /SecRk/ Alpha,Beta,Iflag
               Real*4 W(2,MinStk:MaxStk,2),dery(2,MinStk:MaxStk,2)
               Real*4 space,x
               x=x
C              Iflag tell if this is the first run or a later run
C              the forcing function depends on this.
               If( Iflag .eq. 1) then
                 Force = Force1
               Else
                 Force = Force2
               End if
C
C              Fluid Forcing Part
C
               Do 130 i=MinStk,MaxStk
                 Do 135 j=1,2
C                  These are the four corners of the fluid flow matrix surrounding
C                  the point of interest
                   If(Abs( W(1,i,j)) .gt. 10*MaxImg+20) Then
C                    Write(*,*) ' w is ',W(1,i,j)
C                    Write(*,*) ' i,j=',i,j
```

```
              End if
              J1 = Int( W(1,i,j) )
              J2 = j1 + 1
              IF( j1 .lt. 0 .or. j2 .gt. MaxImg ) then
                Dery(2,i,j) = 0.0
              Else
c               The spacing between points is one
                Dx = W(1,i,j) - J1
                Dery(2,i,j) = Force*(( U1(J2,i)-U1(J1,i) )*dx + U1(J1,i))
c               Write(*,*) 'i=',i,' j=',j,Dery(2,i,j)
              End if
 135      Continue
 130    Continue
c
c       This keeps the lines apart but on the egde of the image
c
        Do 140 i=MinStk,MaxStk
          Space = Abs( W(1,i,1) - W(1,i,2) )
          Space = 1.0/(Space*Space)
          Dery(2,i,1) = Dery(2,i,1) - 60.*Space
          Dery(2,i,2) = Dery(2,i,2) + 60.*Space
c         Dery(2,i,1) = Dery(2,i,1) - 1.75*Exp(-.2*Space)
c         Dery(2,i,2) = Dery(2,i,2) + 1.75*Exp(-.2*Space)
 140    Continue
c
c       Add the force keeping the neighboring points together
c
        Do 150 i=MinStk+2,MaxStk-2
c         Right Side
          Dery(2,i,1) = Dery(2,i,1)
     1                +Alpha(i,1)
     2                *(4.0*w(1,i-1,1)-w(1,i-2,1)-6.*w(1,i,1)
     2                +4.0*w(1,i+1,1)-w(1,i+2,1) )
c         Left Side
          Dery(2,i,2) = Dery(2,i,2)
     1                +Alpha(i,2)
     2                *(4.0*w(1,i-1,2)-w(1,i-2,2)-6.*w(1,i,2)
     2                +4.0*w(1,i+1,2)-w(1,i+2,2) )
 150    Continue
        I = MinStk+1
        Dery(2,i,1) = Dery(2,i,1)
     1              +Alpha(i,1)
     2              *(2.0*w(1,i-1,1)-5.*w(1,i,1)
     2              +4.0*w(1,i+1,1)-w(1,i+2,1) )
c       Left Side
        Dery(2,i,2) = Dery(2,i,2)
     1              +Alpha(i,2)
     2              *(2.0*w(1,i-1,2)-5.*w(1,i,2)
     2              +4.0*w(1,i+1,2)-w(1,i+2,2) )
        I = MaxStk-1
c       Right Side
        Dery(2,i,1) = Dery(2,i,1)
     1              +Alpha(i,1)
     2              *(4.0*w(1,i-1,1)-w(1,i-2,1)-5.*w(1,i,1)
     2              +2.0*w(1,i+1,1) )
c       Left Side
        Dery(2,i,2) = Dery(2,i,2)
     1              +Alpha(i,2)
     2              *(4.0*w(1,i-1,2)-w(1,i-2,2)-5.*w(1,i,2)
     2              +2.0*w(1,i+1,2) )
        I = MinStk
c       Right Side
        Dery(2,i,1) = Dery(2,i,1)
     1              +Alpha(i,1)
```

```
       2                        *(-w(1,i,1)
       2                        +2.0*w(1,i+1,1)-w(1,i+2,1) )
C      Left Side
       Dery(2,i,2) = Dery(2,i,2)
      1                        +Alpha(i,2)
      2                        *(-w(1,i,2)
      2                        +2.0*w(1,i+1,2)-w(1,i+2,2) )
       I = MaxStk
C      Right Side
       Dery(2,i,1) = Dery(2,i,1)
      1                        +Alpha(i,1)
      2                        *(2.0*w(1,i-1,1)-w(1,i-2,1)-w(1,i,1) )
C      Left Side
       Dery(2,i,2) = Dery(2,i,2)
      1                        +Alpha(i,2)
      2                        *(2.0*w(1,i-1,2)-w(1,i-2,2)-w(1,i,2) )
C
C      Fini Calculation with Decay
C
       DO 310 i=MinStk,MaxStk
          Dery(1,i,1) = w(2,i,1)
          Dery(2,i,1) = Dery(2,i,1) - Beta(i,1) * w(2,i,1)
          Dery(1,i,2) = w(2,i,2)
          Dery(2,i,2) = Dery(2,i,2) - Beta(i,2) * w(2,i,2)
          IF( W(1,i,1) .le. -.5 ) then
             Dery(1,i,1) = Dery(1,i,1) + 2.0
          End if
          If( W(1,i,2) .ge. MaxImg+.5) then
C            Write(*,*) ' Right line  off image force', W(1,i,2)
             Dery(1,i,2) = Dery(1,i,2) - 2.0
          End if
 310   Continue
C
       Return
       End
       SUBROUTINE DRAWLINE(x2, y2,sno,eno)
       Include 'alvinc2.inc'
       Integer*2 x2(0:MaxImg),y2(0:MaxImg)
       INTEGER * 2 Sno, Eno
       INTEGER * 2 DXOFF, DYOFF, i, J
       INTEGER * 4 CNT, COORDS(2*MXIMG)
C
       DXOFF = 256 - Maximg/2
       DYOFF = DXOFF
C**----Get new coords for endpoints of line.
       J = 1
       Do 100 i=sno,eno
          COORDS(J) = DXOFF + x2(i)
          COORDS(J+1) = DYOFF + y2(i)
          J = J + 2
 100   Continue C**----Draw new line.
       CNT = ENO - SNO + 1
       CALL CURVE_DS('0300'X, COORDS, CNT, 0, '0300'X)

RETURN
       END
       Subroutine NXTLOC(x1,y1)
C
       Include 'ALVinc.inc'
       Include 'ALVinc3.inc'
       Real*4 x1,y1,angle,Sdep,ImgDep,AvgAng,xyang
       Integer*2 J1,j2
```

```
      Real*4 Sdep2,ImgDep2,Avgang2,Delta
      Integer*2 j12,j22
c     Initialize the value of the left side of the field of view.
c
c
c     H0 = CAMh + CAMhfv
c
c
c     Depression of the stop on the road we want
c
c
c     This is only approximate but should be very close
      Sdep = atan(Camhgt/10.0)
c
c     Zero at the bottom of the image this is the depression stop
c
      ImgDep = CAMmdp - Sdep
c
c     line above and line below
      J1 = Int(ImgDep/Dvert)
      J2 = J1 + 1
c     find the average angle for the "middle of the road"
c
c
c     Write(*,*) ' This is the image row ',j1
      avgang = .25*(y(1,j1,1) + y(1,j1,2)+y(1,j2,1)+y(1,j2,2))*Dhor
c
c     A correction
      Sdep2 = atan(Camhgt/(20.))
      ImgDep2 = CAMmdp - Sdep2
      J12 = Int(ImgDep2/Dvert)
      J22 = J12 + 1
      avgang2 = .25*(y(1,j12,1) + y(1,j12,2)
     1         +y(1,j22,1)+y(1,j22,2))*Dhor
c
c     x,y angle is then:
c
c     Second part is the correction for small steps
      Delta = 2.0*(avgang-avgang2)
      xyang = -avgang + h0 - Delta + ALVvel/10.0 * Delta
c
c     The new x,y position is
c
      X1 = ALVloc(1) + ALVvel * cos(xyang)
      Y1 = ALVloc(2) + AlVvel * sin(xyang)
c     Write(*,*) ' Road Spot ',X1,Y1
c
c
c     Have the new locations
c
      Return
      End
```

APPENDIX D
Figs. D1 and D2 and D3
Program Listings of
    TAUGRAM
    RUNTAU
    FINDSUB
Program Listings of Subroutines:
    SHOWSUB
    CLEAR_DISP
    CRPIC
    DISPLAY
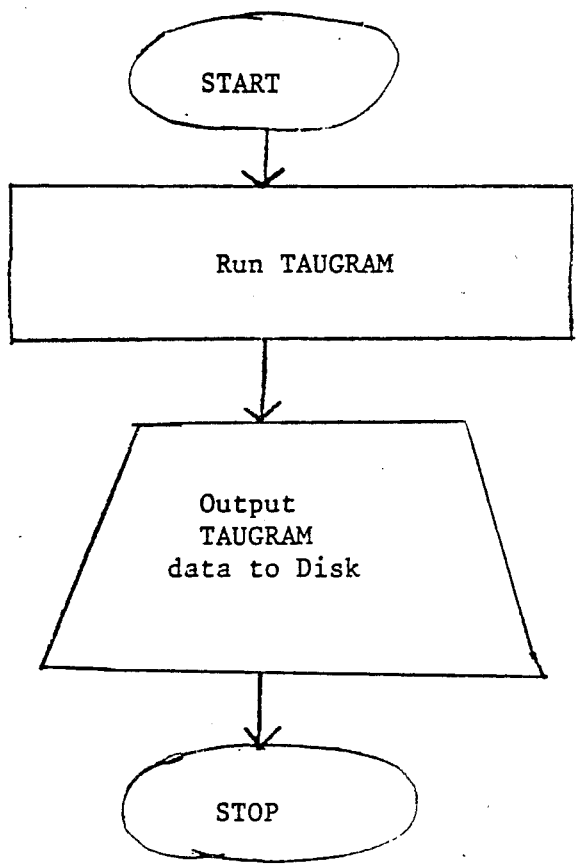
FIG. D-1

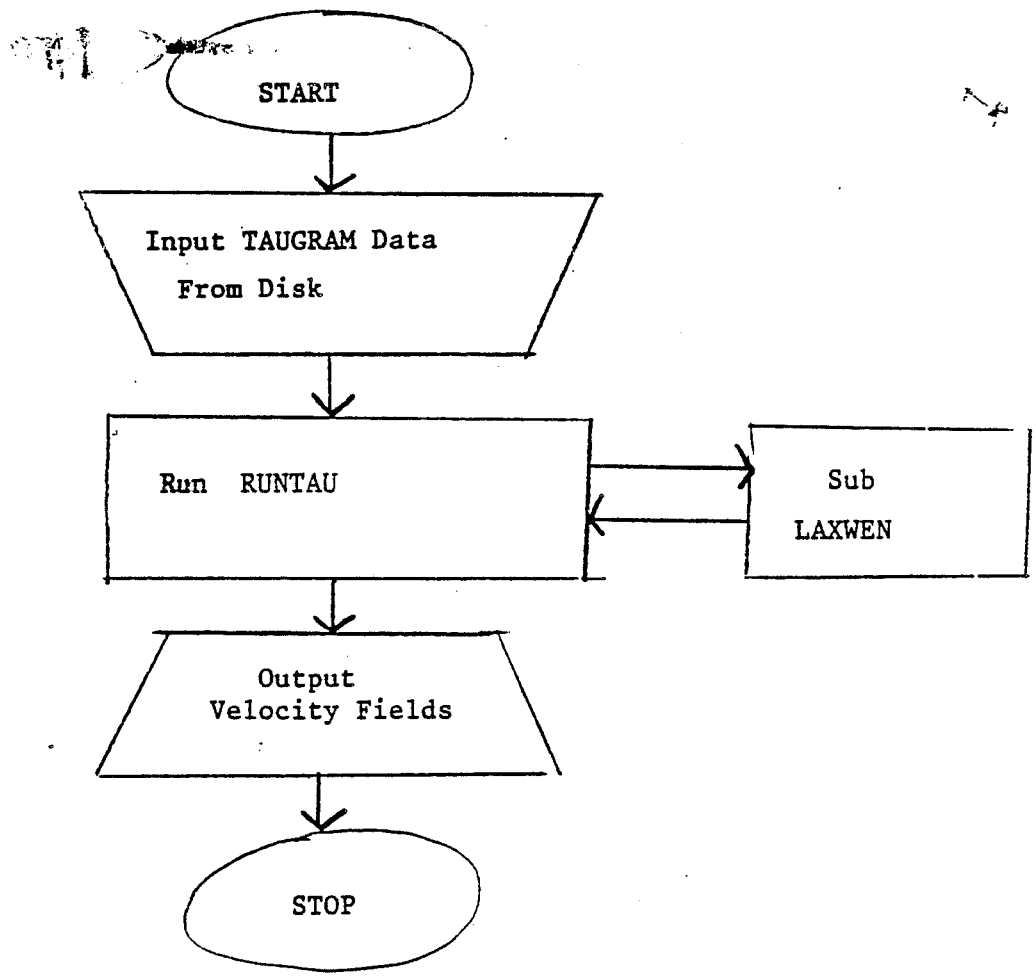
FIG. D-2

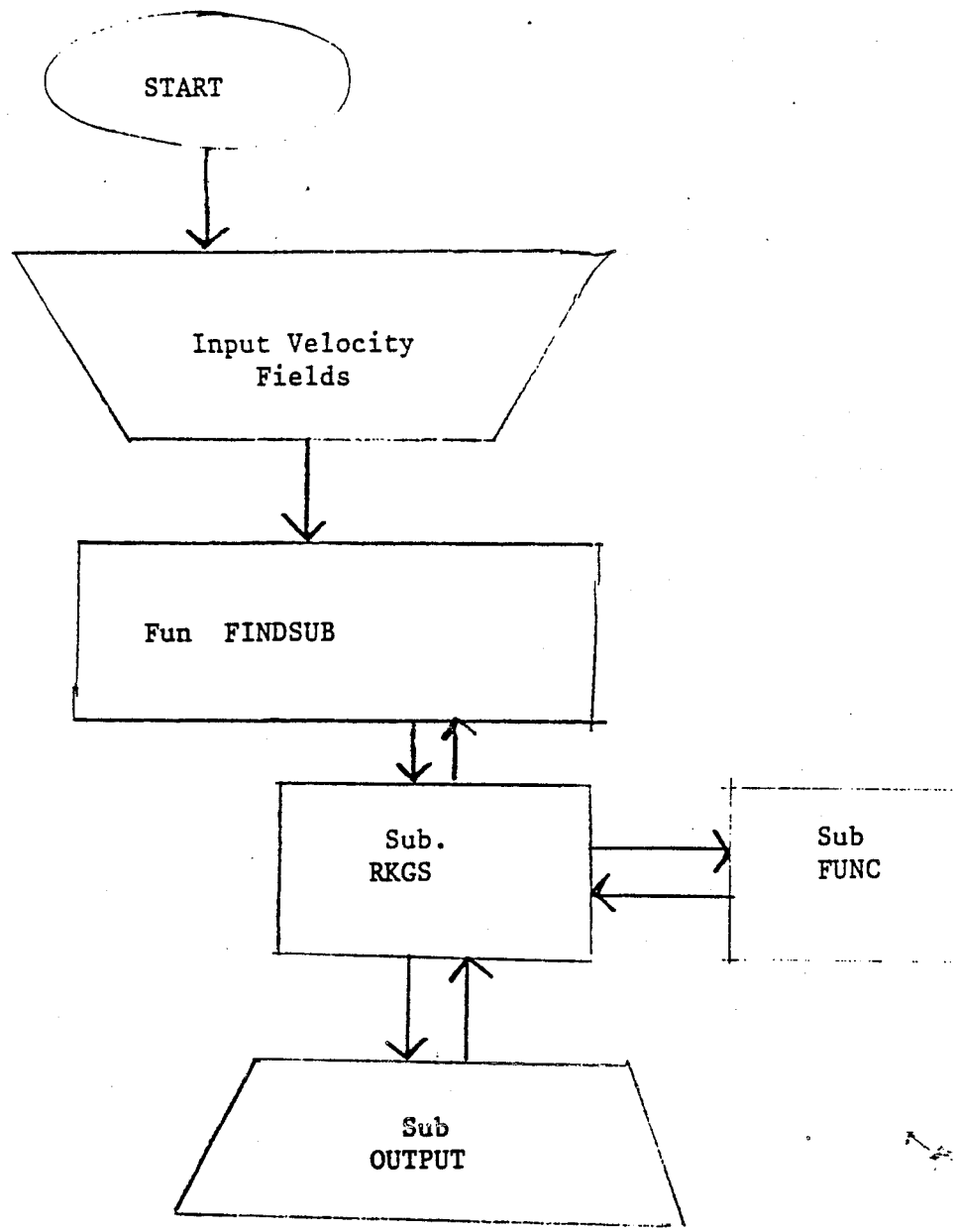
FIG. D-3
```
Program TAUGRAM
Implicit none
Integer*2 Nopts,MaxTim,MaxTau,Offset
Parameter( NoPts = 4250 )
Parameter( MaxTim = 179, MaxTau = 59 )
Real*4 Vel,Refl,Dir,Rcpa,Tcpa,Sdep,Rdep,Speed,MaxGram
Real*8 Seed
Character*40 Fileout
C
C
```

```
          INTEGER*2 I,INDEX
          INTEGER*2 IT,ITAU,N,Itime
          REAL*4 SERI1(-250:NoPts),SERI2(-250:NoPts),CORR,DELAY,SNR,TimeL
          Real*4 Rand,Time
          External Rand
c
          Real*4 TAUGRM(0:MaxTim,0:MaxTau)
          COMMON /GRAM/ TAUGRM
c
c
          WRITE(*,*) ' ENTER Seed, SNR, and Tau Offset'
          READ(*,*) Seed,SNR,Offset
          SNR = 10. ** (- SNR / 20.) *2.0
          Write(*,*) ' Time to enter the configuration'
          Write(*,*) 'Rcpa,Tcpa, Sdep,Rdep,Speed'
          Read(*,*) Rcpa,Tcpa,Sdep,Rdep,Speed
          Write(*,*) 'Enter the output file name'
          Read(*,1015) Fileout
 1015     Format(A)
          Open(Unit=60,File=Fileout,Status='New')
c
c    Calculate some constants
c
          MaxGram = 0
c         This is the sub velocity
          Vel = Speed * 6076.2 * .3048 /3600
          Vel = Vel*Vel
          Refl = Rcpa*Rcpa + (Rdep+Sdep)*(Rdep+Sdep)
          Dir  = Rcpa*Rcpa + (Rdep-Sdep)*(Rdep-Sdep)
c
          WRITE(*,1)
 1        FORMAT(' GENERATE RANDOM NUMBERS IN (-1,1)')
c
          Do 1100 Itime=0,MaxTim
c         This is the time axis loop going from 0 to 15 min
             Write(*,*) ' Time number ',Itime
             TimeL = ITime*5.0
             DO 100 I=-250,NoPts
                  SERI1(I) = (Rand(Seed)-.5)*2
 100         CONTINUE
c
             WRITE(*,5)
 5           FORMAT(' ADD DELAYED VERSION OF SIGNAL TO SIGNAL')
c
             DO 600 I = 0,NoPts
c
                Time = TimeL + I*.00125
                DELAY = (Sqrt( Refl + vel*(Time-Tcpa)*(Time-Tcpa) )-
     1                   Sqrt( Dir  + vel*(Time-Tcpa)*(Time-Tcpa) ) )
     2                  *.000666667
c
c
c               This is the number of delay points needed
c               Note that 800Hz is the sample rate.
                Delay = Delay*800.0
                INDEX = DELAY
c
                IF(INDEX.Ge.NoPts) GOTO 601
c
                DELAY = DELAY - INDEX
c
                SERI2(I) = SERI1(I) - (1-DELAY) * SERI1(i-INDEX)
     *                   - (DELAY) * SERI1(i-INDEX - 1)
c
```

```
 600      CONTINUE
C
         WRITE(*,6)
   6     FORMAT(' GENERATE AND ADD NOISE FIELD')
C
C
 601     Continue
C
C
         DO 700 I=0,NoPts
              SERI2(I) = SERI2(I) + (Rand(Seed)-.5) * SNR
 700     CONTINUE
C
         WRITE(*,7)
   7     FORMAT(' GENERATE TAUGRAM')
C
            DO 810 ITAU = Offset, MaxTau+Offset
              CORR = 0
              DO 820 N = 0 , 4000
                 CORR = SERI2(N)*SERI2(ITAU+N)+CORR
 820          CONTINUE
              I = Itau-Offset
              TAUGRM(ITime,I) = CORR
              If( abs(corr) .ge. MaxGram ) MaxGram = abs(Corr)
 810        CONTINUE
C
 1100    Continue
C
         MaxGram = 99999.0/MaxGram
         WRite(60,1001) ((Nint(MaxGram*TauGrm(it,Itau))
        1                ,It=0,MaxTim),Itau=0,MaxTau)
 1001    Format(1x,10i7)
         Stop
         END Function Rand(seed)
         Real*4 Rand
         Double Precision Seed,Pmod
         Parameter (Pmod =2.0d0**26)
         Seed = 32773.0 * Seed + 75821
         If( seed .le. 0 ) Seed = Seed + Pmod
C        write(*,*) Mod(seed,pmod)
         Seed = Mod(seed,pmod)
         Rand = Seed/pmod
         Return end
         Program Runtau
         Include 'Taugram.inc'
         Character*40 Filein,FileU,FileV
         Real*4 Dens(0:MaxTim,0:MaxTau),In(0:MaxTim,0:MaxTau),MaxUV
         Real*4 Scale
         Integer*2 MaxStep,It,Itau,i,j,Loop,Ians,MaxI,MaxJ
C
C
         Write(*,*) ' Enter the name of the density file'
         Read(*,1000) Filein
 1000    Format(a)
         Open(unit=50,File=Filein,Status='old')
         Write(*,*) ' Please enter one for old format: '
         Read(*,*) Ians
         IF( Ians .eq. 1 ) then
```

```
      Read(50,1001) ((In(it,Itau),It=0,MaxTim),Itau=0,MaxTau)
      Scale = .03/999.0
    Else
      Read(50,1005) ((In(it,Itau),It=0,MaxTim),Itau=0,MaxTau)
      Scale = .03/99999.0
    End if
1001 Format(1x,12F5.0)
1005 Format(1x,10F7.0)

Do Itau=0,MaxTau
      Do It=0,MaxTim
        Dens(it,Itau) = 1.0 + Scale*In(it,Itau)
        R1(It,Itau) = Dens(It,Itau)
      ENDDO
    ENDDO Write(*,*) ' Enter the name of the OUTPUT U file'
    Read(*,1000) FileU
    Open(unit=60,File=FileU,Status='New')
    Write(*,*) ' Enter the name of the OUTPUT V file'
    Read(*,1000) FileV
    Open(unit=61,File=FileV,Status='New')

Write(*,*) ' Please enter the number of steps'
    Read(*,*) MaxStep

DO 120 J = 1,MaxTau,2
      DO 120 I = 1,MaxTim,2
        U1(I,J) = 0
        V1(I,J) = 0
120 CONTINUE

DO 121 J = 0,MaxTau-1,2
      DO 121 I = 0,MaxTim-1,2
        U1(I,J) = 0
        V1(I,J) = 0
121 CONTINUE
C
    DO 130 LOOP = 1,MaxStep
C
    WRITE(*,*) ' CALL LAXWEN  ',LOOP
C
         CALL LAXWEN(loop)
C
    WRITE(*,*) ' RENORMALIZE DATA'
C
    DO J = 1,MaxTau
      DO I = 1,MaxTim
        U1(I,J) = U1(I,J) * Dens(I,J) / R1(I,J)
        V1(I,J) = V1(I,J) * Dens(I,J) / R1(I,J)
        R1(I,J) = Dens(I,J)
      ENDDO
    ENDDO
130 Continue C
C
    DO J = 1,MaxTau
      DO I = 1,MaxTim If( MaxUV .LE. Abs(U1(i,j)) ) then
          MaxUV = Abs(U1(i,j))
          MaxI = i
```

```
              MaxJ = j
            End if
            If( MaxUV .LE. Abs(V1(i,j)) ) then
              MaxUV = Abs(V1(i,j))
              MaxI = i
              MaxJ = j
            End if
          ENDDO
        ENDDO Write(*,*) ' The max Vel is ',MaxUV,' at ',MaxI,MaxJ
        MaxUV = 999.0/MaxUv
        Write(60,1011) ((Nint(U1(it,Itau)*MaxUV)
     1                ,It=0,MaxTim),Itau=0,MaxTau)
        Close(unit=60)
        Write(61,1011) ((Nint(V1(it,Itau)*MaxUV)
     1                ,It=0,MaxTim),Itau=0,MaxTau)
 1011   Format(1x,12i5)

Stop
        End
        Program FindSub
        INCLUDE 'TAUGRAM3.INC'

Integer*2 Itau,Offset
        Real*4 Refl,Dir,Tau,T
        Real*4 Temp1,Temp2
        Real*4 A,Vel,Sdep,Rdep,Tcpa,Rcpa,DeltaT
        Integer*2 I,CHANL
        Integer*4 Ndim,Ihlf,it,ians
        Integer*2 X(0:MaxTim),Y(0:MaxTim)
C
 3000   Continue
        Write(*,*) ' Please enter the Rcpa,V,Tcpa,Sdep,Rdep,Offset'
        Read(*,*) Rcpa,Vel,Tcpa,Sdep,Rdep,Offset
C
C       This is the sub velocity
        Vel = Vel * 6076.2 * .3048 /3600
        Vel = Vel*Vel
        Write(*,*) ' The velocity squared is ',Vel
        A = Rcpa*Rcpa
        Temp1 = A + (Rdep+Sdep)*(Rdep+Sdep)
        Temp2 = A + (Rdep-Sdep)*(Rdep-Sdep)
C
C
        DELTAT = 5.0
        Do 100 i=0,MaxTim
          X(i) = i
C         The time is in 5 sec increments
          T = I*DeltaT + .5*DeltaT
          Refl = Sqrt( Temp1 + Vel*(T-Tcpa)*(T-Tcpa))
          Dir  = Sqrt( Temp2 + Vel*(T-Tcpa)*(T-Tcpa))
          Tau  = .0006666667 * ( Refl - Dir )*800.0-Offset
          Y(i) = -Nint(Tau) + MAXTAU-1
 100    Continue
C
        CHANL=1
        CALL INITDSPL(CHANL)
        Call DRAWLINE(x, y)

Stop
        END
```

```fortran
      SUBROUTINE SHOWSUB(W)
      INCLUDE 'TAUGRAM2.INC'

Integer*2 Itau,Offset
      Real*4 Refl,Dir,Tau,T
      Real*4 Scale(4),Temp1,Temp2
      Real*4 A,Vel,Sdep,Rdep,Tcpa,Rcpa,DeltaT, alpha
      Common /param/ Offset,Rdep,Alpha,DeltaT
      Real*4 W(8)
      Integer*2 I,CHANL
      Integer*4 Ndim,Ihlf,it,ians
      Common /scale/ Scale
      INTEGER * 2 XCORD(0:MAXTIM), YCORD(0:MAXTIM)
      COMMON /DRAW/ XCORD, YCORD
      DATA XCORD, YCORD /MAXTIM*0,0, MAXTIM*0,0/
C
      A = W(1)
      Vel = W(3)
      Tcpa = W(5)*scale(3)
      Sdep = W(7)
      Temp1 = A*Scale(1) + (Rdep+Sdep)*(Rdep+Sdep)
      Temp2 = A*Scale(1) + (Rdep-Sdep)*(Rdep-Sdep)

CALL ERASELINE(XCORD, YCORD)

Do 100 i=0,MaxTim
C        The time is in 5 sec increments
         T = I*DeltaT + .5*DeltaT
         Refl = Sqrt( Temp1 + Vel*(T-Tcpa)*(T-Tcpa))
         Dir  = Sqrt( Temp2 + Vel*(T-Tcpa)*(T-Tcpa))
         Tau  = .0006666667 * ( Refl - Dir )*800.0-Offset
         ITau = Tau

XCORD(I) = I
         YCORD(I) = -(ITAU) + MAXTAU-1

C        Calculate the force wanting a change
 100  Continue

Call DRAWLINE(XCORD, YCORD)

return
      END
      SUBROUTINE CLEAR_DISP(CHANL)

INCLUDE 'TAUGRAM3.INC'
      INTEGER * 2 CHANL
      INTEGER * 2 DATA(512,512)
      INTEGER * 4 F_NPIX, F_NLIN
      INTEGER * 4 STARTX, STARTY
      INTEGER * 4 II

INTEGER * 4 CENTERX, CENTERY
      COMMON /DISPLAY/ CENTERX, CENTERY

F_NPIX = MAXTIM+1
         F_NLIN = MAXTAU+1
         STARTX = CENTERX - MAXTIM/2
         STARTY = CENTERY + MAXTAU/2
         DO II = 1, F_NLIN
            CALL CLEAR_DS(0, STARTX, STARTY, F_NPIX, 1, 0, '0F00'X)
            STARTY = STARTY - 1
```

```
            ENDDO

RETURN
END
            PROGRAM CRPIC
            IMPLICIT NONE

REAL * 4 WAIT_TIME
            INTEGER * 4 LIB$WAIT
            EXTERNAL LIB$WAIT
            INTEGER * 4 FONT, SM_FONT, H_ORIENT, V_ORIENT
            INTEGER * 4 CHR_LENX, CHR_LENY
            INTEGER * 4 SM_CHR_LENX, SM_CHR_LENY
            INTEGER * 4 SCRNX, SCRNY
            INTEGER * 4 MINX, MINY, MAXX, MAXY, CENTRX, CENTRY
            INTEGER * 4 ZOOMFAC
            INTEGER * 4 X, Y, NPIX, NLIN, COORD(10)
            INTEGER * 4 X1, Y1, X2, Y2, X3, Y3
            INTEGER * 4 I
            CHARACTER * 80 STR

DATA FONT/79/, SM_FONT/57/, H_ORIENT/2/, V_ORIENT/3/
            DATA CHR_LENX/8/ CHR_LENY/14/
            DATA SM_CHR_LENX/6/, SM_CHR_LENY/10/
            DATA SCRNX /512/, SCRNY /480/

C**----INTIALIZE DISPLAY

PRINT *, 'ENTER ZOOM FACTOR (1/2/4/8)'
            READ *, ZOOMFAC
            PRINT *, 'ENTER WAIT TIME (0.0:100 000.0)'
            READ *, WAIT_TIME

CALL OVERLAY_MAP_DS(1.0, 0.0, 0.0, 0, 0, '0100'X) !OPAQUE RED
            CALL OVERLAY_MAP_DS(0.0, 1.0, 0.0, 0, 0, '0200'X) !OPAQUE GREEN
            CALL OVERLAY_MAP_DS(1.0, 1.0, 0.0, 0, 0, '0300'X) !OPAQUE YELLOW
            CALL OVERLAY_MAP_DS(0.0, 0.0, 1.0, 0, 0, '0400'X) !OPAQUE BLUE
            CALL OVERLAY_MAP_DS(0.0, 1.0, 0.0, 1, 0, '0500'X) !TRANSP GREEN
            CALL OVERLAY_MAP_DS(1.0, 1.0, 0.0, 1, 0, '0600'X) !TRANSP YELLOW
            CALL OVERLAY_MAP_DS(0.0, 0.0, 1.0, 1, 0, '0700'X) !TRANSP BLUE

CALL CLEAR_DS(255, 1, 1, 512, 512, 0, '0FFF'X) ! TRANSP BLUE

MINX = 1
            MINY = 1
            MAXX = SCRNX / ZOOMFAC
            MAXY = SCRNY / ZOOMFAC
            CENTRX = MAXX / 2
            CENTRY = MAXY / 2
            CALL ROAM_DS(CENTRX, CENTRY, 0)
            CALL ZOOM_DS(ZOOMFAC, 0)

C**----WRITE "MULTICHANNEL WARPED SIGNAL CORRELATOR"

CENTRY = CENTRY - 3*CHR_LENY

X = CENTRX - 6.5*CHR_LENX
            Y = CENTRY - 1.5*CHR_LENY
            NPIX = 14*CHR_LENX
            NLIN = 3*CHR_LENY
            CALL CLEAR_DS(127, X, Y, NPIX, NLIN, 0, '0FFF'X)

STR = 'MULTICHANNEL'
            X = CENTRX + .5*CHR_LENX
```

```
      Y = CENTRY - .5*CHR_LENY
      CALL TEXT_DS(STR, X, Y, FONT, H_ORIENT, 0, '0100'X)

COORD(1) = CENTRX - 6.5*CHR_LENX
      COORD(2) = CENTRY + 1.5*CHR_LENY
      COORD(3) = COORD(1)
      COORD(4) = COORD(2) - 3*CHR_LENY
      COORD(5) = COORD(3) + 14*CHR_LENX
      COORD(6) = COORD(4)
      COORD(7) = COORD(5)
      COORD(8) = COORD(2)
      CALL CURVE_DS('0400'X, COORD, 4, 0, '0400'X)

X = CENTRX - 13*CHR_LENX
      Y = CENTRY + 1.5*CHR_LENY
      NPIX = 26*CHR_LENX
      NLIN = 3*CHR_LENY
      CALL CLEAR_DS(127, X, Y, NPIX, NLIN, 0, '0FFF'X)

STR = 'WARPED SIGNAL CORRELATOR'
      X = CENTRX - .25*CHR_LENX
      Y = CENTRY + 2.5*CHR_LENY
      CALL TEXT_DS(STR, X, Y, FONT, H_ORIENT, 0, '0100'X)

X1 = COORD(1)
      X3 = COORD(7)
      COORD(1) = X1
      COORD(2) = CENTRY + 1.5*CHR_LENY
      COORD(3) = CENTRX - 13*CHR_LENX
      COORD(4) = COORD(2)
      COORD(5) = COORD(3)
      COORD(6) = COORD(4) + 3*CHR_LENY
      COORD(7) = COORD(3) + 26*CHR_LENX
      COORD(8) = COORD(6)
      COORD(9) = COORD(7)
      COORD(10) = COORD(2)
      COORD(11) = X3
      COORD(12) = COORD(2)
      CALL CURVE_DS('0400'X, COORD, 6, 0, '0400'X)

C**---WRITE "SAIC"

X = MINX
      Y = MAXY - 4*SM_CHR_LENY - 1
      NPIX = 8*SM_CHR_LENX
      NLIN = 4*SM_CHR_LENY + 2
      CALL CLEAR_DS(255, X, Y, NPIX, NLIN, 0, '0FFF'X)

COORD(1) = MINX + SM_CHR_LENX
      COORD(2) = MAXY - 1.5 * SM_CHR_LENY - 2
      COORD(3) = COORD(1) + SM_CHR_LENX
      COORD(4) = COORD(2) - 2*SM_CHR_LENY
      COORD(5) = COORD(3) + 4*SM_CHR_LENX
      COORD(6) = COORD(4)
      COORD(7) = COORD(5) + SM_CHR_LENX
      COORD(8) = COORD(2)
      COORD(9) = COORD(1)
      COORD(10) = COORD(2)
      CALL CURVE_DS('0400'X, COORD, 5, 0, '0400'X)
      STR = 'SAIC'
      X = MINX + 4*SM_CHR_LENX
      Y = MAXY - 2.75*SM_CHR_LENY - 2
      CALL TEXT_DS(STR, X, Y, SM_FONT, H_ORIENT, 0, '0400'X)
```

```
C**----PAUSE SPECIFIED LENGTH OF TIME

CALL LIB$WAIT(WAIT_TIME)

END
      SUBROUTINE DISPLAY(CHANL, NEW_FILE)

INCLUDE 'TAUGRAM.INC'
      Real * 4 In(0:MaxTim,0:MaxTau)
      REAL * 4 VAL, MAX, MIN
      INTEGER * 2 CHANL
      INTEGER * 4 IANS, IT, ITAU
      INTEGER * 4 F_NPIX, F_NLIN
      INTEGER * 4 PACKED, STARTX, STARTY
      INTEGER * 4 II, INDX
      INTEGER * 4 X, Y
      CHARACTER * 40 FILEIN, STR
      LOGICAL NEW_FILE INTEGER * 2 DATA(512,512)
      INTEGER * 4 CENTERX, CENTERY
      COMMON /DISPLAY/ CENTERX, CENTERY, DATA IF(NEW_FILE) THEN
        Write(*,*) ' Enter the name of the density file'
        Read(*,1000) Filein
1000    Format(a)
        Open(unit=50,File=Filein,Status='old')

Write(*,*) ' Please enter 1 for old format: '
        Read(*,*) Ians
        IF( Ians .eq. 1 ) then
          Read(50,1001) ((In(it,Itau),It=0,MaxTim),Itau=0,MaxTau)
        Else
          Read(50,1005) ((In(it,Itau),It=0,MaxTim),Itau=0,MaxTau)
        End if
1001    Format(1x,12F5.0)
1005    Format(1x,10F7.0)
        CLOSE(50, STATUS='KEEP')

MAX = IN(0,0)
        MIN = IN(0,0)
        Do Itau=0,MaxTau
          Do It=0,MaxTim
            VAL = IN(IT,ITAU)
            IF(VAL.GT.MAX) THEN
              MAX = VAL
            ELSEIF(VAL.LT.MIN) THEN
              MIN = VAL
            ENDIF
          ENDDO
        ENDDO C**-------SCALE TO RANGE OF 0 TO 255 (X = (DATA-MIN) * 255/(MAX-MIN) )
        CALL ADD('CFTOAF', -MIN, IN, (MAXTAU+1)*(MAXTIM+1))
        VAL = 255.0 / (MAX - MIN)
        CALL MUL('CFTOAF', VAL, IN, (MAXTAU+1)*(MAXTIM+1))
C**-------ROUND UP (ONE LINE AT A TIME)
        CALL ADD('CFTOAF', 0.5, IN, (MAXTAU+1)*(MAXTIM+1))
        Do Itau=0,MaxTau
          CALL MOV('AFTOAW', IN(0,ITAU), DATA(1,ITAU+1), (MAXTIM+1))
        ENDDO

ENDIF
```

```
      PRINT *, ' ENTER COORDINATE OF DISPLAY CENTER'
      ACCEPT *, CENTERX, CENTERY

PRINT *, ' ENTER MESSAGE'
      ACCEPT '(A)', STR

C**---Zoom to center of screen.
      CALL ROAM_DS(384, 256,  0)
      CALL ZOOM_DS(2, 0)

X = CENTERX - 113
      Y = CENTERY
      CALL TEXT_DS(STR, X, Y, 57, 2, 0, '0100'X)

F_NPIX = MAXTIM+1
         F_NLIN = MAXTAU+1
         STARTX = CENTERX - MAXTIM/2
         STARTY = CENTERY + MAXTAU/2
         PACKED = 1
         DO II = 1, F_NLIN
            CALL WRITE_DS(DATA(1,II), STARTX, STARTY, F_NPIX,
     +                   1, 0, 0, '00FF'X, PACKED)
            STARTY = STARTY - 1
         ENDDO

RETURN
      END
```

APPENDIX E

Figs. E1 and E2

Program Listings of

RUNFLOW

FINDRECT

Program Listings of Subroutines:

LAXWEN (modified)

CHECK_ANS

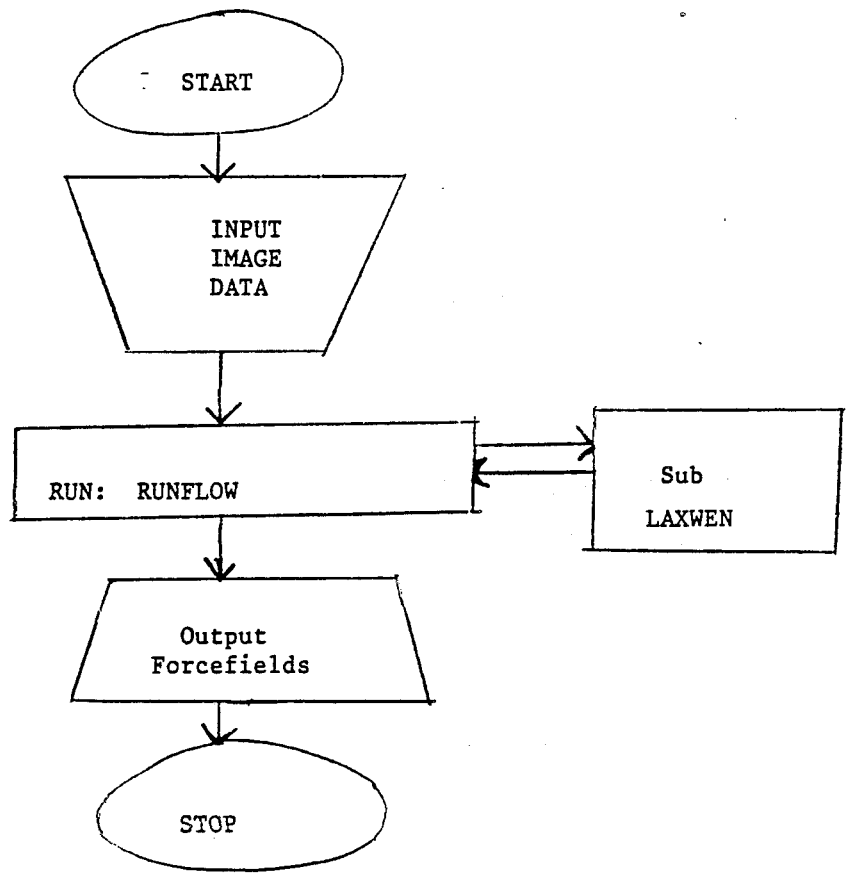
FIG. E-1
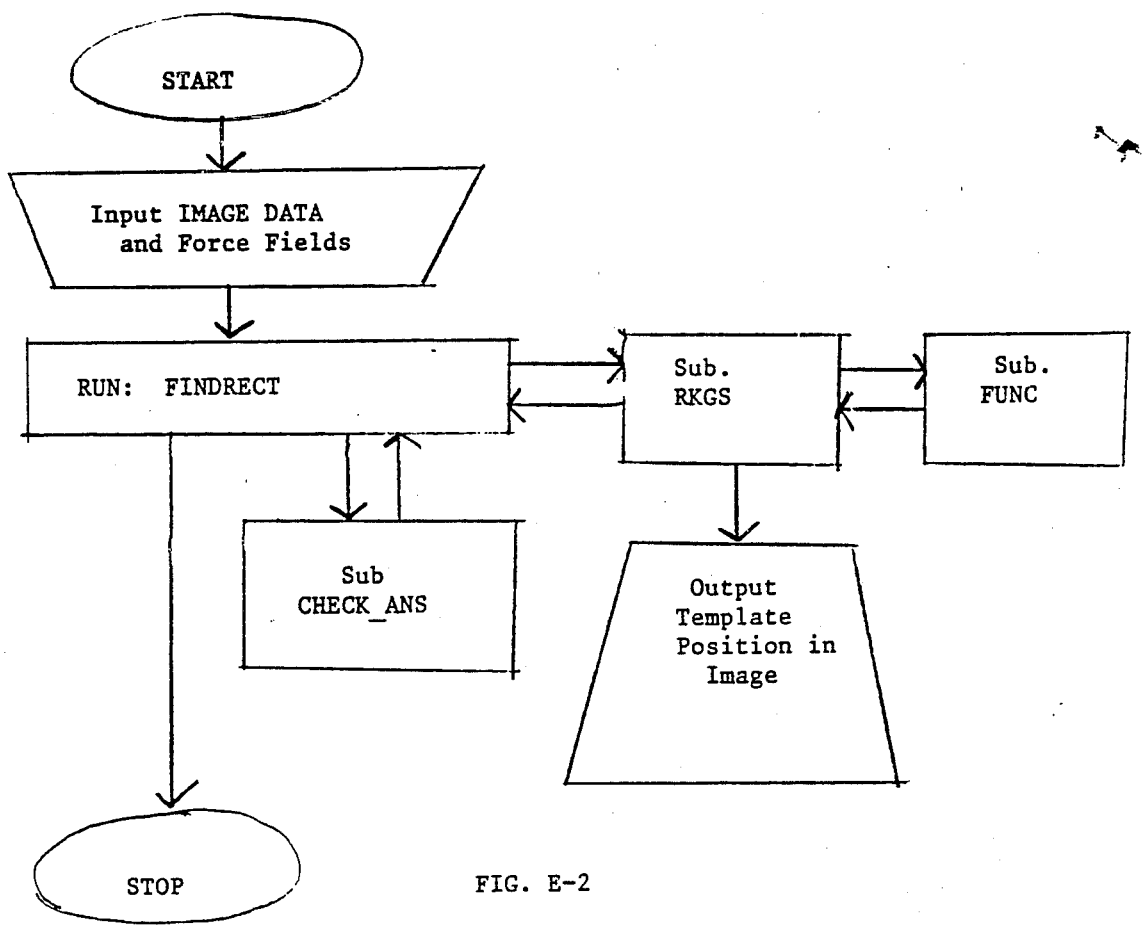
FIG. E-2

```fortran
      Program Runflow
      Include 'laxwen.inc'
      Character*80 FileU,FileV
      Real*4 Dens(0:MaxC,0:MaxR)
      Real*4 MaxUV,MinUV,Temp
      Real*4 Scale
      Integer*2 MaxStep,Loop, Ians Integer*4 IOBlk(1536,3),Status(2,3),Header(128,3),I,J
      Integer*4 F_Valid, F_npix, F_Nframes, F_nBits, F_nlin
      Integer*4 F_Frame, F_color, F_Avg, F_Std
      Integer*2 F_max, F_min
      Double Precision STATIS(12,3)
C
      Character*80 Filename
      Character*1 F_Type,Ans
C
C **************************************************************
C *                                                            *
C *    Read in the input image                                 *
C *                                                            *
C **************************************************************
C
      type *,' > Enter input file name.'
      accept 1000, FileName
C
      Call Open_(IOBLK,FileName,'.400','O',Status,Header,,,,,*9900)
C     Check the status
C
C**-----GET FILE TYPE AND SIZE FROM HEADER
C
      Call IMG_PRM_R(Ioblk(1,1), F_valid, F_npix,
     1    F_nlin, F_nframes, F_nbits, F_frame, F_type, F_color,*9901)
C
C
      write(*,*) 'f_type is ',F_type
C**-----Read file max and min
      Call IMG_Stat_R(Ioblk, F_valid, F_max, F_Min,
     1       F_Avg, F_Std)
      Write(*,*) 'F_max=',F_max
      Write(*,*) 'F_min=',F_min
      if( F_valid .eq. 0 ) then
        Write(*,*) ' Error in Stat. no header info'
      end if
C
C**-----Read in the files
      IF( F_type .eq. 'U' ) then
C        Call Read_W(Ioblk, Dens(0,64),F_Npix*F_nlin,1,*9903)
C        Call Mov('AUTOAR',Dens(0,64),In,F_Npix*F_nlin)
      Else if( F_type .eq. 'W' ) then
        Call Read_W(Ioblk, Dens(0,Halfway), 2*F_npix*F_nlin, 1)
        Call Mov('AWTOAR',Dens(0,Halfway),Dens,F_npix*F_nlin)
        WRITE(*,*) ' F_npix= ',F_npix
        Write(*,*) ' F_nlin= ',F_nlin
C
      End if
      Call Close_(IOBLK(1,1))
C ****************************************************************
      MaxUV = F_max
```

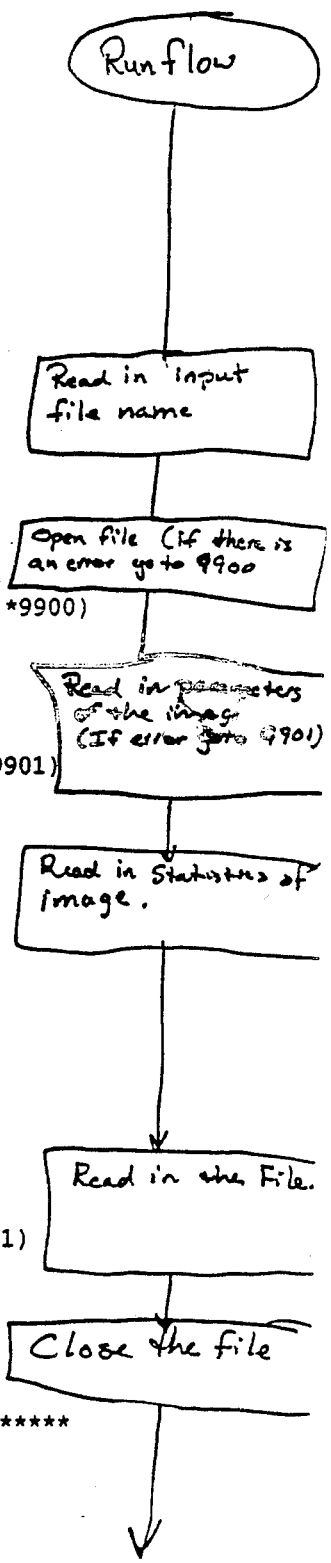

```
          Scale = .06/MaxUV
          Write(*,*) ' MaxUV = ',MaxUV
C
C ***********************************************************
C *                                                         *
C *     Open the output files                               *
C *                                                         *
C ***********************************************************
C
          Write(*,*) ' Enter the name of the OUTPUT U file'
          Read(*,1000) FileU
          Write(*,*) ' Enter the name of the OUTPUT V file'
          Read(*,1000) FileV
 1000     Format(a)
          Write(*,*) ' Please enter the number of steps'
          Read(*,*) MaxStep
C ****
C     Parameter set up
C
          F_type = 'W'
          F_nframes = 1
          F_color = 1
          F_valid =1
          F_nbits= 8*2
          I = (F_nlin*F_npix*2+511)/512
          Write(*,*) ' I=',I
          Write(*,*) ' F_npix=',F_npix
          Write(*,*) ' F_nlin=',F_nlin
          Write(*,*) ' FileU=',FileU
C ****
C     Opening the files
C
C     U file
          Call Open_(IOBLK(1,2),FileU,'.400','N',Status(1,2),Header(1,2)
     1           ,F_npix*2,I+1,*9910)
C         Write(*,*) ' Made it past the Open_ s'
C     V file
          Call Open_(IOBLK(1,3),FileV,'.400','N',Status(1,3),Header(1,3)
     1           ,F_npix*2,I+1,*9920)
C         Write(*,*) ' Made it past the Open_ s'
C ****
C     U file
          Call Statin(F_type,STATIS(1,2))
C     V file
          Call Statin(F_type,STATIS(1,3))
C         Write(*,*) ' Made it past the Statin'
C ****
C     Write file type and size into header
C     U file
          Call IMG_PRM_W(Ioblk(1,2), F_valid, F_npix,
     1 F_nlin, F_nframes, F_nbits, F_frame, F_type, F_color,*9901)
C     V file
          Call IMG_PRM_W(Ioblk(1,3), F_valid, F_npix,
     1 F_nlin, F_nframes, F_nbits, F_frame, F_type, F_color,*9901)
C
C     Output files are now open.
C
C ***********************************************************
C *                                                         *
C *     Normalize the density                               *
```

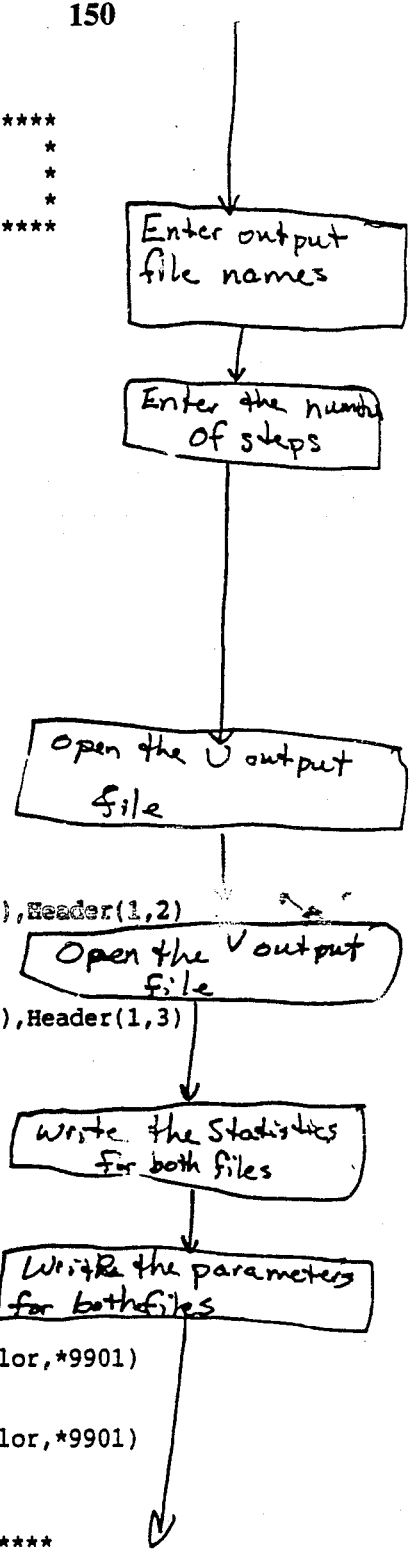

```
C *                                                             *
C ***************************************************************
C
        Write(*,*) ' Please enter a one if body density'
        READ(*,*) Ians
        IF( Ians .eq. 1 ) then
C          Scale the image
           Call Mul('CRTOAR',Scale,Dens,F_npix*F_nlin)
C          Normalize by adding .97
           Call Add('CRTOAR',.97,Dens,F_npix*F_nlin)
C          Make a copy of dens (R1)
C          Call Mov('ARTOAR',Dens,R1,F_npix*F_nlin)
           Do 110 J=0,MaxR
              Do 100 I=0,MaxC
                 R1(I,J) = Dens(I,J)
  100         Continue
  110      Continue
        Else
           Scale = -Scale
C          Scale the image
           Call Mul('CRTOAR',Scale,Dens,F_npix*F_nlin)
C          Normalize by adding 1.03
           Call Add('CRTOAR',1.03,Dens,F_npix*F_nlin)
C          Make a copy of dens (R1)
C          Call Mov('ARTOAR',Dens,R1,F_npix*F_nlin)
           Do 111 J=0,MaxR
              Do 101 I=0,MaxC
                 R1(I,J) = Dens(I,J)
  101         Continue
  111      Continue
        End if
C
C ***************************************************************
C *                                                             *
C *    Zero the momentum                                        *
C *                                                             *
C ***************************************************************
C
        DO 120 I = 1,MaxC,2
        DO 120 J = 1,MaxR,2

U1(I,J) = 0
              V1(I,J) = 0

120   CONTINUE

DO 121 I = 0,MaxC-1,2
        DO 121 J = 0,MaxR-1,2

U1(I,J) = 0
              V1(I,J) = 0

121   CONTINUE
C
C ***************************************************************
C *                                                             *
C *    Loop through the fluid flow calculation                  *
C *                                                             *
C ***************************************************************
C
```

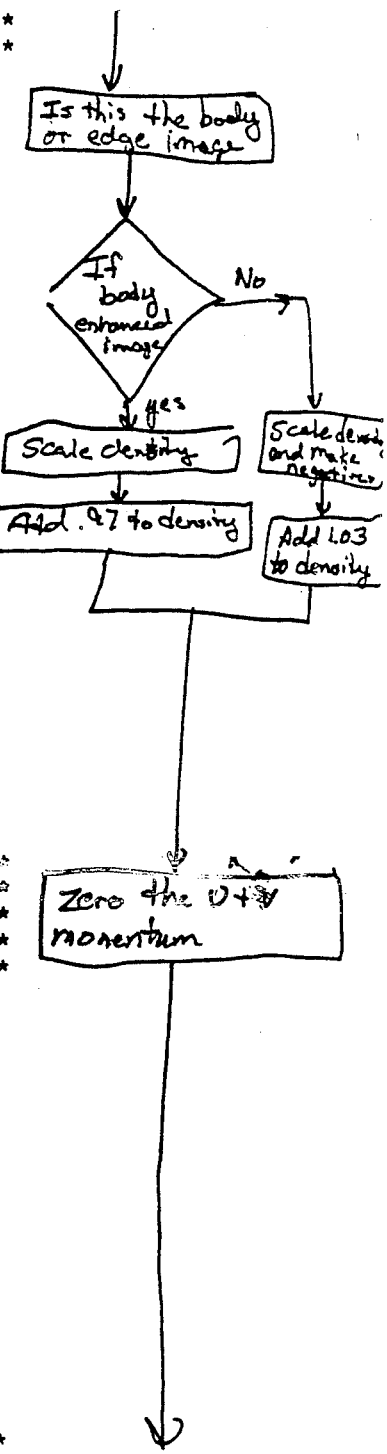

```
C
      DO 130 LOOP = 1,MaxStep
C
      WRITE(*,*) ' CALL LAXWEN ',LOOP
C
            CALL LAXWEN(loop)
C
      WRITE(*,*) ' RENORMALIZE DATA'
C
        DO 140 I = 1,MaxC
          DO 141 J = 1,MaxR
            Temp = Dens(I,J) / R1(I,J)
            U1(I,J) = U1(I,J) * Temp
            V1(I,J) = V1(I,J) * Temp
            R1(I,J) = Dens(I,J)
141       Continue
140     Continue
130   Continue
C
C
C ****************************************************************
C *                                                              *
C *    Calculate the maximum velocity                            *
C *                                                              *
C ****************************************************************
C
      MaxUV = 0.0
      DO 150 I = 1,MaxC
        DO 151 J = 1,MaxR
          U1(I,J) = U1(I,J) / R1(I,J)
          V1(I,J) = V1(I,J) / R1(I,J)
          If( MaxUV .Lt. Abs(U1(i,j)) ) MaxUV = Abs(U1(i,j))
          If( MaxUV .Lt. Abs(V1(i,j)) ) MaxUV = Abs(V1(i,j))
151     Continue
150   Continue
      Write(*,*) ' The max Vel is ',MaxUV
      Scale = 999.0/MaxUv
C
C ****************************************************************
C *                                                              *
C *    Write out the velocity arrays                             *
C *                                                              *
C ****************************************************************
C
C ****
C     U velocity
C     Scale the image
      Do j=0,F_nlin-1
        Do i=0,F_npix-1
          Dens(i,j) = Scale*U1(i,j)
        End do
      End do
      Call Mov('ARTOAW',Dens,Dens,F_npix*F_nlin)
C     Write out the scaled image.
      Call Write_W(Ioblk(1,2), Dens, 2*F_npix*F_nlin, 1)
C ****
C     V velocity
C     Scale the image
      Do j=0,F_nlin-1
        Do i=0,F_npix-1
```

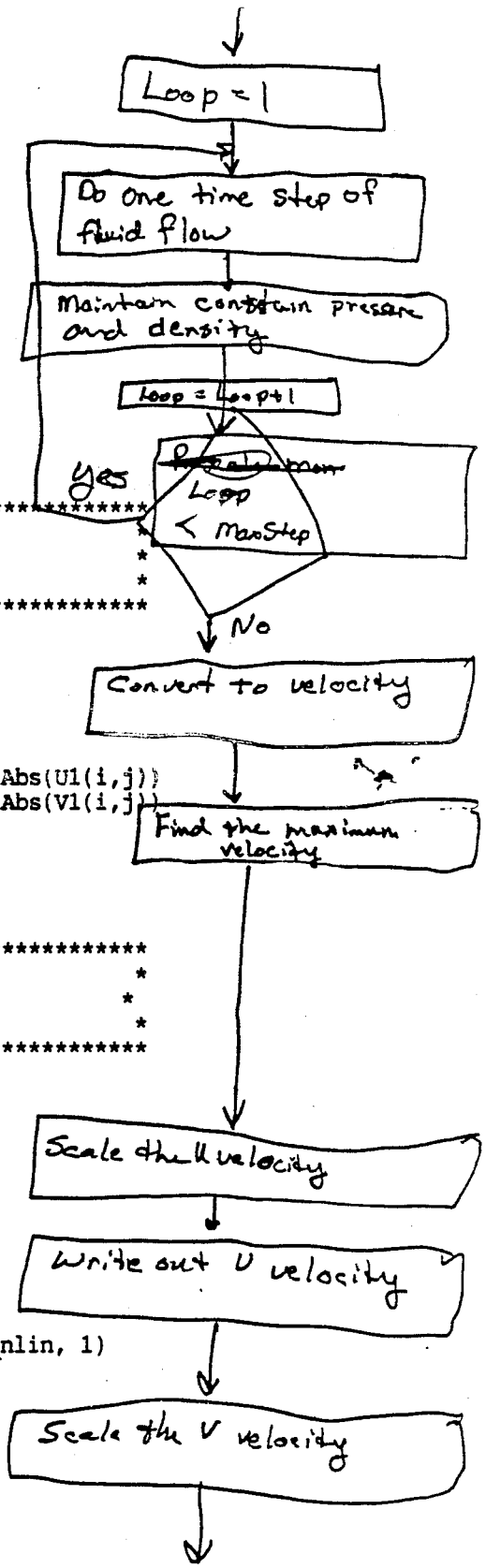

```
              Dens(i,j) = Scale*V1(i,j)
            End do
          End do
C       Change to a two byte integer array
          Call Mov('ARTOAW',Dens,Dens,F_npix*F_nlin)
C       Write out the scaled image.
          Call Write_W(IOblk(1,3), Dens, 2*F_npix*F_nlin, 1)

C ****
C       Close the files
C
          Call Close_(IOblk(1,2))
          Call Close_(IOblk(1,3))
          Stop
C
C
C
9900      Continue
C
          Write(*,*) ' Did not open file, stopping'
          STOP
9910      Continue
C
          Write(*,*) ' Did not open U file, stopping'
          STOP
9920      Continue
C
          Write(*,*) ' Did not open V file, stopping'
          STOP
9901      Continue
C
          Write(*,*) ' Param. error, stopping'
          STOP
9903      Continue
C
          Write(*,*) ' Read error, stopping'
          STOP
          End
          Program FindRect
C ******************************************************************
C       Copyright 1987 Science Applications International Corp.
C       written by: Robert R. Weyker
C                   Robert R. Greene
C                   Karen F. West
C
C ******************************************************************
C
          Include 'Rect2.inc'
          Integer*4 Count,Ipara
          Parameter( Ipara = 10 )
          Integer*4 Ndim,Ihlf,ians,I,J, MaxSteps,ii
          Integer*4 cli$get_value
          Real*4 Alpha,Testp(Ipara),Acc,Y(Ipara),Dery(Ipara)
          Real*4 Aux(8,Ipara),Param(5),temp
C       These are the circle paramters
          Real*4 X1,Y1,Ang1,Ang2,DLmin,Dll,rin
          Character*40 FileU,FileV, imagefile
          Integer*2 Maximg,chanl
C
          integer*2         in(MaxX,MaxY)
C
C       Image utilities data.
C
          Integer*4 IOBlk(1536),Status(2),Header(128)
          Integer*4 F_Valid, F_npix, F_Nframes, F_nBits, F_nlin
          Integer*4 F_Frame, F_color, F_Avg, F_Std
          Integer*2 F_max, F_min
```

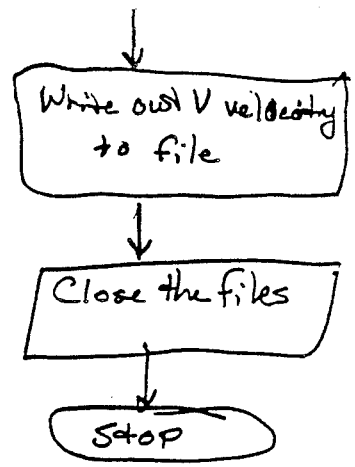

```
C
        Character*80 Filename
        Character*1 F_Type,Ans
        External OUTPUT,Func,Cli$get_value
        Integer*2 X2(0:MaxX), Y2(0:MaxX)
        Common /draw/ X2,Y2
        Common /test/ TestP,Acc,Count,MaxSteps
        Common /param/ Alpha,Dlmin
        Common /param2/ rin
C       This is the number of paramters that RKGS must solve for.
        Ndim = 10
C       Scaling constant for the images
        Temp = 1.0/999.0
C
C ************************************************************
C *                                                          *
C *     Read in the input images                             *
C *                                                          *
C ************************************************************
C
C 111111
        ii= cli$get_value('image',Imagefile)
C
        Call Open_(IOBLK,Imagefile,'.400','O',Status,Header,*9900)
C
C       Get file type and size from header
C
        Call IMG_PRM_R(Ioblk, F_valid, F_npix,
     1  F_nlin, F_nframes, F_nbits, F_frame, F_type, F_color,*9901)
C       Read file max and min
C
C
C       Read in the file
        If( F_type .eq. 'W' ) then
          Call Read_W(Ioblk, In, 2*F_npix*F_nlin, 1)
        End if
        Call Close_(IOBLK)
        WRite(*,*) 'Finished reading data file 1'
C
C 222222
        ii= cli$get_value('file1',Fileu)
C
        Call Open_(IOBLK,FileU,'.400','O',Status,Header,*9900)
C
C       Get file type and size from header
C
        Call IMG_PRM_R(Ioblk, F_valid, F_npix,
     1  F_nlin, F_nframes, F_nbits, F_frame, F_type, F_color,*9901)
C
C       Read in the file
        If( F_type .eq. 'W' ) then
          Call Read_W(Ioblk, U1(1,Halfway), 2*F_npix*F_nlin, 1)
          Call Mov('AWTOAR',U1(1,Halfway),U1,F_npix*F_nlin)
C         Scale the U velocity
          Call Mul('CRTOAR',Temp,U1,F_npix*F_nlin)
        End if
        Call Close_(IOBLK)
        WRite(*,*) 'Finished reading data file 2'
C
C 333333
        ii= cli$get_value('file2',FileV)
C
        Call Open_(IOBLK,FileV,'.400','O',Status,Header,*9900)
C
C       Get file type and size from header
```

```
C
           Call IMG_PRM_R(Ioblk, F_valid, F_npix,
     1     F_nlin, F_nframes, F_nbits, F_frame, F_type, F_color,*9901)
C
C          Read in the file
           If( F_type .eq. 'W' ) then
              Call Read_W(Ioblk, V1(1,Halfway), 2*F_npix*F_nlin, 1)
              Call Mov('AWTOAR',V1(1,Halfway),V1,F_npix*F_nlin)
C             Scale the V velocity
              Call Mul('CRTOAR',Temp,V1,F_npix*F_nlin)
           End if
           Call Close_(IOBLK)
           WRite(*,*) 'Finished reading data file 3'
C
C
C 444444
           ii= cli$get_value('file3',Fileu)
C
           Call Open_(IOBLK,FileU,'.400','O',Status,Header,*9900)
C
C          Get file type and size from header
C
           Call IMG_PRM_R(Ioblk, F_valid, F_npix,
     1     F_nlin, F_nframes, F_nbits, F_frame, F_type, F_color,*9901)
C
C          Read in the file
           If( F_type .eq. 'W' ) then
              Call Read_W(Ioblk, U2(1,Halfway), 2*F_npix*F_nlin, 1)
              Call Mov('AWTOAR',U2(1,Halfway),U2,F_npix*F_nlin)
C             Scale the U velocity
              Call Mul('CRTOAR',Temp,U2,F_npix*F_nlin)
           End if
           Call Close_(IOBLK)
           WRite(*,*) 'Finished reading data file 4'
C
C 555555
           ii= cli$get_value('file4',FileV)
C
           Call Open_(IOBLK,FileV,'.400','O',Status,Header,*9900)
C
C          Get file type and size from header
C
           Call IMG_PRM_R(Ioblk, F_valid, F_npix,
     1     F_nlin, F_nframes, F_nbits, F_frame, F_type, F_color,*9901)
C
C          Read in the file
           If( F_type .eq. 'W' ) then
              Call Read_W(Ioblk, V2(1,Halfway), 2*F_npix*F_nlin, 1)
              Call Mov('AWTOAR',V2(1,Halfway),V2,F_npix*F_nlin)
C             Scale the V velocity
              Call Mul('CRTOAR',Temp,V2,F_npix*F_nlin)
           End if
           Call Close_(IOBLK)
           WRite(*,*) 'Finished reading data file 5'
C          Have the velocity data.
C
C ***********************************************************
C       I2S
C ***********************************************************
C
C          Write(*,*) ' Please enter the channel no.'
C          Read(*,*) Chanl
           Call Initdspl(chanl)
           CALL DISPLAY(CHANL)
```

```
C
C         Enter the starting guesses
C
3000      Continue
          Write(*,*) ' Please enter the center (x,y), Ang1,Ang2, and L: '
          Read(*,*) X1,Y1,Ang1,Ang2,Dl1
          Write(*,*) ' Please enter the minimum radius: '
          Read(*,*) DLmin
C
C         Set up the starting points
          Y(1) = X1
          Y(2) = 0
          Y(3) = Y1
          Y(4) = 0
          Y(5) = Ang1 * .0174533
          Y(6) = 0
          Y(7) = Ang2 * .0174533
          Y(8) = 0
          Y(9) = DL1
          Y(10) = 0
C         This is the decay
          Write(*,*) ' Please enter the decay: '
          Read(*,*) Alpha
          Write(*,*) ' Please enter the contraction parameter : '
          Read(*,*) rin
C
C
          Write(*,*) ' Please enter the stopping control: '
          Read(*,*) Acc
          Write(*,*) ' Please enter the maximum number of steps'
          Read(*,*) MaxSteps
C
C             PRMT    - AN INPUT AND OUTPUT VECTOR WITH DIMENSION GREATER
C                       OR EQUAL TO 5, WHICH SPECIFIES THE PARAMETERS OF
C                       THE INTERVAL AND OF ACCURACY AND WHICH SERVES FOR
C                       COMMUNICATION BETWEEN OUTPUT SUBROUTINE (FURNISHED
C                       BY THE USER) AND SUBROUTINE RKGS. EXCEPT PRMT(5)
C                       THE COMPONENTS ARE NOT DESTROYED BY SUBROUTINE
C                       RKGS AND THEY ARE
C             PRMT(1)- LOWER BOUND OF THE INTERVAL (INPUT),
          PARAM(1) = 0.
C             PRMT(2)- UPPER BOUND OF THE INTERVAL (INPUT),
          PARAM(2) = 2000.
C             PRMT(3)- INITIAL INCREMENT OF THE INDEPENDENT VARIABLE
C                       (INPUT),
          Write(*,*) ' Please enter the Step size: '
          Read(*,*) Param(3)
C         PARAM(3) = 1.
C             PRMT(4)- UPPER ERROR BOUND (INPUT). IF ABSOLUTE ERROR IS
C                       GREATER THAN PRMT(4), INCREMENT GETS HALVED.
C                       IF INCREMENT IS LESS THAN PRMT(3) AND ABSOLUTE
C                       ERROR LESS THAN PRMT(4)/50, INCREMENT GETS DOUBLED.
C                       THE USER MAY CHANGE PRMT(4) BY MEANS OF HIS
C                       OUTPUT SUBROUTINE.
          PARAM(4) = .01
C             PRMT(5)- NO INPUT PARAMETER. SUBROUTINE RKGS INITIALIZES
C                       PRMT(5)=0. IF THE USER WANTS TO TERMINATE
C                       SUBROUTINE RKGS AT ANY OUTPUT POINT, HE HAS TO
C                       CHANGE PRMT(5) TO NON-ZERO BY MEANS OF SUBROUTINE
C                       OUTP. FURTHER COMPONENTS OF VECTOR PRMT ARE
C                       FEASIBLE IF ITS DIMENSION IS DEFINED GREATER
C                       THAN 5. HOWEVER SUBROUTINE RKGS DOES NOT REQUIRE
C                       AND CHANGE THEM. NEVERTHELESS THEY MAY BE USEFUL
```

```
C             FOR HANDING RESULT VALUES TO THE MAIN PROGRAM
C             (CALLING RKGS) WHICH ARE OBTAINED BY SPECIAL
C             MANIPULATIONS WITH OUTPUT DATA IN SUBROUTINE OUTP.
C
C
C  DERY CONTAINS (INITIALLY) THE WEIGHTING FACTORS FOR THE ERRORS
C
C         These parameters keep track of the last calculated points
          Do 220 i=1,Ndim
            Dery(i) = 1.0/Float(Ndim)
            TestP(i) = 0.0
  220     Continue
          Do 344 i=0,4
            X2(i) = 0
            Y2(i) = 0
  344     Continue
C
C         METHOD
C            EVALUATION IS DONE BY MEANS OF FOURTH ORDER RUNGE-KUTTA
C            FORMULAE IN THE MODIFICATION DUE TO GILL. ACCURACY IS
C            TESTED COMPARING THE RESULTS OF THE PROCEDURE WITH SINGLE
C            AND DOUBLE INCREMENT.
C            SUBROUTINE RKGS AUTOMATICALLY ADJUSTS THE INCREMENT DURING
C            THE WHOLE COMPUTATION BY HALVING OR DOUBLING. IF MORE THAN
C            10 BISECTIONS OF THE INCREMENT ARE NECESSARY TO GET
C            SATISFACTORY ACCURACY, THE SUBROUTINE RETURNS WITH
C            ERROR MESSAGE IHLF=11 INTO MAIN PROGRAM.
C            TO GET FULL FLEXIBILITY IN OUTPUT, AN OUTPUT SUBROUTINE
C            MUST BE FURNISHED BY THE USER.
C            FOR REFERENCE, SEE
C            RALSTON/WILF, MATHEMATICAL METHODS FOR DIGITAL COMPUTERS,
C            WILEY, NEW YORK/LONDON, 1960, PP.110-120.
C
          Count = 0
          CALL RKGS(PARAM,Y,DERY,NDIM,IHLF,Func,OUTPUT,AUX)
C
          Write(*,1002) Y(1),Y(3),Y(5),Y(7),Y(9)
          Write(*,1002) Y(2),Y(4),Y(6),Y(8),Y(10)
          Call CHECK_ANS(IN,MAXX,MAXY,Y,NDIM,DLMin)
 1002     Format(1x,5F15.3)
          Write(*,*) ' Please enter a one if you want to try again'
          Read(*,*) ians
          If( Ians .eq. 1 ) go to 3000
          Stop
C
C
 9900     Continue
C
                   ' Did not open file, stopping'

' Param. error, stopping'

9903
C
                     , ' Read error, stopping'

End
```

```
      SUBROUTINE LAXWEN(Istep)
      Include 'LAXWEN.inc'
      INTEGER*2 KC, KR,Istep REAL*4    A, B,scale

C**********************
C ESTIMATE TIME STEP
C**********************

B = 0

C     find largest velocity in two loops
      DO 200 KR = 0,MaxR-1,2
      DO 200 KC = 0,MaxC-1,2
         A =  U1(KC,KR)**2 + V1(KC,KR)**2

IF ( A .GT. B ) B = A

200   CONTINUE
      DO 211 KR = 1,MaxR,2
      DO 211 KC = 1,MaxC,2
         A =  U1(KC,KR)**2 + V1(KC,KR)**2

IF ( A .GT. B ) B = A

211   CONTINUE
C     formula for time step

Write(*,*) ' max vel is ',B
      B = .9 / ( (1 + SQRT(B)) * SQRT(2.) )
      Write(*,*) ' Step is ',B A = B / 2
C     If( 1 .eq. 1 )goto 9333
C
C **********************************************************************
C                                                                      *
C     CALCULATE CONSERVATION LAW QUANTITIES                             *
C     FOR PREDICTOR STEP, IN TWO LOOPS                                  *
C                                                                      *
C     TAKE THE PREDICTOR STEP OF TWO-STEP LAX-WENDROFF IN TWO LOOPS     *
C                                                                      *
C **********************************************************************
C
C
C     *************** PART ONE *****************
C
C
C     Points which are (even,odd) (Column,Row)
C
C     Boundary CONDITIONS
C
C     LEFT    BOTTOM
C
      KR = 0
      DO 400 KC = 0,MaxC-1,2
C
C        This is the first row which is shifted to the -1 row.
C        This is NOT a Boundary Condition, this is a startup overhead.
         GR(KC,1) = ( V1(KC,KR) )
         GU(KC,1) = ( U1(KC,KR) * V1(KC,KR) / R1(KC,KR) )
         GV(KC,1) = ( V1(KC,KR)**2 / R1(KC,KR) + R1(KC,KR) )
400   CONTINUE
```

*Laxwen for Runflow*

Note: This code produces the same answer as other LAXWEN subroutines, however this code was rewritten to reduce the amount of memory used. Because of the rewrite this code is almost impossible to flow chart (It can be flow charted but most of the graph or chart would consist of cryptic statements which minimize memory usage).

```
         DO 510 KR = 1,MaxR,2
C          The "starting" value of the F's must be calculated here the
C          rest are calculated below
           KC = 0
C          This is a BOUNDARY CONDITION at the LEFT side of the matrix
           FR(-1) = -( U1(KC+1,KR) )
           FU(-1) = -( U1(KC+1,KR)**2 / R1(KC+1,KR) + R1(KC+1,KR) )
           FV(-1) = -( U1(KC+1,KR) * V1(KC+1,KR) / R1(KC+1,KR) )

DO 515 KC = 0,MaxC-1,2
C             Shift the previous row of data (this is the one step shift and save)
              GR(KC,-1) = GR(KC,1)
              GU(KC,-1) = GU(KC,1)
              GV(KC,-1) = GV(KC,1)
C             We use the F's of the columns which are not the current points
              FR(KC+1) = U1(KC+1,KR)
              FU(KC+1) = U1(KC+1,KR)**2 / R1(KC+1,KR) + R1(KC+1,KR)
              FV(KC+1) = U1(KC+1,KR) * V1(KC+1,KR) / R1(KC+1,KR)
              If( KR .ne. MaxR ) then
C                We Calculate the current values needed in the calculation
                 GR(KC,1) = V1(KC,KR+1)
                 GU(KC,1) = U1(KC,KR+1) * V1(KC,KR+1) / R1(KC,KR+1)
                 GV(KC,1) = V1(KC,KR+1)**2 / R1(KC,KR+1) + R1(KC,KR+1)
              Else
C                This is the BOUNDARY CONDITION on the BOTTOM of the matrix.
                 GR(KC,1) = -GR(KC,-1)
                 GU(KC,1) = -GU(KC,-1)
                 GV(KC,1) = -GV(KC,-1)
              End If
C
C             Fill in the edge of the image with velocity and density points
C             (BOUNDARY CONDITIONS on the BOTTOM of the matrix.)
C
              If( KR .eq. MaxR ) then
                 R1(KC,MaxR+1) = R1(KC,MaxR-1)
                 U1(KC,MaxR+1) = U1(KC,MaxR-1)
                 V1(KC,MaxR+1) = V1(KC,MaxR-1)
              End if
 515       Continue
C
C          The edge of each row.
C          These are the LEFT edge BOUNDARY CONDITIONS.
           R1(-1,KR) = R1(1,KR)
           U1(-1,KR) = U1(1,KR)
           V1(-1,KR) = V1(1,KR)
C
C          We now have the the points for the current run.
           DO 500 KC = 0,MaxC-1,2

R1(KC,KR) = FR(KC+1) - FR(KC-1)
     1                  + GR(KC,1) - GR(KC,-1)
              R1(KC,KR) = (R1(KC-1,KR  ) +
     *                     R1(KC+1,KR  ) +
     *                     R1(KC  ,KR-1) +
     *                     R1(KC  ,KR+1) ) *.25
     *                  - A * R1(KC,KR)

U1(KC,KR) = FU(KC+1) - FU(KC-1)
     1                  + GU(KC,1) - GU(KC,-1)
              U1(KC,KR) = (U1(KC-1,KR  ) +
     *                     U1(KC+1,KR  ) +
     *                     U1(KC  ,KR-1) +
     *                     U1(KC  ,KR+1) ) *.25
     *                  - A * U1(KC,KR)
```

```
              V1(KC,KR) = FV(KC+1) - FV(KC-1)
      1                + GV(KC,1) - GV(KC,-1)
              V1(KC,KR) = (V1(KC-1,KR  ) +
      *             V1(KC+1,KR  ) +
      *             V1(KC  ,KR-1) +
      *             V1(KC  ,KR+1) ) *.25
      *           - A * V1(KC,KR)

500      Continue
C
C         Boundary Condition on the U vel.
C
          U1(0,KR) = 0.0
C
C         Boundary Condition on the V vel.
C
          IF( KR .eq. MaxR) then
            DO 513 KC = 0,MaxC-1,2
              V1(KC,MaxR) = 0.0
 513        Continue
          End if
 510    Continue C
C       ************* PART TWO **************
C
C
C       Points which are (odd,even) (Column,Row)
C
C       Boundary CONDITIONS
C
C       RIGHT     TOP
C
        DO 430 KC = 1,MaxC,2
C
C         This time this IS a BOUNDARY CONDITION at the TOP of the matrix
C         and it is shifted at the next step.
          GR(KC,1) = -( V1(KC,1) )
          GU(KC,1) = -( U1(KC,1)*V1(KC,1)/R1(KC,1) )
          GV(KC,1) = -( V1(KC,1)**2/R1(KC,1)+R1(KC,1) )
C
C         This is the BOUNDARY CONDITION at the TOP of the matrix.
          R1(KC,-1) = R1(KC,1)
          U1(KC,-1) = U1(KC,1)
          V1(KC,-1) = V1(KC,1)
 430    CONTINUE DO 530 KR = 0,MaxR-1,2
          DO 535 KC = 1,MaxC,2
C           Shift the previous row of data (this is the one step shift and save)
            GR(KC,-1) = GR(KC,1)
            GU(KC,-1) = GU(KC,1)
            GV(KC,-1) = GV(KC,1)
C           We use the F's of the columns which are not the current points
            FR(KC-1) = U1(KC-1,KR)
            FU(KC-1) = U1(KC-1,KR)**2 / R1(KC-1,KR) + R1(KC-1,KR)
            FV(KC-1) = U1(KC-1,KR) * V1(KC-1,KR) / R1(KC-1,KR)
C
C           We Calculate the current values needed in the calculation
            GR(KC,1) = V1(KC,KR+1)
            GU(KC,1) = U1(KC,KR+1) * V1(KC,KR+1) / R1(KC,KR+1)
            GV(KC,1) = V1(KC,KR+1)**2 / R1(KC,KR+1) + R1(KC,KR+1)
C
 535      Continue
C         The edge of each row.
```

```
C           This is the BOUNDARY CONDITION at the RIGHT side of the matrix.
            R1(MaxC+1,KR) = R1(MaxC-1,KR)
            U1(MaxC+1,KR) = U1(MaxC-1,KR)
            V1(MaxC+1,KR) = V1(MaxC-1,KR)
C           rest are calculated below
C
C           This is the BOUNDARY CONDITION at the RIGHT side of the matrix.
            FR(MaxC+1) = -( FR(MaxC-1) )
            FU(MaxC+1) = -( FU(MaxC-1) )
            FV(MaxC+1) = -( FV(MaxC-1) )

C           We now have the the points for the current run.
            DO 540 KC = 1,MaxC,2

R1(KC,KR) = FR(KC+1) - FR(KC-1)
      1                 + GR(KC,1) - GR(KC,-1)
              R1(KC,KR) = (R1(KC-1,KR  ) +
      *            R1(KC+1,KR  ) +
      *            R1(KC  ,KR-1) +
      *            R1(KC  ,KR+1) ) *.25
      *          - A * R1(KC,KR)

U1(KC,KR) = FU(KC+1) - FU(KC-1)
      1                 + GU(KC,1) - GU(KC,-1)
              U1(KC,KR) = (U1(KC-1,KR  ) +
      *            U1(KC+1,KR  ) +
      *            U1(KC  ,KR-1) +
      *            U1(KC  ,KR+1) ) *.25
      *          - A * U1(KC,KR)

V1(KC,KR) = FV(KC+1) - FV(KC-1)
      1                 + GV(KC,1) - GV(KC,-1)
              V1(KC,KR) = (V1(KC-1,KR  ) +
      *            V1(KC+1,KR  ) +
      *            V1(KC  ,KR-1) +
      *            V1(KC  ,KR+1) ) *.25
      *          - A * V1(KC,KR)

540        Continue
C
C           Boundary Condition on the U vel.
C
            U1(MaxC,KR) = 0.0
C
C           Boundary Condition on the V vel.
C
            IF( KR .eq. 0) then
              DO 543 KC = 1,MaxC,2
                V1(KC,0) = 0.0
 543          Continue
            End if
 530        Continue
C
C           Finished the first step.
C
C ****************************************************************
C ----------------------------------------------------------------
C
 9333       continue
C ****************************************************************
C                                                                 *
C     CALCULATE CONSERVATION LAW QUANTITIES                       *
C     FOR PREDICTOR STEP, IN TWO LOOPS                            *
C                                                                 *
C     TAKE THE PREDICTOR STEP OF TWO-STEP LAX-WENDROFF IN TWO LOOPS *
```

```
C                                                                            *
C     ****************************************************************
C
C
C           *************** PART ONE (step two) ******************
C
C
C           Points which are (even,even) (Column,Row)
C
C           Boundary CONDITIONS
C
C           LEFT    TOP
C
          KR = 1
          DO 405 KC = 0,MaxC-1,2
C
C            This is the first row which is shifted to the -1 row.
C            This IS a Boundary Condition at the TOP of the matrix,
C            this is also startup overhead.
             GR(KC,1) = -( V1(KC,KR) )
             GU(KC,1) = -( U1(KC,KR) * V1(KC,KR) / R1(KC,KR) )
             GV(KC,1) = -( V1(KC,KR)**2 / R1(KC,KR) + R1(KC,KR) )
C
C            This is the BOUNDARY CONDITION at the TOP of the matrix.
C            R1(KC,-1) = R1(KC,1)
C            U1(KC,-1) = U1(KC,1)
C            V1(KC,-1) = V1(KC,1)
  405     CONTINUE DO 610 KR = 0,MaxR-1,2
C            The "starting" value of the F's must be calculated here the
C            rest are calculated below
             KC = 0
C            This is a BOUNDARY CONDITION at the LEFT side of the matrix
             FR(-1) = -( U1(KC+1,KR) )
             FU(-1) = -( U1(KC+1,KR)**2 / R1(KC+1,KR) + R1(KC+1,KR) )
             FV(-1) = -( U1(KC+1,KR) * V1(KC+1,KR) / R1(KC+1,KR) )

DO 615 KC = 0,MaxC-1,2
C               Shift the previous row of data (this is the one step shift and save)
                GR(KC,-1) = GR(KC,1)
                GU(KC,-1) = GU(KC,1)
                GV(KC,-1) = GV(KC,1)
C               We use the F's of the columns which are not the current points
                FR(KC+1) = U1(KC+1,KR)
                FU(KC+1) = U1(KC+1,KR)**2 / R1(KC+1,KR) + R1(KC+1,KR)
                FV(KC+1) = U1(KC+1,KR) * V1(KC+1,KR) / R1(KC+1,KR)
                GR(KC,1) = ( V1(KC,KR+1) )
                GU(KC,1) = ( U1(KC,KR+1) * V1(KC,KR+1) / R1(KC,KR+1) )
                GV(KC,1) = ( V1(KC,KR+1)**2 / R1(KC,KR+1) + R1(KC,KR+1) )
C
C               Fill in the edge of the image with velocity and density points
C               (BOUNDARY CONDITIONS on the BOTTOM of the matrix.)
C
  615        Continue
C
C            The edge of each row.
C            These are the LEFT edge BOUNDARY CONDITIONS.
C            R1(-1,KR) = R1(1,KR)
C            U1(-1,KR) = U1(1,KR)
C            V1(-1,KR) = V1(1,KR)

C
C            We now have the the points for the current run.
             DO 600 KC = 0,MaxC-1,2
```

```
                Temp = FR(KC+1) - FR(KC-1)
        1                 + GR(KC,1) - GR(KC,-1)
                R1(KC,KR) = R1(KC,KR   )
        *           - B * Temp Temp = FU(KC+1) - FU(KC-1)
        1                 + GU(KC,1) - GU(KC,-1)
                U1(KC,KR) = U1(KC,KR   )
        *           - B * Temp Temp = FV(KC+1) - FV(KC-1)
        1                 + GV(KC,1) - GV(KC,-1)
                V1(KC,KR) = V1(KC,KR   )
        *           - B * Temp 600     Continue
C
C       Boundary Condition on the U vel.
C
          U1(0,KR) = 0.0
C
C       Boundary Condition on the V vel.
C
          IF( KR .eq. 0) then
            DO 613 KC = 0,MaxC-1,2
              V1(KC,0) = 0.0
  613       Continue
          End if
  610   Continue C
C       ************* PART TWO (step two) *************
C
C
C       Points which are (odd,odd) (Column,Row)
C
C       Boundary CONDITIONS
C
C       RIGHT    BOTTOM
C
        DO 435 KC = 1,MaxC,2
C
C         This time this is NOT a BOUNDARY CONDITION
C         and it is shifted at the next step.
          GR(KC,1) = ( V1(KC,0) )
          GU(KC,1) = ( U1(KC,0)*V1(KC,0)/R1(KC,0) )
          GV(KC,1) = ( V1(KC,0)**2/R1(KC,0)+R1(KC,0) )
C
  435   CONTINUE DO 630 KR = 1,MaxR,2
          DO 635 KC = 1,MaxC,2
C           Shift the previous row of data (this is the one step shift and save)
            GR(KC,-1) = GR(KC,1)
            GU(KC,-1) = GU(KC,1)
            GV(KC,-1) = GV(KC,1)
C           We use the F's of the columns which are not the current points
            FR(KC-1) = U1(KC-1,KR)
            FU(KC-1) = U1(KC-1,KR)**2 / R1(KC-1,KR) + R1(KC-1,KR)
            FV(KC-1) = U1(KC-1,KR) * V1(KC-1,KR) / R1(KC-1,KR)
C
C           We Calculate the current values needed in the calculation
            If( KR .ne. MaxR ) then
```

```
C             We Calculate the current values needed in the calculation
              GR(KC,1) = V1(KC,KR+1)
              GU(KC,1) = U1(KC,KR+1) * V1(KC,KR+1) / R1(KC,KR+1)
              GV(KC,1) = V1(KC,KR+1)**2 / R1(KC,KR+1) + R1(KC,KR+1)
            Else
C             This is the BOUNDARY CONDITION on the BOTTOM of the matrix.
              GR(KC,1) = -GR(KC,-1)
              GU(KC,1) = -GU(KC,-1)
              GV(KC,1) = -GV(KC,-1)
C             This is the BOUNDARY CONDITION on the BOTTOM
C             R1(KC,MaxR+1) = R1(KC,MaxR-1)
.C            U1(KC,MaxR+1) = U1(KC,MaxR-1)
C             V1(KC,MaxR+1) = V1(KC,MaxR-1)
            End If
C
 635      Continue
C         This is the BOUNDARY CONDITION at the RIGHT side of the matrix.
C         R1(MaxC+1,KR) = R1(MaxC-1,KR)
C         U1(MaxC+1,KR) = U1(MaxC-1,KR)
C         V1(MaxC+1,KR) = V1(MaxC-1,KR)
C         The "Ending" value of the F's must be calculated here the
C         rest are calculated below
C         This is the BOUNDARY CONDITION at the RIGHT side of the matrix.
          FR(MaxC+1) = -( FR(MaxC-1) )
          FU(MaxC+1) = -( FU(MaxC-1) )
          FV(MaxC+1) = -( FV(MaxC-1) )
C
C         We now have the the points for the current run.
          DO 640 KC = 1,MaxC,2

Temp = FR(KC+1) - FR(KC-1)
     1           + GR(KC,1) - GR(KC,-1)
          R1(KC,KR) = R1(KC,KR   )
     *          - B * Temp Temp = FU(KC+1) - FU(KC-1)
     1           + GU(KC,1) - GU(KC,-1)
          U1(KC,KR) = U1(KC,KR   )
     *          - B * Temp Temp = FV(KC+1) - FV(KC-1)
     1           + GV(KC,1) - GV(KC,-1)
          V1(KC,KR) = V1(KC,KR   )
     *          - B * Temp 640      Continue
C
C         Boundary Condition on the U vel.
C
          U1(MaxC,KR) = 0.0
C
C         Boundary Condition on the V vel.
C
          IF( KR .eq. MaxR) then
            DO 643 KC = 1,MaxC,2
              V1(KC,MaxR) = 0.0
 643        Continue
          End if
 630    Continue
C
C       Finished the second step.
C
```

```
C ****************************************************************
C ----------------------------------------------------------------
      Return
      End
      SUBROUTINE CHECK_ANS(IN,MAXX,MAXY,Y,NDIM,MinL)
      INTEGER*2 IN(MaxX,MaxY)
      Real*4 Y(Ndim), MinL
C     The diagonals are calculated here.
C
C
C     The first diagonal values are calculated here.
C
      X1 = Y(1)
      Y1 = Y(3)
      Ang1 = Y(5)
      Ang2 = Y(7)
      Dl1 = Y(9)
      Npoint = Nint( DL1 * .8 )
      If( npoint .Le. 0 ) then
C       Write(*,*) ' Error end point, DL1=',DL1
        Npoint = 10
      End if
      DeLta = DL1 / FLoat( Npoint )
      Ang1cos = Cos( Ang1 )
      Ang1sin = Sin( Ang1 )
      Ang2cos = Cos( Ang2 )
      Ang2sin = Sin( Ang2 )
      AN1cos = Cos( Ang1 + Piover2 )
      AN1sin = Sin( Ang1 + Piover2 )
      AN2cos = Cos( Ang2 + Piover2 )
      AN2sin = Sin( Ang2 + Piover2 )
      Do 100 i=-Npoint,Npoint
        R = I * DeLta
        Xtemp = X1 + R * Ang1Cos
        Ytemp = Y1 + R * Ang1Sin
        IX = Int(Xtemp)
        Xtemp = Xtemp - IX
        IY = Int(Ytemp)
        Ytemp = Ytemp - IY
        If( IX .Lt. 1 .or. IX+1 .gt. MaxX .or.
     1      IY .Lt. 1 .or. IY+1 .gt. MaxY ) then
          vLeveL = 10.0
        ELse
C
C         The area fLow is caLcuLated using biLinear interpoLation.
          Temp1 = (1-Xtemp)*In(IX,IY) + Xtemp*In(IX+1,IY)
          Temp2 = (1-Xtemp)*In(IX,IY+1) + Xtemp*In(IX+1,IY+1)
          vLeveL = (1-Ytemp)*Temp1 + Ytemp*Temp2
        End if
C
C       CaLcuLate the force wanting a change
C
C         The X directed force is:
          VLtot = VLtot + vLeveL
C
C
        Xtemp = X1 + R * Ang2Cos
        Ytemp = Y1 + R * Ang2Sin
        IX = Int(Xtemp)
        Xtemp = Xtemp - IX
        IY = Int(Ytemp)
        Ytemp = Ytemp - IY
        If( IX .Lt. 1 .or. IX+1 .gt. MaxX .or.
     1      IY .Lt. 1 .or. IY+1 .gt. MaxY ) then
          vLeveL = 10.0
        ELse
C
C         The area fLow is caLcuLated using biLinear interpoLation.
```

```
        Templ = (1-Xtemp)*In(IX,IY) + Xtemp*In(IX+1,IY)
        Temp2 = (1-Xtemp)*In(IX,IY+1) + Xtemp*In(IX+1,IY+1)
        vLeveL = (1-Ytemp)*Templ + Ytemp*Temp2
      End if
C
C
C        The X directed force is:
         VLtot = VLtot + vLeveL
C
  100  Continue
C
C        RescaLe the "forces"
         VLtot = VLtot / FLoat(4* Npoint +2)
         Write(*,*) 'This is the value of the goodness parameter',VLtot
         Return
         End
```

What is claimed is:

1. A method of extracting features from source signals, such as image signals, display signals, and similar complex signals, comprising the steps of:
   (a) producing a display field of said source signal having two or more dimensions;
   (b) generating a force field around areas of said display field having selected properties, such as those areas having a prescribed intensity;
   (c) placing at least one movable and deformable template in the display field that is acted upon by said force field; and
   (d) evaluating at least one characteristic of said template after said template has been acted upon by said force field, said force field causing said template to move and/or deform in response to the forces present within said force field, said at least one characteristic providing an indication of a feature present within said source signal.

2. The method of extracting features from source signals of claim 1 wherein the display-field production of step (a) comprises producing a visual display and enhancing selected features of the display.

3. The method of extracting features from source signals of claim 2 wherein the step of producing a visual display comprises generating an array of pixels, each pixel being assigned a brightness level as a function of the source signal being displayed.

4. The method of extracting features from source signals of claim 3 wherein the step of enhancing features of the display comprises enhancing edges appearing within the display to make them appear as highlighted linear tracks.

5. The method of extracting features from source signals of claim 4 wherein the step of enhancing features of the display further comprises enhancing boundaries of regions of homogeneous texture within said display.

6. The method of extracting features from source signals of claim 1 wherein the force-field generation of step (b) comprises generating an attractive force field around the selected features of the display field, whereby a movable object, such as a template, placed within said display field is attracted towards the selected features in accordance with the governing principles of the force field.

7. The method of extracting features from source signals of claim 6 wherein the step of generating an attractive force field comprises treating the display field as a field of compressible fluid or gas and assigning each selected feature within the display field as a low pressure region, whereby a movable object, such as a template, placed within the display field flows towards the selected feature according to known principles of fluid flow dynamics.

8. The method of extracting features from source signals of claim 6 wherein the step of generating an attractive force field comprises treating the display field as a potential field and assigning each selected feature within the display field a potential value, whereby movable objects, such as a template, placed within the display field are attracted to the selected feature according to known principles of potential fields.

9. The method extracting features from source signals of claim 8 wherein the step of treating the display field as a potential field comprises treating the display field as a distribution of mass field wherein each selected feature within the display field is assigned a mass value, whereby a movable object having an assigned mass value, placed in the display field, such as a template, is attracted towards the selected features in accordance with known principles of physical dynamics.

10. The method of extracting features from source signals of claim 8 wherein the step of treating the display field as a potential field comprises treating the display field as an electric field and assigning each selected feature within the display field an electric charge value of one polarity, whereby an object having an electric charge value of an opposite polarity, such as a template, placed within the display field is attracted towards the selected feature according to known principles of electric dynamics.

11. The method extracting features from source signals of claim 1 wherein step (c) of placing movable templates within said display field comprises:
   defining a template having desired characteristics, including the ability to bend and deform to a desired degree;
   placing at least one such defined template in the display field provided in step (a) so that it can be acted upon by at least one of the force fields generated in step (b), and
   allowing the force field to act upon the placed template until the template is within a specified closeness of a match with the selected features of the source signal.

12. The method of extracting features from source signals of claim 11 wherein the step of allowing the force field to act upon the placed template comprises allowing the template to converge to an asymptotic state, said asymptotic state comprising a state wherein said template has been finally acted upon by said force field, said asymptotic state providing a hypothetical location, orientation, and shape of the feature in the display field towards which the template was attracted.

13. The method of extracting features from source signals of claim 12 wherein the step of defining the template to have desired characteristics includes assigning the template to have a desired dimensionality, such as a one dimensional line, a two dimensional rectangle, or a three dimensional sphere.

14. The method of extracting features from source signals of claim 12 wherein the step of defining the template to have desired characteristic includes assigning the template to have a desired topology, including the shape of the template, the number of holes in the template, and the number of separate pieces in the template.

15. The method of extracting features from source signals of claim 12 wherein the step of defining the template to have desired characteristics includes assigning the template to have a desired number of degrees of freedom.

16. The method of extracting features from source signals of claim 12 wherein the step of defining the template to have desired characteristics includes assigning the template to have desired dynamics, including the manner and degree to which the template can bend, deform, flex, and otherwise respond to forces applied thereto.

17. The method of extracting features from source signals of claim 1 wherein the evaluation of the template carried out in step (d) comprises:
considering the asymptotic state of each template as a hypothetical location, orientation, and shape for a feature within the display field, and
deciding whether to accept or reject said hypothetical location, orientation, and shape (the hypothesis) as the extracted feature of the source signal.

18. The method of extracting features from source signals of claim 17 wherein the step of accepting/rejecting the hypothesis comprises testing the parameters characterizing said template and rejecting the hypothesis if these parameters lie outside certain prescribed bounds.

19. The method of extracting features from source signals of claim 17 wherein the step of accepting/rejecting the hypothesis comprises testing the properties of the display field near at least one portion of the template and accepting the hypothesis if these properties lie within certain prescribed bounds.

20. The method of extracting features from source signals of claim 1 wherein step (c) comprises placing a prescribed number of templates in the force field and wherein step (d) comprises determining whether a prescribed number of said templates have clustered around a given point in the display field, and if so, accepting the presence of a feature at said point.

21. The method of extracting features from source signals of claim 1 wherein step (c) includes assigning a potential energy value to a template as it is placed in the display field at its initial position; and step (d) comprises measuring the decrease in the potential energy after the template has moved within the display as a result of being acted upon by the force field, and accepting a hypothesis concerning the location, orientation and shape of a feature in the display field if the potential energy has fallen by more than a specified amount.

22. A method for classifying features from a display having two or more dimensions comprising the steps of:
 (a) generating a force field around areas within said display field having selected properties;
 (b) defining a movable and deformable template having desired initial characteristics;
 (c) placing said template within said display field;
 (d) allowing said template to move and deform within said display in response to being acted upon by said force field; and
 (e) evaluating at least one final characteristic of said template after said template has moved to a final state and assumed a final shape as a result of being acted upon by said force field; and
 (f) classifying a feature present in the display field as a function of the evaluated final characteristic of said template.

23. A method of identifying features in a display field, said display field comprising a two or more dimensional array of a complex signal, said method comprising the steps of:
 (a) generating a force field around areas within said display field having selected characteristics;
 (b) placing a movable and flexible template within said display field that moves and flexes in response to said force field; and
 (c) evaluating at least one characteristic of said template after it has moved and flexed as a result of being acted upon by said force field, said evaluated characteristic providing an indication of the identity of selected features within said display field.

24. A method of interpreting a complex signal comprising the steps of:
 (a) generating at least one display field of two or more dimensions that display said complex signal;
 (b) enhancing selected portions of said display field;
 (c) generating a force field around said selected enhanced portions;
 (d) defining at least one movable template having desired characteristics, such as a flexible stick, and placing said template within said display field so that it is acted upon by said force field for a prescribed time period; and
 (e) evaluating at least one characteristic of said template at the conclusion of said time period, said evaluated characteristic providing information relative to the interpretation of said complex signal.

25. The interpretation method of claim 24 wherein the prescribed time period of step (d) is determined by waiting until after the template has settled to a final state as a result of being acted upon by said force field.

26. A control system comprising:
an element to be controlled that is responsive to a control signal;
receiving means for receiving at least one input signal;
feature-extraction means for extracting at least one specified feature from said input signal, said feature extraction means including
 display-field generating means for generating at least one display field of at least two dimensions of said input signal,
 force-field generating means for generating a force field surrounding selected portions of said display field,
 template means for placing at least one movable and deformable template in said display field that is acted upon by said force field, and evaluating means for evaluating said at least one movable and deformable template after it has been acted upon by said force field, the location, orientation and shape of said template providing an indication that a feature is present within said display field having a similar location, orientation and shape, said identified feature being extracted from said display field; and control means responsive to the feature extracted by said feature extraction means for generating said control signal;

whereby the element of said control system that is controlled in response to said control signal is controlled as a function of the extracted feature from said input signal.

27. The control system of claim 26 wherein said control system comprises a wheeled vehicle, said receiving means includes a video camera attached to said vehicle that generates a video signal as a result of an optical image presented thereto, said feature-extraction means comprises a computer on-board said vehicle that extracts the edges of a road from the video signal generated by said video camera, and said control means includes means for moving and steering said vehicle so that it follows said road.

28. The control system of claim 27 wherein said control means includes:
means for calculating the center of the road as halfway between the edges of the road;
means for moving the vehicle forward along the center of the road; and
means for adjusting the video camera so that it is pointed at the center of the road in front of the vehicle.

29. The control system of claim 27 wherein the display-field generating means of said feature-extraction means includes:
means for processing the video signal using a Sobel edge detector;
means for normalizing the Sobel-processed image; and
means for calculating a visual field display from the normalized Sobel image.

30. The control system of claim 29 wherein said visual field display comprises a matrix of pixels, each pixel having an intensity level associated therewith that varies as a function of the received video signal; and further wherein the force-field generating means of said feature-extraction means includes means for treating said matrix of pixels as a fluid flow field wherein pixels having a prescribed intensity within said display field are assigned a low pressure value; and still further wherein said template means includes means for allowing a template placed in said fluid-flow field to move within said fluid-flow field in response to forces created by said low pressure values.

31. The control system of claim 30 wherein said template placed in said fluid-flow field by said template means comprises a non-rigid template that can flex and deform in response to the flow forces created within said fluid-flow field.

32. The control system of claim 31 wherein said template comprises a pair of flexible rods.

33. The control system of claim 32 wherein each of the flexible rods of said pair of flexible rods includes repeller means for repelling each of said rods from the other of said rods as said rods are moved by said force field within said visual field display, thereby preventing said rods from converging to the same location within said visual display field.

34. The control system of claim 26 wherein said control system comprises an aircraft; said receiving means includes sensing means mounted on said aircraft for receiving an input signal from the area in front of and below said aircraft and for generating a sensor signal in response thereto; said feature-extraction means includes signal processing means on-board said aircraft for extracting linear features, such as roads and rivers, from said sensor signal; and said control means includes means for guiding said aircraft so that it follows said linear features.

35. The control system of claim 34 wherein said receiving means further includes means for photographing and recording optical images observed from said aircraft; and wherein said signal processing means further includes means for extracting rectangular features, such as buildings, from the optical images photographed and recorded by said receiving means.

36. A signal processing system for interpreting an input signal comprising:
receiving means for receiving at least one input signal;
feature-extraction means for extracting desired features from said input signal, said feature extraction means including:
display-field generating means responsive to said input signal for generating at least one display field of said input signal having at least two dimensions,
force-field generating means for generating a force field surrounding selected properties of said display field,
template means for placing at least one movable template in said display field and for allowing said template to move within said display field in response to said force field, and
evaluating means for identifying those features within said input signal that are to be extracted, said evaluating means including means for determining at least the position of said movable template after said template has been acted upon by said force field, said determined position providing an indication of those features within said display field that are to be extracted; and
display means for extracting the identified features from the display field and for displaying said extracted features, said display of extracted features providing an interpretation of said signal.

37. The signal processing system of claim 36 wherein said receiving means includes a plurality of sensors for receiving input signals from a moving noise source, said feature-extraction means comprises processing means that includes said display-field generating means, force-field generating means, template means, and evaluating means; and wherein said display means includes a detection display whereon a trajectory of the moving noise source is displayed; said signal processing system thereby comprising a multichannel warped signal correlator system.

38. The signal processing system of claim 37 wherein said display-field generating means includes: (1) means for dividing the input signals from each sensor into n sub-series, (2) means for generating a preliminary visual field by calculating the cross correlation of corresponding pairs of sub-series from the divided signals from each sensor, (3) means for normalizing the preliminary visual field thus formed, and (4) means for calculating the display field from said normalized preliminary visual field.

39. The signal processing system of claim 38 wherein said display field comprises a matrix of pixels, each pixel having an intensity level associated therewith that varies as a function of the received input signal; and further wherein the force-field generating means of said feature-extraction means includes means for treating said matrix of pixels as a fluid-flow field wherein pixels having a prescribed intensity within said display field are assigned a low pressure value; and still further wherein said template means includes means for allowing a template placed in said fluid-flow field to move within said fluid-flow field in response to forces created by said assigned low pressure values.

40. The signal processing system of claim 39 wherein said template placed in said fluid-flow field comprises a flexible rod having prescribed characteristics.

41. The signal processing system of claim 40 wherein said template comprises a pair of flexible rods, each of said flexible rods having repeller means for repelling each flexible rod from the other flexible rod, thereby preventing said rods from converging to the same location within said display field.

42. The signal processing system of claim 36 wherein said receiving means comprises means for providing a digital imagery signal, said input signal comprising an optical signal from which said digital imagery signal is derived, and said feature extraction means comprises digital processing means for extracting rectangles from said digital imagery signal; said display means thereby displaying the extracted rectangles.

43. The signal processing system of claim 42 wherein the display-field generating means of said feature extraction means comprises means for producing first and second visual fields from the initial digital imagery signal, said first visual field being produced so as to enhance regions of uniform intensity, and said second visual field being produced from said first visual field so as to enhance the edges around the regions of uniform intensity.

44. The signal processing system of claim 43 wherein the force-field generating means of said feature-extraction means includes means for calculating an attractive force field within each of said first and second visual fields, said calculation being based on the solution of the equations for a compressible fluid flow.

45. The signal processing system of claim 44 wherein the calculating means carries out the solution of the fluid flow equations using a two-step finite difference solution technique.

46. The signal processing system of claim 44 wherein the template means of said feature-extraction means comprises means for placing a plurality of rectangular templates within said first and second visual fields and allowing said templates to change shape, orientation, and size within said first and second visual fields as said templates are acted upon by the forces of said attractive force field.

47. The signal processing system of claim 46 further including repeller means for repelling each of said plurality of rectangular templates from the others of said rectangular templates as said rectangular templates are acted upon by the forces of said attractive force field, thereby preventing said templates from converging to the same location within said display field.

48. The signal processing system of claim 46 wherein the evaluating means of said feature extraction means includes means for testing the regions within said first visual field that are surrounded by said templates, after said templates have reached an asymptotic state, to determine if said regions are homogeneous, said asymptotic state comprising that state wherein said templates have finished moving in response to said attractive force field; and by further testing the pixels within the second visual field that are close to the edges of the rectangular templates that have also reached an asymptotic state to determine if a prescribed percentage of said pixels are edged enhanced pixels.

49. The signal processing system of claim 36 wherein said receiving means receives an input signal comprising seismic data and includes means for forming a common depth point display therefrom; and said feature-extraction means extracts features from said seismic data signal representative of the shape of the curves formed by the locus of reflections in the common depth point display, said signal processing system thereby serving as a common depth point interpretation station.

50. The signal processing system of claim 36 wherein said receiving means receives an input signal comprising a zero offset signal obtained from seismic data, and said feature extraction means extracts features from said zero offset signal indicative of the locus of reflections from a given reflecting interface, said signal processing system thereby functioning as a seismic trace interpretation station.

51. The signal processing system of claim 36 wherein said receiving means receives a reflected input signal from a moving target, such as occurs in a radar system, and said feature-extraction means extracts the trajectory of the reflected signals over time based on a collection of input signals, and further wherein said display means displays said trajectory in a multi-dimensional display, said signal processing system thereby functioning as a multi-screen track detection system.

52. The signal processing system of claim 36 wherein said receiving means receives a voice signal from a person to be identified, said feature-extraction means includes means for extracting features, if any, from said voice signal that are unique to a particular individual, and said display means includes means for signaling whether any unique features for said particular individual were extracted from said voice signal.

53. A system for interpeting a complex signal comprising:
means for receiving said complex signal;
means for displaying said complex signal in a display field having at least two dimensions;
means for enhancing areas of said display field having prescribed properties;
means for generating a force field around at least one of said enhanced areas;
means for placing a template having desired characteristics within said display field so that it is acted upon by said force field until a prescribed event occurs;
means for determining the occurrence of said prescribed event;
means for evaluating said template to determine its location orientation, and shape within said display field after the occurence of said prescribed event, which information provides an indication of the location, orientation and shape of a feature within said display field, and hence within said complex signal;

the presence of said feature within said complex signal providing an aid to the interpretation of said complex signal.

54. The complex signal interpreting system of claim 53 wherein said prescribed event comprises the convergence of said template to a final position within said display field as a result of being acted upon by said force field.

55. The complex signal interpreting system of claim 53 wherein said prescribed event comprises the elapse of a prescribed time period.

56. The method of claim 1 wherein the step of generating a force field comprises generating a second order force filed around areas of the display field having selected properties, said second order force field containing forces that are deformed by a second-order differential equation.

57. The method of claim 6 wherein the force-field generation of step (b) comprises generating a second order attractive force field around selected features of the display field, whereby a movable object, such as a template, placed within said display field is attracted towards the selected features in accordance with the governing second-order principles of the force field.

58. The method of extracting features from source signals of claim 57 wherein the step of generating a second order attractive force field comprises treating the display field as a field of compressible fluid or gas and assigning each selected feature within the display field as a low pressure region, whereby a movable object, such as a template, placed within the display field flows towards the selected feature according to known second order principles of fluid flow dynamics.

59. The method of extracting features from source signals of claim 57 wherein the step of generating a second order attractive force field comprises treating the display field as a potential field described by a second order differential equation and assigning each selected feature within the display field a potential value, whereby movable object, such as a template, placed within the display field are attracted to the selected feature according to known second order principles of potential fields.

60. The method of extracting features from source signals of claim 58 wherein the step of treating the display field as a potential field comprises treating the display field as a distribution of mass field wherein each selected feature within the display field is assigned a mass value, whereby a movable object having as assigned mass value, placed in the display field, such as a template, is attracted towards the selected features in accordance with known second-order principles of physical dynamics.

61. The method of extracting features from source signals of claim 8 wherein the step of treating the dislay field as a potential field comprises treating the display field as an electric field and assigning each selected feature within the display field an electric charge value of one polarity, whereby an object having an electric charge value of an opposite polarity, such as a template, placed within the display field is attracted toward the selected feature according to known second order principles of electric dynamics.

62. The method for classifying features of claim 22 wherein step (a) comprises generating a second order force field around areas within said display field having selected properties, said second-order force field having forces defined by a second order differential equation.

63. The method of identifying features of claim 23 wherein step (a) comprises generating a second order force field around areas within said display field having selected characteristics, said second order force field having forces that are defined by a second order differential equation.

64. The interpretation method of claim 24 wherein step (c) comprises generating a second order force field around said selected enhanced portions, said second order force field having forces therein that are defined by at least a second order differential equation.

65. The control system of claim 26 wherein said force-field generating means of said feature-extraction means comprises means for generating a second order force field surrounding selected portions of said display field, the forces generated by said second order force field being defined by at least one second order differential equation.

66. The signal processing system of claim 36 wherein the force-field generating means of said feature-extraction means comprises means for generating a second order force field that surrounds selected properties of the display field, said second order force field having forces associated therewith that are defined at least one second order differential equation.

67. The complex signal interpreting system of claim 53 wherein said means for generating a force field around at least one of said enhanced areas comprises means for generating a second order force field that generates forces as defined by at least a second order differential equation.

* * * * *